(12) United States Patent
Venkatachalam et al.

(10) Patent No.: US 11,094,925 B2
(45) Date of Patent: Aug. 17, 2021

(54) ELECTRODES WITH SILICON OXIDE ACTIVE MATERIALS FOR LITHIUM ION CELLS ACHIEVING HIGH CAPACITY, HIGH ENERGY DENSITY AND LONG CYCLE LIFE PERFORMANCE

(71) Applicant: Zenlabs Energy, Inc., Fremont, CA (US)

(72) Inventors: Subramanian Venkatachalam, Pleasonton, CA (US); Sanjeev Sharma, Fremont, CA (US); Xianyu Iris Li, Mountain View, CA (US); Pedro A. Hernandez-Gallegos, Pleasonton, CA (US); Charan Masarapu, Fremont, CA (US); Sujeet Kumar, Newark, CA (US); Herman A. Lopez, Sunnyvale, CA (US)

(73) Assignee: Zenlabs Energy, Inc., Fremont, CA (US)

( * ) Notice: Subject to any disclaimer, the term of this patent is extended or adjusted under 35 U.S.C. 154(b) by 321 days.

(21) Appl. No.: 15/948,160

(22) Filed: Apr. 9, 2018

(65) Prior Publication Data
US 2019/0207209 A1    Jul. 4, 2019

Related U.S. Application Data

(60) Provisional application No. 62/609,930, filed on Dec. 22, 2017.

(51) Int. Cl.
*H01M 4/36* (2006.01)
*H01M 10/0525* (2010.01)
(Continued)

(52) U.S. Cl.
CPC .......... *H01M 4/364* (2013.01); *H01M 4/131* (2013.01); *H01M 4/133* (2013.01); *H01M 4/134* (2013.01);
(Continued)

(58) Field of Classification Search
CPC ..................................................... H01M 4/622
See application file for complete search history.

(56) References Cited

U.S. PATENT DOCUMENTS 4,086,404 A    11/1978 Vissers et al.
4,945,014 A    7/1990 Miyabayashi et al.
(Continued)

FOREIGN PATENT DOCUMENTS

EP    2079120 A1    7/2009
EP    2141759 A1    1/2010
(Continued)

OTHER PUBLICATIONS

Achiha et al., "Electrochemical Behavior of Nonflammable Organo-Fluorine Compunds for Lithium Ion Batteries," Journal of the Electrochemical Society 156(6): A483-A488 (2009).
(Continued)

*Primary Examiner* — Jonathan Crepeau
(74) *Attorney, Agent, or Firm* — Christensen, Fonder, Dardi; Elizabeth A. Gallo; Peter S. Dardi

(57) ABSTRACT

Improved negative electrodes can comprise a silicon based active material blended with graphite to provide more stable cycling at high energy densities. In some embodiments, the negative electrodes comprise a blend of polyimide binder mixed with a more elastic polymer binder with a nanoscale carbon conductive additive. The silicon-based blended graphite negative electrodes can be matched with positive
(Continued)

electrodes comprising nickel rich lithium nickel manganese cobalt oxides to form high energy density cells with good cycling properties.

23 Claims, 21 Drawing Sheets

(51) Int. Cl.
| | | |
|---|---|---|
| H01M 4/48 | (2010.01) | |
| H01M 4/587 | (2010.01) | |
| H01M 4/505 | (2010.01) | |
| H01M 4/62 | (2006.01) | |
| H01M 4/525 | (2010.01) | |
| H01M 4/38 | (2006.01) | |
| H01M 4/133 | (2010.01) | |
| H01M 4/134 | (2010.01) | |
| H01M 4/131 | (2010.01) | |

(52) U.S. Cl.
CPC .......... *H01M 4/386* (2013.01); *H01M 4/483* (2013.01); *H01M 4/505* (2013.01); *H01M 4/525* (2013.01); *H01M 4/587* (2013.01); *H01M 4/622* (2013.01); *H01M 4/623* (2013.01); *H01M 4/625* (2013.01); *H01M 10/0525* (2013.01)

(56) References Cited

U.S. PATENT DOCUMENTS

| | | |
|---|---|---|
| 5,147,739 A | 9/1992 | Beard |
| 5,162,176 A | 11/1992 | Herr et al. |
| 5,395,711 A | 3/1995 | Tahara et al. |
| 5,436,093 A | 7/1995 | Huang et al. |
| 5,443,601 A | 8/1995 | Doeff et al. |
| 5,514,488 A | 5/1996 | Hake et al. |
| 5,541,022 A | 7/1996 | Mizumoto et al. |
| 5,595,837 A | 1/1997 | Olsen et al. |
| 5,721,067 A | 2/1998 | Jacobs et al. |
| 5,743,921 A | 4/1998 | Narzi et al. |
| 5,753,388 A | 5/1998 | Koksbang et al. |
| 5,792,577 A | 8/1998 | Ejiri et al. |
| 5,948,569 A | 9/1999 | Moses et al. |
| 6,025,093 A | 2/2000 | Herr |
| 6,080,507 A | 6/2000 | Yu |
| 6,083,644 A | 7/2000 | Watanabe et al. |
| 6,171,723 B1 | 1/2001 | Loch et al. |
| 6,235,427 B1 | 5/2001 | Idota et al. |
| 6,251,822 B1 | 6/2001 | Peng et al. |
| 6,335,115 B1 | 1/2002 | Meissner |
| 6,337,156 B1 | 1/2002 | Narang et al. |
| 6,383,687 B1 | 5/2002 | Gibbons et al. |
| 6,420,071 B1 | 7/2002 | Lee et al. |
| 6,511,767 B1 | 1/2003 | Calver et al. |
| 6,528,208 B1 | 3/2003 | Thackeray et al. |
| 6,616,715 B2 | 9/2003 | Kitoh et al. |
| 6,638,662 B2 | 10/2003 | Kaneda et al. |
| 6,645,671 B2 | 11/2003 | Tsutsumi et al. |
| 6,677,082 B2 | 1/2004 | Thackeray et al. |
| 6,680,143 B2 | 1/2004 | Thackeray et al. |
| 6,682,849 B2 | 1/2004 | Narang et al. |
| 6,699,336 B2 | 3/2004 | Turner et al. |
| 6,703,163 B2 | 3/2004 | Ogura et al. |
| 6,706,447 B2 | 3/2004 | Gao et al. |
| 6,730,429 B2 | 5/2004 | Thackeray et al. |
| 6,737,191 B2 | 5/2004 | Gan et al. |
| 6,749,648 B1 | 6/2004 | Kumar et al. |
| 6,759,160 B2 | 7/2004 | Fukuoka et al. |
| 6,783,896 B2 | 8/2004 | Tsujioka et al. |
| 6,787,267 B2 | 9/2004 | Tsujioka et al. |
| 6,787,268 B2 | 9/2004 | Koike et al. |
| 6,835,214 B2 | 12/2004 | Kitano et al. |
| 6,855,460 B2 | 2/2005 | Vaughey et al. |
| 6,858,349 B1 | 2/2005 | Lou et al. |
| 6,884,546 B1 | 4/2005 | Fujita et al. |
| 6,893,621 B2 | 5/2005 | Fukuoka et al. |
| 6,899,970 B1 | 5/2005 | Rogers et al. |
| 6,936,382 B2 | 8/2005 | Mikaylik et al. |
| 6,951,699 B2 | 10/2005 | Yata et al. |
| 6,964,828 B2 | 11/2005 | Lu et al. |
| 6,979,513 B2 | 12/2005 | Kelley et al. |
| 7,008,722 B2 | 3/2006 | Huang |
| 7,026,074 B2 | 4/2006 | Chen et al. |
| 7,033,702 B2 | 4/2006 | Dasgupta et al. |
| 7,037,581 B2 | 5/2006 | Aramata et al. |
| 7,078,128 B2 | 7/2006 | Lu et al. |
| 7,135,252 B2 | 11/2006 | Thackeray et al. |
| 7,166,385 B2 | 1/2007 | Ishida et al. |
| 7,186,479 B2 | 3/2007 | Krasnov et al. |
| 7,195,842 B1 | 3/2007 | Fujimoto et al. |
| 7,198,869 B2 | 4/2007 | Ghantous et al. |
| 7,201,994 B2 | 4/2007 | Watanabe et al. |
| 7,201,997 B2 | 4/2007 | Ishida et al. |
| 7,205,072 B2 | 4/2007 | Kang et al. |
| 7,214,446 B1 | 5/2007 | Bi et al. |
| 7,229,717 B2 | 6/2007 | Yamaguchi et al. |
| 7,235,330 B1 | 6/2007 | Fujimoto et al. |
| 7,252,689 B2 | 8/2007 | Fujino et al. |
| 7,252,907 B2 | 8/2007 | Takeuchi et al. |
| 7,273,682 B2 | 9/2007 | Park et al. |
| 7,276,314 B2 | 10/2007 | Gao et al. |
| 7,297,446 B2 | 11/2007 | Fukui et al. |
| 7,338,734 B2 | 3/2008 | Chiang et al. |
| 7,351,494 B2 | 4/2008 | Hennige et al. |
| 7,416,813 B2 | 8/2008 | Fujihara et al. |
| 7,432,015 B2 | 10/2008 | Jeong et al. |
| 7,435,402 B2 | 10/2008 | Kang et al. |
| 7,452,631 B2 | 11/2008 | Kitao et al. |
| 7,452,632 B2 | 11/2008 | Lee et al. |
| 7,465,519 B2 | 12/2008 | Tang et al. |
| 7,497,285 B1 | 3/2009 | Radev |
| 7,507,503 B2 | 3/2009 | Amine et al. |
| 7,510,803 B2 | 3/2009 | Adachi et al. |
| 7,514,369 B2 | 4/2009 | Li et al. |
| 7,517,614 B2 | 4/2009 | Jeong et al. |
| 7,544,443 B2 | 6/2009 | Fujihara et al. |
| 7,563,541 B2 | 7/2009 | Howard et al. |
| 7,575,830 B2 | 8/2009 | Kawamura |
| 7,582,387 B2 | 9/2009 | Howard et al. |
| 7,588,623 B2 | 9/2009 | Dover et al. |
| 7,615,314 B2 | 11/2009 | Kawakami et al. |
| 7,658,863 B2 | 2/2010 | Aramata et al. |
| 7,700,221 B2 | 4/2010 | Yeo |
| 7,718,306 B2 | 5/2010 | Cheon et al. |
| 7,754,389 B2 | 7/2010 | Yamaguchi et al. |
| 7,776,473 B2 | 8/2010 | Aramata et al. |
| 7,790,316 B2 | 9/2010 | Aramata et al. |
| 7,833,662 B2 | 11/2010 | Kim et al. |
| 7,851,085 B2 | 12/2010 | Obrovac et al. |
| 7,871,727 B2 | 1/2011 | Obrovac et al. |
| 7,923,150 B2 | 4/2011 | Yamamoto et al. |
| 8,187,752 B2 | 5/2012 | Buckley et al. |
| 8,277,969 B2 | 10/2012 | Kobayashi et al. |
| 8,277,974 B2 | 10/2012 | Kumar et al. |
| 8,389,160 B2 | 3/2013 | Venkatachalam et al. |
| 8,465,873 B2 | 6/2013 | Lopez et al. |
| 8,535,832 B2 | 9/2013 | Karthikeyan et al. |
| 8,663,849 B2 | 3/2014 | Venkatachalam et al. |
| 8,765,306 B2 | 7/2014 | Amiruddin et al. |
| 9,159,990 B2 | 10/2015 | Amiruddin et al. |
| 9,552,901 B2 | 1/2017 | Amiruddin et al. |
| 9,601,228 B2 | 3/2017 | Deng et al. |
| 9,780,358 B2 | 10/2017 | Masarapu et al. |
| 10,290,871 B2 | 5/2019 | Masarapu et al. |
| 2001/0031396 A1 | 10/2001 | Tsutsumi et al. |
| 2002/0102462 A1 | 8/2002 | Huggins et al. |
| 2002/0122973 A1 | 9/2002 | Manev et al. |
| 2003/0077515 A1 | 4/2003 | Chen et al. |
| 2003/0087155 A1 | 5/2003 | Cho et al. |
| 2003/0099883 A1 | 5/2003 | Ochoa et al. |
| 2003/0135989 A1 | 7/2003 | Huggins et al. |
| 2003/0157014 A1 | 8/2003 | Wang et al. |

(56) References Cited

U.S. PATENT DOCUMENTS

| | | |
|---|---|---|
| 2003/0157407 A1 | 8/2003 | Kosuzu et al. |
| 2003/0211390 A1 | 11/2003 | Dahn et al. |
| 2004/0023117 A1 | 2/2004 | Imachi et al. |
| 2004/0033419 A1 | 2/2004 | Funabiki |
| 2004/0048152 A1 | 3/2004 | Yata et al. |
| 2004/0072072 A1 | 4/2004 | Suzuki et al. |
| 2004/0076885 A1 | 4/2004 | Sato et al. |
| 2004/0146734 A1 | 7/2004 | Miller et al. |
| 2004/0151951 A1 | 8/2004 | Hyung et al. |
| 2004/0161669 A1 | 8/2004 | Zolonik et al. |
| 2004/0191630 A1 | 9/2004 | Kawamura et al. |
| 2004/0214085 A1 | 10/2004 | Sheem et al. |
| 2004/0241548 A1 | 12/2004 | Nakamoto et al. |
| 2005/0019670 A1 | 1/2005 | Amine et al. |
| 2005/0026037 A1 | 2/2005 | Riley, Jr. et al. |
| 2005/0026040 A1 | 2/2005 | Thackeray et al. |
| 2005/0031942 A1 | 2/2005 | Hennige et al. |
| 2005/0031963 A1 | 2/2005 | Im et al. |
| 2005/0130043 A1 | 6/2005 | Gao et al. |
| 2005/0175901 A1 | 8/2005 | Kawakami et al. |
| 2005/0202316 A1 | 9/2005 | Hwang et al. |
| 2005/0214644 A1 | 9/2005 | Aramata et al. |
| 2005/0233213 A1 | 10/2005 | Lee et al. |
| 2006/0003227 A1 | 1/2006 | Aramata et al. |
| 2006/0040182 A1 | 2/2006 | Kawakami et al. |
| 2006/0051671 A1 | 3/2006 | Thackeray et al. |
| 2006/0051673 A1 | 3/2006 | Johnson et al. |
| 2006/0051677 A1 | 3/2006 | Matsushima et al. |
| 2006/0068285 A1 | 3/2006 | Yamaguchi et al. |
| 2006/0078797 A1 | 4/2006 | Munshi |
| 2006/0099472 A1 | 5/2006 | Hsu |
| 2006/0115734 A1 | 6/2006 | Ishihara et al. |
| 2006/0147809 A1 | 7/2006 | Amine et al. |
| 2006/0188784 A1 | 8/2006 | Sudoh et al. |
| 2006/0197496 A1 | 9/2006 | Iijima et al. |
| 2006/0228626 A1 | 10/2006 | Kawashima et al. |
| 2006/0269834 A1 | 11/2006 | West et al. |
| 2006/0286438 A1 | 12/2006 | Fujikawa et al. |
| 2007/0003836 A1 | 1/2007 | Suzuki et al. |
| 2007/0048612 A1 | 3/2007 | Nakajima et al. |
| 2007/0059601 A1 | 3/2007 | Natsume et al. |
| 2007/0099436 A1 | 5/2007 | Kogetsu et al. |
| 2007/0148544 A1 | 6/2007 | Le |
| 2007/0148549 A1 | 6/2007 | Kobayashi et al. |
| 2007/0190413 A1 | 8/2007 | Lee et al. |
| 2007/0207381 A1 | 9/2007 | Ohtsuka et al. |
| 2007/0224508 A1 | 9/2007 | Aramata et al. |
| 2007/0254102 A1 | 11/2007 | Fukuoka et al. |
| 2007/0259113 A1 | 11/2007 | Kizaki et al. |
| 2008/0008933 A1 | 1/2008 | Lampe-Onnerud |
| 2008/0026297 A1 | 1/2008 | Chen et al. |
| 2008/0095930 A1 | 4/2008 | Natsume et al. |
| 2008/0113269 A1 | 5/2008 | Yamamoto et al. |
| 2008/0131772 A1 | 6/2008 | Jambunathan et al. |
| 2008/0131783 A1 | 6/2008 | Choi et al. |
| 2008/0135801 A1 | 6/2008 | Kizaki et al. |
| 2008/0160265 A1 | 7/2008 | Hieslmair et al. |
| 2008/0193831 A1 | 8/2008 | Mah et al. |
| 2008/0213671 A1 | 9/2008 | Kogetsu et al. |
| 2008/0226988 A1 | 9/2008 | Minami et al. |
| 2008/0261115 A1 | 10/2008 | Saito et al. |
| 2008/0268347 A1 | 10/2008 | Ohzuku et al. |
| 2008/0274408 A1 | 11/2008 | Jarvis et al. |
| 2008/0318122 A1 | 12/2008 | Sun |
| 2009/0004564 A1 | 1/2009 | Ishida et al. |
| 2009/0023065 A1 | 1/2009 | Hwang et al. |
| 2009/0029256 A1 | 1/2009 | Mah et al. |
| 2009/0047577 A1 | 2/2009 | Iwamoto et al. |
| 2009/0053608 A1 | 2/2009 | Choi et al. |
| 2009/0092899 A1 | 4/2009 | Treger |
| 2009/0092900 A1 | 4/2009 | Obana et al. |
| 2009/0117466 A1 | 5/2009 | Zhamu et al. |
| 2009/0130562 A1 | 5/2009 | Mao et al. |
| 2009/0169994 A1 | 7/2009 | Mah et al. |
| 2009/0186267 A1 | 7/2009 | Tiegs |
| 2009/0214952 A1 | 8/2009 | Wakita et al. |
| 2009/0233178 A1 | 9/2009 | Saidi et al. |
| 2009/0239151 A1 | 9/2009 | Nakanishi et al. |
| 2009/0253042 A1 | 10/2009 | Sun et al. |
| 2009/0263707 A1 | 10/2009 | Buckley et al. |
| 2009/0263721 A1 | 10/2009 | Haruna et al. |
| 2009/0297937 A1 | 12/2009 | Lampe-Onnerud et al. |
| 2009/0305131 A1 | 12/2009 | Kumar et al. |
| 2009/0317721 A1 | 12/2009 | Shirane et al. |
| 2009/0317722 A1 | 12/2009 | Watanabe |
| 2009/0325061 A1 | 12/2009 | Lim |
| 2010/0009261 A1 | 1/2010 | Watanabe |
| 2010/0015514 A1 | 1/2010 | Miyagi et al. |
| 2010/0035147 A1 | 2/2010 | Kotato et al. |
| 2010/0047671 A1 | 2/2010 | Chiang et al. |
| 2010/0055563 A1 | 3/2010 | Nakanishi et al. |
| 2010/0086853 A1 | 4/2010 | Venkatachalam et al. |
| 2010/0086854 A1 | 4/2010 | Kumar et al. |
| 2010/0119939 A1 | 5/2010 | Misumi et al. |
| 2010/0119942 A1 | 5/2010 | Kumar |
| 2010/0120179 A1 | 5/2010 | Zhamu et al. |
| 2010/0151332 A1 | 6/2010 | Lopez et al. |
| 2010/0159366 A1 | 6/2010 | Shao-Horn et al. |
| 2010/0173198 A1 | 7/2010 | Zhamu et al. |
| 2010/0178566 A1 | 7/2010 | Kogetsu et al. |
| 2010/0243951 A1 | 9/2010 | Watanabe et al. |
| 2010/0288970 A1 | 11/2010 | Watanabe et al. |
| 2010/0330430 A1 | 12/2010 | Chung et al. |
| 2011/0017528 A1 | 1/2011 | Kumar et al. |
| 2011/0037439 A1 | 2/2011 | Bhardwaj et al. |
| 2011/0052981 A1 | 3/2011 | Lopez et al. |
| 2011/0052989 A1 | 3/2011 | Ventakachalam et al. |
| 2011/0076556 A1 | 3/2011 | Karthikeyan et al. |
| 2011/0085960 A1 | 4/2011 | Mukasyan et al. |
| 2011/0111294 A1 | 5/2011 | Lopez et al. |
| 2011/0111298 A1 | 5/2011 | Lopez et al. |
| 2011/0111303 A1 | 5/2011 | Kung et al. |
| 2011/0111304 A1 | 5/2011 | Cui et al. |
| 2011/0136019 A1 | 6/2011 | Amiruddin et al. |
| 2011/0163274 A1 | 7/2011 | Plee et al. |
| 2011/0171529 A1 | 7/2011 | Kono et al. |
| 2011/0236751 A1 | 9/2011 | Amiruddin et al. |
| 2011/0244331 A1 | 10/2011 | Karthikeyan et al. |
| 2012/0028105 A1 | 2/2012 | Kumar et al. |
| 2012/0045670 A1 | 2/2012 | Stefan et al. |
| 2012/0056590 A1 | 3/2012 | Amiruddin et al. |
| 2012/0070725 A1 | 3/2012 | Venkatachalam et al. |
| 2012/0070741 A1 | 3/2012 | Liu et al. |
| 2012/0082877 A1 | 4/2012 | Song et al. |
| 2012/0105007 A1 | 5/2012 | Amiruddin et al. |
| 2012/0107680 A1 | 5/2012 | Amiruddin et al. |
| 2012/0121982 A1 | 5/2012 | Harimoto et al. |
| 2012/0264020 A1 | 10/2012 | Burton et al. |
| 2012/0295155 A1 | 11/2012 | Deng et al. |
| 2013/0078508 A1 | 3/2013 | Tolbert et al. |
| 2013/0095357 A1 | 4/2013 | Bhardwaj et al. |
| 2013/0157147 A1 | 6/2013 | Li et al. |
| 2013/0189575 A1 | 7/2013 | Anguchamy et al. |
| 2013/0224585 A1 | 8/2013 | Oh et al. |
| 2013/0295439 A1 | 11/2013 | Masarapu et al. |
| 2013/0302688 A1 | 11/2013 | Takezawa |
| 2014/0065464 A1 | 3/2014 | Masarapu et al. |
| 2014/0308585 A1 | 10/2014 | Han et al. |
| 2014/0370387 A1 | 12/2014 | Anguchamy et al. |
| 2015/0050535 A1 | 2/2015 | Amiruddin et al. |
| 2016/0006021 A1 | 1/2016 | Lopez et al. |
| 2016/0079591 A1 | 3/2016 | Yang et al. |
| 2017/0194627 A1 | 7/2017 | Deng et al. |
| 2018/0062206 A1 | 3/2018 | Yang et al. |
| 2018/0241036 A1 | 8/2018 | Jo et al. |

FOREIGN PATENT DOCUMENTS

| | | |
|---|---|---|
| JP | 07-065825 | 3/1995 |
| JP | 09-045373 | 2/1997 |
| JP | 10-255837 | 9/1998 |
| JP | 2001-118568 | 4/2001 |
| JP | 2002-110167 | 4/2002 |
| JP | 2003-223887 | 8/2003 |

(56) References Cited

FOREIGN PATENT DOCUMENTS

| | | |
|---|---|---|
| JP | 2003-242978 A | 8/2003 |
| JP | 2005-251684 A | 9/2005 |
| JP | 2007-066667 A | 3/2007 |
| JP | 2009-252705 A | 10/2009 |
| JP | 2010-055775 | 3/2010 |
| KR | 10-2003-0007651 A | 1/2003 |
| KR | 10-2004-0096381 A | 11/2004 |
| KR | 10-0493960 B1 | 6/2005 |
| KR | 10-2006-0087003 A | 8/2006 |
| KR | 10-2006-0087183 A | 8/2006 |
| KR | 2012-0073603 A | 7/2012 |
| KR | 10-2017-0063373 A | 6/2017 |
| WO | 01-35473 A1 | 5/2001 |
| WO | 01-91209 A1 | 11/2001 |
| WO | 2004-025757 A2 | 3/2004 |
| WO | 2004-084330 A2 | 9/2004 |
| WO | 2005-011030 A1 | 2/2005 |
| WO | 2005-031898 A1 | 4/2005 |
| WO | 2005-065082 A2 | 7/2005 |
| WO | 2005-076389 A2 | 8/2005 |
| WO | 2005-083829 A2 | 9/2005 |
| WO | 2006-109930 A1 | 10/2006 |
| WO | 2006-137673 A1 | 12/2006 |
| WO | 2007-126257 A1 | 11/2007 |
| WO | 2008-086041 A1 | 7/2008 |
| WO | 2009-022848 A1 | 2/2009 |
| WO | 2011-053736 A1 | 5/2011 |
| WO | 2013-082330 | 11/2012 |
| WO | 2018-051675 | 3/2018 |

OTHER PUBLICATIONS

ASTM D638-10 Standard Test Method for Tensile Properties of Plastics, Oct. 2010.

"Battery Test Manual for Plug-In Hybrid Electric Vehicles," prepared for the U.S. Department of Energy, Office of Energy Efficiency and Renewable Energy, Vehicle Technologies Program (2008). (USDE_Manual_2008).

Chiang et al., "High Capacity, Temperature-Stable Lithium Aluminum Manganese Oxide Cathodes for Rechargeable Batteries," Electrochemical and Solid State Letters, 2(3):107-110 (1999).

Choi et al., "Effect of fluoroethylene carbonate additive on interfacial properties of silicon thin-film electrode" Journal of Power Sources 161 (2006) 1254-1259. (Abstract only).

Cui et al., "Carbon-silicon core-shell nanowires as high capacity electrode for lithium ion batteries," Nano Lett. 9 (9):3370-3374 (2009).

Evonik Industries, "Scientific breakthrough: SEPARION® opens up new markets for lithium ion batteries," http://corporate.evonik.de/en/company/news/lithium_ion_batteries/Pages/separion.aspx (Oct. 7, 2009).

"For More Charge Use Li, for Maximum Charge, Use FMC's SLMP™ Technology," Product Brochure, FMC Corporation 2008 (1 page). (FMP_SLMP_2008).

Guerfi et al., "SiOx-graphite as negative for high energy Li-ion batteries," Journal of Power Sources 196:5667-5673 (2011).

Ishikawa et al., "Li-ion Battery Performance with FSI-based Ionic Liquid Electrolyte and Fluorinated Solvent-based Electrolyte" ECS Trans. 33:29-36 (2010) (Abstract).

Hu et al., "Superior Storage Performance of a Si@SiOx/C Nanocomposite as Anode Material for Lithium-Ion Batteries," Agnewandte Chemie International Edition, 2008, 47, 1645-1649, available Feb. 2008.

Hua-Chao Tao, "Interweaved Si@SiOx/C nanoporous spheres as anode materials for Li-ion batteries", Solid State Ionics 220, Publish 2012, p. 1-6.

Ito et al., "A new approach to improve the high-voltage cyclic performance of Li-rich layered cathode material by electrochemical pre-treatment," Journal of Power Sources, 183:344-346 (2008).

Ito et al., "Cyclic deterioration and its improvement for Li-rich layered cathode material Li [Ni0.17Li0.2Co0.07Mn0.56]O2," Journal of Power Sources, 195:567-573 (2010).(2010_JPS).

Jeong et al., "A Nanostructured SiAl0.2O Anode Material for Lithium Batteries," Chem. Mater. 22:5570-5579 (2010).

Kang et al., "Enhancing the rate capability of high capacity $xLi_2MnO_3$—(1-x)LiMO2 (M=Mn, Ni, Co) electrodes by Li—Ni—PO4 treatment," Electrochemistry Communications 11:748-751 (2009).

Kang et al., Layered Li(Li0.2Ni0.15+0.5zCo0.10Mn0.55-0.5z)O2-zFz cathode materials for Li-ion secondary batteries, Journal of Power Sources 146:654-657 (2005).

Kim et al., Improvement of High-Voltage Cycling Behavior of Surface Modified Li[Ni1/3Co1/3Mn1/3]O2 Cathodes by Fluorine Substitution for Li-Ion Batteries, Journal of the Electrochemical Society 152 (9) A1707-A1713 (2005).(2005-SunYK-ECS).

Kim et al., "Synthesis of spherical Li[Ni(1/3-z)Co(1/3-z)Mn(1/3-z)Mgz]O2 as positive electrode material for lithium ion battery," Electrochimica Acta 51:2447-2453 (2006).

Lee et al., "High capacity Li[Li0.2Ni0.2Mn0.6]O2 cathode materials via a carbonate co-precipitation method," J. of Power Sources, 162:1346-1350 (2006).

Li et al. "Lithium polyacrylate as a binder for tin-cobalt-carbon negative electrodes in lithium-ion batteries," Electrochemica Acta, vol. 55 pp. 2991-2995, (2010).

Liu et al., "Electrical transport in doped multiwalled carbon nanotubes," Physical Review B, vol. 63,161404(R), pp. 1-4 (2001).

Liu et al., "Improvement of cycling stability of Si anode by mechanochemical reduction and carbon coatings." Journal of Power Sources, 189, pp. 480-484 (2009).

Magasinki et al., "High-performance lithium-ion anodes using a hierarchical bottom-up approach." Nature Materials, vol. 9, pp. 353-358, Apr. 2010.

McMillan et al. "Fluoroethylene carbonate electrolyte and its use in lithium ion batteries with graphite anodes," Journal of Power Sources 81-2: 20-26 (1999) (Abstract).

Miyachi et al., "Electrochemical Properties and Chemical Structures of Metal-Doped SiO Anodes for Li-Ion Rechargeable Batteries," J. Electrochem. Soc. 154(4):A376-A380 (2007).

Naoi et al., "Nonflammable Hydrofluoroether for Lithium-Ion Batteries: Enhanced Rate Capability, Cyclability, and Low-Temperature Performance," J. Electrochem. Soc. 156(4):A272-A276 (2009) (Abstract only).

Park et al., "Physical and electrochemical properties of spherical Li1+x(Ni1/3Co1/3Mn1/3)1-xO2 cathode materials," Journal of Power Sources, 177:177-183 (2008).

Profatilova et al., "Enhanced thermal properties of the solid electrolyte interphase formed on graphite in an electrolyte with fluoroethylene carbonate," Electrochimica Acta 54: 4445-4450 (2009).

Ruffo et al., "Impedance Analysis of Silicon Nanowire Lithium Ion Battery Anodes," J. Phys. Chem. C 113:11390-11398 (2009).

Schoenenberger et al., "Multiwall carbon nanotubes," http://physicsworld.com/cws/article/print/606 (printed Oct. 7, 2009).

Shi et al., "Nano-SnSb alloy deposited on MCMB as an anode material for lithium ion batteries," J. Materials Chemistry, 11(5):1502-1505 (2001).

Song et al., Two-and three-electrode impedance spectroscopy of lithium-ion batteries, Journal of Power Sources, 111:255-267 (2002).

Sun et al., "Significant Improvement of high voltage cycling behavior of AlF3-coated LiCoO2 cathode," Electrochemistry Communications 8:821-826 (2006).(2006 EC).

Sun et al., "The preparation and electrochemical performance of solid solutions LiCoO2—Li2MnO3 as cathode materials for lithium ion batteries," Journal of Power Sources, 159:1353-1359 (2006). (2006 JPS).

Tabuchi et al., "Li-doping process for LixSiO-negative active material synthesized by chemical method for lithium on cells," Journal of Power Sources 146:507-509 (2005).

Thackeray et al., "Comments on the structural complexity of lithium-rich Li1+xM1—xO2 electrodes (M=Mn,Ni,Co) for lithium batteries," Electrochemistry Communications 8:1531-1538 (2006).

Thackeray et al., "Li2MnO3-stabilized LiMO2 (M = Mn, Ni, Co) electrodes for lithium-ion batteries," J. Mater. Chem., 17:3112-3125 (2007).

(56) References Cited

OTHER PUBLICATIONS

Veluchamy et al., "A new SiO/C Anode Composition for Lithium-ion Battery." Journal of Power Sources 179 (2008) 367-370, published Dec. 2007.

Veluchamy et al., "Improvement of cycle behaviour of SiO/C anode compositie by thermochemically generated Li4SiO4 inert phase for lithium ion batteries," Journal of Power Sources 188:574-577 (2009).

Wang et al., "Lithium Insertion in Carbon-Silicon Composite Materials Produced by Mechanical Milling," J. Electrochem. Soc., 145(8): 2751-2758 (1998).

Wang et al., "Nano-sized SiOx-/C Composite Anode for Lithium Ion Batteries." Journal of Power Sources 196(2011)4811-4815 available Jan. 2011.

Woo et al., "Significant Improvement of Electrochemical Performance of AlF3-Coated Li[Ni0.8Co0.1Mn0.1]O2 Cathode Materials," J. of the Electrochemical Society, 154 (11) A1005-A1009 (2007).(2007-SunYK).

Wu et al., "High Capacity, Surface-Modified Layered Li[Li(1-x)/3Mn(2-x)/3Nix/3Cox/3]O2 Cathodes with Low Irreversible Capacity Loss," Electrochemical and Solid State Letters, 9(5):A221-A224 (2006).

Yakovleva et al., "Stabilized Lithium Metal Powder, Enabling Material and Revolutionary Technology for High Energy Li-ion Batteries," 2010 DOE Vehicle Technologies Program Review (Presentation).

Yamaki et al., "Characterization and Thermal Stability of SEI between a Graphite Electrode and Methyl Difluoroacetate-based Electrolyte," Abstract #236 from the 210th Meeting of the Electrochemical Society (2006).

Yang et al., "SiOx-based anodes for secondary lithium batteries." Solid State Ionics 152-153 (2002) 125-129, available Mar. 2002.

Yang et al., "Nanosized silicon-based composite derived by in situ mechanochemical reduction for lithium ion batteries," Journal of Power Sources, 164, pp. 880-884 (2007).

Yoshio et al., "Electrochemical behaviors of silicon based anode material," Journal of Power Sources 146:10-14 (2005).

Timcal Graphite & Carbon, A Synopsis of Analytical Procedures, www.timcal.com (2008).

Kim et al., "Three-Dimensional Porous Silicon Particles for Use in High-Performance Lithium Secondary Batteries." Angew. Chem. Int. Ed. 2008, 47, 10151-10154, (Year 20108).

International Search Report and Written Opinion from corresponding PCT Application No. PCT/US2018/066881 dated Apr. 12, 2019.

Chan et al., "High-performance lithium battery anodes using silicon nanowires," Nature Nanotechnology Jan. 2008, vol. 3, pp. 31-35.

Sun et al., "AlF3-Coating to Improve High Voltage Cycling Performance of Li[Ni1/3Co1/3Mn1/3]O2 Cathode Materials for Lithium Secondary Batteries," J. of the Electrochemical Society, 154 (3), A168-A172 (2007).(2007-AlF3 Coating).

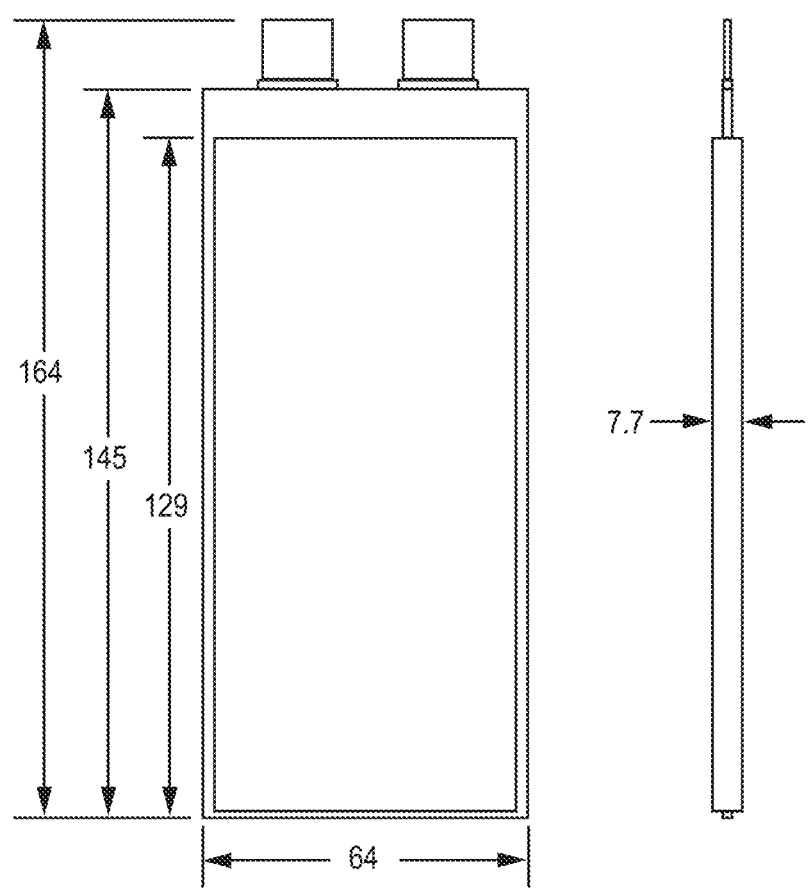
FIG. 26   FIG. 27

US 11,094,925 B2

ELECTRODES WITH SILICON OXIDE ACTIVE MATERIALS FOR LITHIUM ION CELLS ACHIEVING HIGH CAPACITY, HIGH ENERGY DENSITY AND LONG CYCLE LIFE PERFORMANCE

CROSS REFERENCE TO RELATED APPLICATIONS

This application claims priority to U.S. provisional patent application 62/609,930 filed on Dec. 22, 2017 to Venkatachalam et al., entitled "Electrodes with Silicon Oxide Active Materials for Lithium Ion Cells Achieving High Capacity and Long Cycle Life Performance and Resulting High Energy Density Cells," incorporated herein by reference.

FEDERALLY SPONSORED RESEARCH AND DEVELOPMENT

This invention was made with government support under U.S. Government Funding Agreement Number: DE-EE0006250 under the United States Advanced Battery Consortium Program Number: 14-2141-ABC awarded by the U.S. Department of Energy. The government has certain rights in the invention.

FIELD OF THE INVENTION

The invention relates to formation of negative electrodes incorporating high capacity silicon oxide active materials while achieving good cycling capabilities. The invention further relates to cells assembled from these high capacity long life cycle negative electrodes into cell with a high energy density.

BACKGROUND OF THE INVENTION

Lithium batteries are widely used in consumer electronics due to their relatively high energy density. For some current commercial batteries, the negative electrode material can be graphite, and the positive electrode materials can comprise lithium cobalt oxide ($LiCoO_2$), lithium manganese oxide ($LiMn_2O_4$), lithium iron phosphate ($LiFePO_4$), lithium nickel oxide ($LiNiO_2$), lithium nickel cobalt oxide ($LiNiCoO_2$), lithium nickel cobalt manganese oxide ($LiNiMnCoO_2$), lithium nickel cobalt aluminum oxide ($LiNiCoAlO_2$) and the like. For negative electrodes, lithium titanate is an alternative to graphite with good cycling properties, but it has a lower energy density. Other alternatives to graphite, such as tin oxide and silicon, have the potential for providing increased energy density. However, some high capacity negative electrode materials have been found to be unsuitable commercially due to high irreversible capacity loss and poor discharge and recharge cycling related to structural changes and anomalously large volume expansions, especially for silicon, that are associated with lithium intercalation/alloying. The structural changes and large volume changes can destroy the structural integrity of the electrode, thereby decreasing the cycling efficiency.

SUMMARY OF THE INVENTION

In a first aspect, the invention pertains to a lithium ion cell comprising a negative electrode, a positive electrode, a separator between the negative electrode and the positive electrode; electrolyte comprising a lithium salt and non-aqueous solvent; and a container enclosing the other cell components. The negative electrode can comprise from about 75 wt % to about 92 wt % an active material, from about 1 wt % to about 7 wt % nanoscale conductive carbon and from about 6 wt % to about 20 wt % polymer binder, in which the active material can comprise from about 40 wt % to about 95 wt % silicon oxide-based material and from about 5 wt % to about 60 wt % graphite. In some embodiments, the positive electrode comprises a nickel-rich lithium nickel cobalt manganese oxide approximately represented by the formula $LiNi_xMn_yCo_zO_2$, where $x+y+z\approx1$, $0.45 \leq x$, $0.025 \leq y \leq 0.35$, $0.025 \leq z \leq 0.35$, conductive carbon, and a polymer binder.

In another aspect, the invention pertains to a negative electrode for a lithium ion cell comprising from about 78 wt % to about 92 wt % an active material, from about 1 wt % to about 7 wt % nanoscale conductive carbon and from about 6 wt % to about 20 wt % polymer binder, wherein the polymer binder comprises at least about 50 wt % polyimide and at least about 5 wt % of a distinct second polymer binder with an elastic modulus of no more than about 2.4 GPa. In some embodiments, the distinct second polymer binder has an elongation of at least about 35%.

In a further aspect, the invention pertains to a lithium ion cell comprising a negative electrode comprising silicon oxide, graphite, nano scale conductive carbon, and a polymer binder, a positive electrode comprising a lithium nickel cobalt manganese oxide, conductive carbon, and a polymer binder, a separator between the negative electrode and the positive electrode, electrolyte comprising a lithium salt and non-aqueous solvent, and a container enclosing the other cell components. In some embodiments, the lithium ion cell has an energy density of at least 235 Wh/kg discharged from a selected charge voltage of at least about 4.25V to 2.5V at a rate of C/3 at 30° C. and has a capacity at 450 cycles at least about 80% of the capacity at the 5th cycle when cycled from the 5th cycle to the 450th cycle between 2.3V and the selected charge voltage at a rate of C/3.

In other aspects, the invention pertains to a lithium ion cell comprising a negative electrode comprising silicon oxide, graphite, nanoscale conductive carbon, and a polymer binder; a positive electrode comprising a lithium nickel cobalt manganese oxide, conductive carbon, and a polymer binder; a separator between the negative electrode and the positive electrode; electrolyte comprising a lithium salt and non-aqueous solvent; and a container enclosing the other cell components. In some embodiments, the lithium ion cell has an energy density of at least 235 Wh/kg discharged from 4.35V to 2.3V at a rate of C/3 at 30° C. and has a capacity at 450 cycles at least about 80% of the capacity at the 5th cycle when cycled from the 5th cycle to the 450th cycle between 2.3V and 4.35V at a rate of C/3.

BRIEF DESCRIPTION OF THE DRAWINGS

FIG. 26 is a front view diagram of a pouch cell designed for operation at roughly 11 Ah.

FIG. 27 is a side view diagram of the pouch cell of FIG. 26.

DETAILED DESCRIPTION OF THE INVENTION

Figure 1:
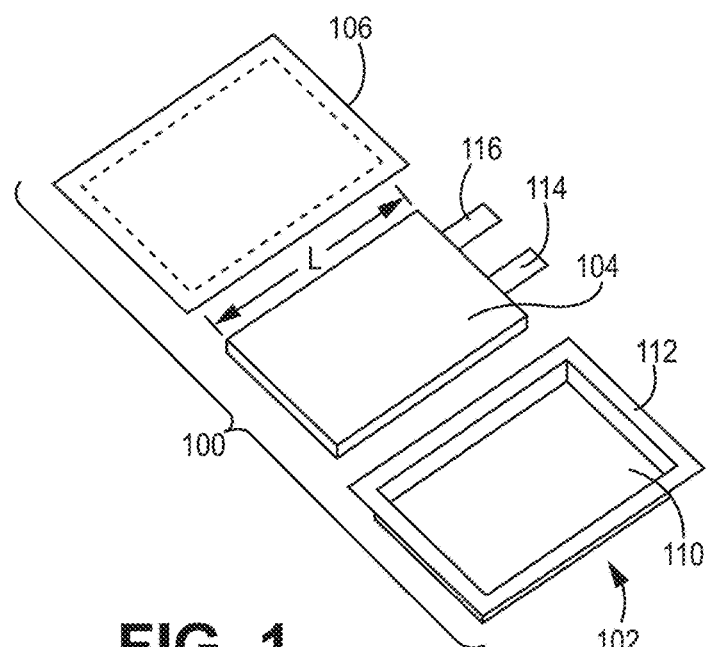
FIG. 1 is an expanded view of a pouch battery with a battery core separated from two portions of the pouch case.

Improvements in electrode design provide achievement of longer term cycling performance while taking advantage of the high specific capacity of silicon based active materials, e.g., silicon oxide. To stabilize the cycling, it has been discovered that specific features of the anode (negative electrode) design can be appropriately considered to achieve surprisingly improved cycling performance. In particular, the active material can be engineered to include a blend with a silicon based active material, but with a significant component of graphite. Furthermore, the binder characteristics have been found to also make a significant contribution to the cycling stability in some embodiments, and an advantageous blend of mechanically strong polyimide with a more elastic polymer are described herein. Nanoscale carbon can also be used in an appropriate amount to provide electrical conductivity for the electrode, even though graphite is conductive, to provide unexpected cycling improvement. These improvements, individually or combined, can then be used to form a negative electrode with a desirable capacity while achieving significant cycling stability. In some embodiments of the electrodes, cells can be formed that achieve more than 600 charge/discharge cycles while maintaining at least 80% of the initial (post formation) discharge specific capacity. These negative electrode improvements have also been discovered to be compatible with Applicant's cell designs to also correspondingly achieve a high energy density for a corresponding cell using appropriate positive electrode designs. Good cycling high energy density cells are described with positive electrodes that incorporate nickel rich, lithium nickel cobalt manganese oxide positive electrode active materials. Thus, a long cycle stability cell could be formed in a larger cell format suitable for automotive applications and other suitable applications while achieving an initial post formation energy density of at least about 235 Wh/kg.

Lithium has been used in both primary and secondary batteries. An attractive feature of lithium for cell or battery use is its light weight and the fact that it is the most electropositive metal, and aspects of these features can be advantageously captured in lithium-based batteries also. Certain forms of metals, metal oxides, and carbon materials are known to incorporate lithium ions from the electrolyte into its structure through intercalation, alloying or similar mechanisms. The positive electrode of a lithium based battery generally comprises an active material that reversibly intercalates/alloys with lithium. Lithium ion cells generally refer to cells in which the negative electrode active material is also a lithium intercalation/alloying material. As used herein and for convenience, the terms cell and battery as well as variations thereof are used interchangeably unless some explicit distinction is recited.

The batteries described herein are lithium ion batteries that use a non-aqueous electrolyte solution which comprises lithium cations and suitable anions. For secondary lithium ion batteries during charge, oxidation takes place in the cathode (positive electrode) where lithium ions are extracted and electrons are released. During discharge, reduction takes place in the cathode where lithium ions are inserted and electrons are consumed. Similarly, during charge, reduction takes place at the anode (negative electrode) where lithium ions are taken up and electrons are consumed, and during discharge, oxidation takes place at the anode with lithium ions and electrons being released. Unless indicated otherwise, performance values referenced herein are at room temperature, i.e., about 23±2° C. As described below some of the testing of the silicon based active materials is performed in lithium cells with a lithium metal electrode (referred to as half-cells) or in lithium ion cells with a positive electrode comprising a lithium metal oxide (referred to as full cells). In a half cell with a silicon based electrode, the lithium electrode acts as the negative electrode, and the silicon based electrode acts as the positive electrode, which is opposite of its usual role as the negative electrode in a lithium ion cell.

The word "element" is used herein in its conventional way as referring to a member of the periodic table in which the element has the appropriate oxidation state if the element is in a composition and in which the element is in its elemental form, M°, when stated to be in an elemental form. Therefore, a metal element generally is only in a metallic state in its elemental form or an appropriate alloy of the metal's elemental form. In other words, a metal oxide or other metal composition, other than metal alloys, generally is not metallic.

When lithium ion batteries are in use, the uptake and release of lithium from the positive electrode and the negative electrode induces changes in the structure of the electroactive material. As long as these changes are essentially reversible, the capacity of the material does not change with cycling. However, the capacity of the active materials is observed to decrease with cycling to varying degrees. Thus, after a number of cycles, the performance of the cell falls below acceptable values, and the cell is replaced. Also, on the first cycle of the cell, generally there is an irreversible capacity loss that is significantly greater than per cycle capacity loss at subsequent cycles. The irreversible capacity loss (IRCL) is the difference between the charge capacity of the new cell and the first discharge capacity. Positive electrodes based on lithium metal oxides can exhibit some IRCL which results in some compensation for the negative electrode with respect to lithium available for cycling. The irreversible capacity loss can result in a corresponding decrease in the capacity, energy and power for the cell due to changes in the cell materials during the initial cycle.

Elemental silicon as well as other silicon based active materials have attracted significant amount of attention as a potential negative electrode material due to silicon's very high specific capacity with respect to intake and release of lithium. Elemental silicon forms an alloy with lithium, which can theoretically have a lithium content corresponding with more than 4 lithium atoms per silicon atom (e.g., $Li_{4.4}Si$). Thus, the theoretical specific capacity of silicon is on the order of 4000-4400 mAh/g, which is significantly larger than the theoretical capacity of about 370 mAh/g for graphite. Graphite is believed to intercalate lithium to a level of roughly 1 lithium atom for 6 carbon atoms ($LiC_6$). Also, elemental silicon, silicon alloys, silicon composites and the like can have a low potential relative to lithium metal similar to graphite. However, silicon undergoes a very large volume change upon alloying with lithium. A large volume expansion on the order of two to three times of the original volume or greater has been observed, and the large volume changes have been correlated with a significant decrease in the cycling stability of batteries having silicon-based negative electrodes. Silicon suboxides, i.e., $SiO_x$, x<2, have also been found to be desirable active materials for lithium based batteries, which can have in some embodiments high specific capacities with respect to lithium alloying. The reference to silicon suboxide provides acknowledgement of silicon dioxide as the fully oxidized form of silicon. For convenience, silicon suboxide may be generally referred to as silicon oxide, which is not limited to silicon monoxide (SiO) unless specifically indicated.

In embodiments of particular interest, the silicon based active materials can comprise elemental silicon and/or silicon suboxide as a primary active material. Silicon suboxide has been found particularly effective to achieve longer cycling stability. To stabilize the silicon based active materials as well as to increase electrical conductivity, carbon can be incorporated into a composite active material. With respect to carbon composites with nanoscale elemental silicon and/or silicon oxide, long cycling stability has remained elusive, although Applicant has achieved moderate cycling stability for consumer electronics applications, as described below. Longer cycling stability is described herein based on mixtures of electroactive graphite and silicon based composites along with other electrode design improvements. As discussed in detail below, the stabilized silicon based electrodes can further comprise additional conductive sources, such as nanoscale carbon as well as improved binder blends that also contribute significantly to cycling stability.

The active materials for lithium ion secondary cells herein generally include, for example, a positive electrode (i.e., cathode) active material with a moderately high average voltage against lithium and a silicon based active material for the negative electrode (i.e., anode). In general, various cathode materials can be used. For example, commercially available cathode active materials can be used with existing commercial production availability. Such cathode active materials include, for example, lithium cobalt oxide (LiCoO$_2$), LiNi$_{1/3}$Mn$_{1/3}$Co$_{1/3}$O$_2$ (L333 or NMC111), LiNiCoAlO$_2$ (NCA), other lithium nickel manganese cobalt oxides (NMC), $LiMn_2O_4$ (lithium manganese oxide spinel), modified versions thereof, or mixtures thereof.

Nickel rich-lithium nickel cobalt manganese oxides ($LiNi_xMn_yCo_zO_2$, 0.45≤x, 0.05≤y, z≤0.35) can be of interest due to lower costs and lower flammability risk relative to lithium cobalt oxide as well as the ability to cycle at higher voltages. Results are presented with the nickel rich-lithium nickel manganese cobalt oxide active materials paired with the improved silicon based negative electrodes to form cell with good cycling stability and high energy density. Also, recently developed materials with a high specific capacity, which have a layered crystal structure and are lithium rich relative to a $LiMO_2$ (M=non-lithium metal) reference composition, are described, for example, in U.S. Pat. No. 8,389,160 to Venkatachalam et al. (hereinafter the '160 patent), entitled "Positive Electrode Materials For Lithium Ion Batteries Having a High Specific Discharge Capacity And Processes for the Synthesis of These Materials," and U.S. Pat. No. 8,465,873 to Lopez et al (hereinafter the '873 patent), entitled "Positive Electrode Materials for High Discharge Capacity Lithium Ion Batteries," both of which are incorporated herein by reference. It has been discovered that a blend of the lithium rich+manganese rich NMC and the nickel rich-NMC positive electrode active compositions can provide particularly desirable cell properties and good cycling stability, as discussed further below.

Specifically, desirable cycling results can be obtained from nickel-rich-lithium nickel manganese cobalt oxide (N-NMC), which can be represented by the formula $LiNi_xMn_yCo_zO_2$, with x≥0.45 and x+y+z≈1. Commercially available formulations of these compounds include, for example, $LiNi_{0.5}Mn_{0.3}Co_{0.2}O_2$ (BASF), $LiNi_{0.6}Mn_{0.2}Co_{0.2}O_2$ (Targray, Canada), $LiNi_{0.8}Mn_{0.1}Co_{0.1}O_2$ (Targray, Canada and LG Chemical). In the industry, both NCM and NMC are used interchangeably with the cobalt and manganese listed in the corresponding order, and the presentations are equivalent and just based on a personal preference. Improved cycling stability can be achieved with a blend of nickel rich NMC and lithium rich+manganese rich-lithium nickel manganese cobalt oxide, which can be referred to as high capacity manganese rich compositions (HCMR®). In general, the electrodes with a combination of electroactive compositions comprise significant quantities of both materials, generally at least about 5 weight percent each relative to the total active material of the electrode. Cell performance suggests that the blend of these active materials cycle better than the N-NMC material alone at higher charge voltages, while the N-NMC material provides other desirable cell properties.

The positive electrode active materials can have a stabilization coating. Stabilization nanocoatings for positive electrode active materials are described further in published U.S. patent application 2011/0111298 to Lopez et al., entitled "Coated Positive Electrode Materials for Lithium Ion Batteries," U.S. Pat. No. 8,535,832 to Karthikeyan et al., entitled "Metal Oxide Coated Positive Electrode Materials for Lithium-Based Batteries," and U.S. Pat. No. 8,663,849 to Venkatachalam et al., entitled "Metal Halide Coatings on Lithium Ion Battery Positive Electrode Materials and Corresponding Batteries," all three of which are incorporated herein by reference. In particular, cycling of lithium rich+manganese rich nickel manganese cobalt oxide electrodes can be improved significantly with these stabilization coatings.

As noted above, silicon based electrodes provide challenges with respect to obtaining suitable cycling for commercial applications. For consumer electronic applications, a reasonable cycling target can be roughly 250-450 cycles without an unacceptable loss of performance, but for vehicle and similar larger capacity applications, a greater cycling stability is desired. Applicant has achieved suitable cell designs for consumer electronics applications that can achieve appropriate performance using silicon based anodes. These batteries are described in published U.S. patent application 2015/0050535 to Amiruddin et al. (hereinafter the '535 application), entitled "Lithium Ion Batteries With High Capacity Anode Material and Good Cycling for Consumer Electronics," incorporated herein by reference. The new electrode designs herein provide for cycling beyond the target cycling stabilities for consumer electronics and while achieving suitable performance for vehicle and other high capacity applications.

As with silicon, oxygen deficient silicon oxide, e.g., silicon oxide, $SiO_x$, 0.1≤x≤1.9, can intercalate/alloy with lithium such that the oxygen deficient silicon oxide can perform as an active material in a lithium based cell. The silicon oxide can incorporate a relatively large amount of lithium such that the material can exhibit a large specific capacity. However, silicon oxide is also observed generally to have a capacity that fades relatively quickly with cell cycling. Commercial silicon based material comprising SiO, which from some suppliers may be in a composite with carbon and silicon nanocrystals, is available from Alfa Aesar (USA), Sigma-Aldrich (USA), Shin-Etsu (Japan), Osaka Titanium Corporation (Japan), and Nanostructured and Amorphous Materials Corp. (USA). Additional specific suitable formulations of the silicon based compositions are described further below. Applicant has achieved cycling stabilization of silicon oxide based active materials using the electrode formulations described herein. In some embodiments, it can be desirable to have negative electrodes comprising a combination of graphitic carbon active material and silicon based active material to extend cycling life with an acceptable decrease in specific capacity, and the superior cycling performance herein uses such active material blends.

To achieve the results described herein, several improvements in design are examined individually or combined to provide improved cycling performance, and at least for some embodiments the combination of specific electrode features can provide surprising synergistic performance improvements for longer cycling stability. In particular, the negative electrodes can be designed with a composite binder having a high tensile strength while introducing some elongation capability. Nanoscale conductive carbon, such as carbon nanotubes, carbon black, carbon nanofibers, or combinations thereof, as an electrically conductive electrode additive have been found to improve cycling of the negative electrodes with the silicon based active material. Electrolytes can be provided with excellent cycling at higher voltages >4.3V. These features can be combined with a design of electrode loading and density that provides good energy densities based performance for the resulting consumer electronics cell designs. The cycling can be further improved with the addition of supplemental lithium into the cell and/or with an adjustment of the balance of the active materials in the respective electrodes.

The graphite component of the active material blends in the negative electrodes can provide electrical conductivity. Nevertheless, it is found that an appropriate amount of nanoscale carbon can further stabilize the negative electrodes with respect to cycling. Nanoscale carbon can take the form of carbon nanotubes, carbon nanofibers, or carbon nanoparticles, such as carbon black. The usefulness of nanoscale conductive carbon for cycling stability of silicon based negative electrodes was previously discovered as described in U.S. Pat. No. 9,190,694B2 to Lopez et al., entitled "High Capacity Anode Materials for Lithium Ion Batteries," and U.S. Pat. No. 9,780,358B2 to Masarapu et al., entitled "Battery Designs With High Capacity Anode Materials and Cathode Materials," both of which are incorporated herein by reference. Generally, the electrodes comprise at least about 1 wt percent nanoscale conductive carbon to achieve stable cycling.

In a lithium ion cell, reactive lithium for cycling is generally provided in the positive electrode active material, which is transferred to the negative electrode during the initial charge of the cell where it is then available for discharge of the cell. The silicon based negative electrodes generally can exhibit a large irreversible capacity loss during the first charge of the cell The loss of capacity can generally be associated with corresponding irreversible changes to the materials during the initial charge of the cell. For example, a solid electrolyte interphase (SEI) layer forms in association with the negative electrode active material as a result of reactions with typical electrolytes used in the cells. The SEI layer can stabilize the cell during cycling if a stable SEI layer is formed. Presumably other irreversible changes take place with respect to the silicon based active composition. The first cycle irreversible capacity loss is generally significantly larger than any per cycle loss of capacity associated with subsequent cycling of the cell, although the second, third and a few additional cycles may still have greater per cycle capacity loss due to a carryover of initial changes into the first few cycles rather than being fully accomplished in the first cycle. A relatively large irreversible capacity loss (IRCL) can decrease the cycling capacity as well as the energy output and power output of the cell during cycling. In larger format cells, capacity can increase at lower numbers of cycles, due to practical effects, which may be, for example, improved permeation of the electrolyte through an electrode stack.

To reduce the loss of energy output and power output of the cell as a result of the irreversible capacity loss, supplemental lithium can be included to provide additional lithium into the cell. The introduction of supplemental lithium can reduce the introduction of cathode active material that does not cycle due to loss of active lithium capacity associated with the IRCL. Supplemental lithium refers to active lithium that is introduced directly or indirectly into the cell, distinct from the positive electrode active material, to replace lithium lost to irreversible processes as well as to provide other beneficial effects. Applicant has discovered that supplemental lithium provided in greater amounts than corresponding to compensation for irreversible capacity loss can further stabilize cycling. In the context of lithium rich+manganese rich nickel manganese cobalt oxides, positive electrode active materials, this cycling stabilization is described in U.S. Pat. No. 9,166,222 to Amiruddin et al (hereinafter the '222 patent), entitle "Lithium Ion Batteries With Supplemental Lithium," incorporated herein by reference.

Various approaches for the introduction of supplemental lithium can be used including, for example, addition of a lithium active material (e.g. lithium metal powder or foil) to the negative electrode, addition of a sacrificial lithium source to the positive electrode, inclusion of a sacrificial lithium electrode to the cell structure, electrochemical pre-lithiation of the negative electrode, or the like. These approaches are described further in the '222 patent and published U.S. patent application 2011/0111294 to Lopez et al. (hereinafter the '294 application), entitled "High Capacity Anode Materials for Lithium Ion Batteries," both of which are incorporated herein by reference. In some embodiments, it has been found that an electrochemical approach can be convenient, such as the approach described in published PCT application, WO 2013/082330 to Grant et al., entitled "Method for Alkaliating Anodes," incorporated herein by reference. In general, the supplemental lithium can be introduced in a quantity to compensate for a portion of the irreversible capacity loss, approximately all of the irreversible capacity loss, or a greater amount than the irreversible capacity loss, but generally no more than 30% of the capacity of the negative electrode active material above the irreversible capacity loss. In some embodiments the supplemental lithium can compensate for from about 90% to about 200% of the anode first cycle irreversible capacity loss.

Applicant's previous work has found that cycling of silicon based anodes is significantly facilitated by the use of a high tensile strength polymer binder, which can be satisfied by appropriate polyimides. Specifically, the polymer binder can have a tensile strength of at least about 60 MPa. For extending the cycling stability even longer, it was discovered that a polymer binder blend may provide further improved cycling performance. One component of the polymer binder blend can be a high tensile strength polymer, such as polyimide, and the second polymer can have a lower value of Young's modulus (elastic modulus) to provide a more elastic polymer, such as polyvinylidene fluoride, carboxymethyl cellulose, styrene-butadiene rubber, lithiated polyacrylic acid, or mixtures thereof. While providing tensile strength, the polymer binder should also provide good adhesion such that the electrode remains laminated to the current collector. The desired blends can comprise at least about 50 wt % high tensile strength polymer and at least about 5 wt % polymer binder with a Young's modulus of no more than about 2.4 GPa and for some embodiments an elongation of at least about 35%.

The anode design generally involves a balance of factors to achieve target energy densities and power densities while still providing for reasonable cycling. As seen in results in the Examples below, the batteries with silicon based anode active materials have been able to cycle for over six hundreds cycles while maintaining over 80% of the cell capacity. At the same time, the realistic negative electrode design can be matched up with reasonable positive electrode designs to achieve good cycling as well as high values of energy density. Electrode designs are described in detail below as well as the balance of design features to achieve these accomplishments.

In general, the electrode designs described herein can be adapted for cylindrical cells or more rectangular or prismatic style batteries. Cylindrical batteries generally have wound electrode structures while prismatic shaped batteries can have either wound or stacked electrodes. In general, to achieve desired performance capacities with appropriate electrode design with respect to electrode loadings and densities, the cell can comprise a plurality of electrodes of each polarity that can be stacked with separator material between electrodes of a cell. Winding of the electrodes can provide a similar effect with a reasonable internal resistance due to electron conductivities and ion mobilities as well as good packing of the electrodes within an appropriate container. The size of the batteries generally affects the total capacity and energy output of the cell. The designs described herein are based on obtaining desirably high energy density while providing desirable cycling of the cell based on a silicon based active material.

Electrode Structures

The electrodes of the cell comprise the active material along with a binder and conductive additives. The electrodes are formed into a sheet, dried and pressed to achieve a desired density and porosity. The electrode sheets are generally formed directly on a metal current collector, such as a metal foil or a thin metal grid. For many cell structures, electrode layers are formed on both sides of the current collector to provide for desirable performance in the assembled cell or battery. The electrode layers on each side of the current collector can be considers elements of the same electrode structure since they are at the same potential in the cell, but the current collector itself, while part of the electrode structure is not generally considered part of the electrode since it is electrochemically inert. Thus, references to the physical aspects of an electrode generally refer to one layer of electrode composition within the electrode structure. An electrically conductive current collector can facilitate the flow of electrons between the electrode and an exterior circuit.

In some embodiments, when the positive electrode or negative electrode uses a high loading level, the density of the electrode can be reduced to provide good cycling stability of the electrode. The density of the electrodes is a function, within reasonable ranges, of the press pressures. Generally, the density of the electrodes cannot be arbitrarily increased without sacrificing performance with respect to loading levels while achieving desired cycling performance and capacity at higher discharge rates. The characterization of the specific negative electrode layers and positive electrode layers are presented in the following sections.

In some embodiments, a current collector can be formed from nickel, aluminum, stainless steel, copper or the like. An electrode material can be cast as a thin film onto a current collector. The electrode material with the current collector can then be dried, for example in an oven, to remove solvent from the electrode. In some embodiments, a dried electrode material in contact with a current collector foil or other structure can be subjected to a pressure from about 2 to about 10 kg/cm$^2$ (kilograms per square centimeter). The current collector used in the positive electrode can have a thickness from about 5 microns to about 30 microns, in other embodiments from about 10 microns to about 25 microns, and in further embodiments from about 14 microns to about 20 microns. In one embodiment, the positive electrode uses an aluminum foil current collector. The current collector used in the negative electrode can have a thickness from about 2 microns to about 20 microns, in other embodiments from about 4 microns to about 14 microns, and in further embodiments from about 6 microns to about 10 microns. In one embodiment, the negative electrode uses copper foil as current collector. A person of ordinary skill in the art will recognize that additional ranges of current collector thicknesses within the explicit ranges above are contemplated and are within the present disclosure.

Negative Electrodes

The basic electrode design comprises a blend of active compositions, polymer binder, and an electrically conductive diluent. As noted above, in some embodiments, the improved electrode designs can involve a polymer binder blend and a blend of active compositions as well as nanoscale conductive carbon additives. The active material blend can comprise a majority of silicon based active material, such as a silicon oxide composite, and at least 10 weight percent of distinct graphite. Also, it has been discovered that stabilization of the electrode cycling with silicon based active materials can obtained with a blend of polyimide to provide high mechanical strength with a portion of a more deformable polymer that still provides good electrode performance in a synergistic binder blend. While the graphite can provide electrical conductivity to the electrode, it has also been found that in some embodiments a quantity of distinct nanoscale conductive carbon nevertheless can be significant toward the ability to produce a long cycling negative electrode. In general the nanoscale conductive carbon is not believed to be electrochemically active while the graphite is electrochemically active. These improved design aspects are then incorporated into electrodes with further previously discovered silicon based electrode improvements.

Significant interest has been directed to high capacity negative electrode active material based on silicon. Silicon based active materials generally have not achieved suitable cycling stability for automotive use for batteries containing significant quantities of silicon. The '535 application has demonstrated successful cycling suitable for consumer electronics applications and the like with cycling up to around 200-300 cycles at values of at least 80% initial capacity. Applicant has had particular success with respect to cycling stability has been achieved using materials primarily based on silicon oxide composites. Herein, electrodes are provided that can be successfully cycled for more than 600 cycles without a drop in capacity below 80% with cycling over a large voltage range at a reasonable rate. Thus, the present work is directed to extending cycling stability into a realm suitable for automotive use.

As described herein, improved cycling results are obtained with a blended active composition with a silicon based active material and graphitic carbon. Generally, an overall capacity of the negative electrode blended active material can be at least about 750 mAh/g, in further embodiments at least about 900 mAh/g, in additional embodiments at least about 1000 mAh/g, and in other embodiments at least about 1100 mAh/g cycled against lithium metal from 5 millivolts (mV) to 1.5V at a rate of C/3. The blended active material can comprise at least about 40 wt % silicon based active material, in further embodiments at least about 50 wt % silicon based active material, in other embodiments from about 55 wt % to about 95 wt % silicon based active material, and in additional embodiments from about 60 wt % to about 90 wt % silicon based active material. Correspondingly, the blended active material can comprise from about 5 wt % graphite to about 60 wt % graphite, in further embodiments from about 7 wt % graphite to about 50 wt % graphite, in additional embodiments from about 8 wt % graphite to about 45 wt %, and in other embodiments from about 10 wt % graphite to about 40 wt % graphite. A person of ordinary skill in the art will recognize that additional ranges of specific discharge capacity and concentrations of silicon based active material within the explicit ranges above are contemplated and are within the present disclosure.

As noted above and described in detail below, suitable silicon based active materials can comprise a composite with a carbon component. Silicon based active materials are discussed in detail in the following section. A composite refers to a particulate material with components that are intimately combined into an integral material with effective uniformity over appropriate scales, in contrast with blends that involve mixtures held together with a polymer binder. Composite components that can comprise, for example, silicon, oxygen, carbon and the like. While not wanting to be limited by theory, it is not generally believed that a carbon component of a composite with silicon is active in electrochemistry and generally not graphitic, although the activity is an abstract concept given the intimate combination in the composite and the crystal structure may be extremely complex and difficult to evaluate. In any case, the carbon component of a composite material is readily understood by a person of ordinary skill in the art to be distinguishable from the distinct graphite not in a composite in active material blends. The examples below are based on a commercial composite composition believed to be comprising primarily of silicon suboxide with some amounts of elemental silicon crystals and elemental carbon in a combined composite particulate material.

Graphite is available commercially in natural and synthetic forms, and suitable graphite includes either natural or synthetic graphite or the like. Graphite is a crystalline form of carbon with covalently bonded carbon in sheets. As used herein, graphite refers to graphitic carbon without requiring perfect crystallinity, and some natural graphite materials can have some crystalline impurities. But the graphite refers generally to a material dominated by a graphitic structure, as would be recognized in the art. Graphite is electrically conductive along the plane of the covalent carbon sheets that are stacked in the crystal. The crystalline carbon in graphitic forms can intercalate lithium, so that it is an established electrochemically active material for lithium ion batteries.

Graphite particles can have average particle diameters from about 1 micron to about 30 microns, in further embodiments from about 1.5 microns to about 25 microns, and in other embodiments from about 2 microns to about 20 microns. In general, it is desirable for the graphite to not include particles greater than the electrode thickness to avoid a bumpy electrode surface, and graphitic particles with a size significantly less than a micron can be less crystalline. In some embodiments, the graphitic carbon can have a D50 (mass median diameter) from about 5 microns to about 50 microns, in further embodiments from about 7 microns to about 45 microns and in additional embodiments from about 10 microns to about 8 microns to about 40 microns. Also, in some embodiments the BET surface area of graphitic carbon active material (which can be evaluated according to ISO 4652) can be from about 1 $m^2/g$ to about 100 $m^2/g$, in further embodiments from about 5 $m^2/g$ to about 85 $m^2/g$ and in additional embodiments from about 7.5 $m^2/g$ to about 60 $m^2/g$. A person of ordinary skill in the art will recognize that additional ranges of particle size and surface area for graphitic carbon active materials are contemplated and are within the present disclosure. In comparison, electrically conductive carbon blacks or the like (which have been referred to as paracrystalline) generally have surface areas of at least roughly 40 $m^2/g$ to 1000 $m^2/g$ or greater.

With respect to the polymer binder, Applicant has obtained reasonable cycling of silicon based cells using high tensile strength binders, e.g., polyimide binder. See U.S. Pat. No. 9,601,228 to Deng et al. (hereinafter the '228 patent) entitled: "Silicon Oxide Based High Capacity Anode Materials for Lithium Ion Batteries," incorporated herein by reference. In some embodiments to obtain longer cycling stability, it has been surprisingly found that a polymer binder blend further stabilizes cycling. In particular, a second polymer or combination of polymers providing a lower elastic modulus (corresponding with greater elasticity) can be blended with high tensile strength polyimide. The binder blend generally comprises at least about 50 wt % polyimide, in further embodiments at least about 55 wt % and in other embodiments from about 60 wt % to about 95 wt % polyimide. Similarly, the binder blend generally comprises at least about 5 wt % polymer with a lower elastic modulus, in further embodiments at least about 10 wt %, and in other embodiments from about 12 wt % to about 40 wt % lower elastic modulus polymer, as specified further below. A person of ordinary skill in the art will recognize that additional ranges of polymer quantities within the explicit ranges above are contemplated and are within the present disclosure. The polymers of the blend can be selected to be soluble in the same solvents.

Polyimides are polymers based on repeat units of the imide monomer structure. The polyimide polymer chain can be aliphatic, but for high tensile strength applications, the polymer backbone generally is aromatic with the polymer backbone extending along the N-atom of the polyimide structure. For silicon-based anodes that exhibit significant morphological changes during cycling, thermally curable polyimide polymers have been found desirable for high capacity negative electrodes, which may be due to their high mechanical strength. The following table provides suppliers of high tensile strength polyimide polymers, and names of corresponding polyimide polymers.

| Supplier | Binder |
|---|---|
| New Japan Chemical Co., Ltd. | Rikacoat PN-20; Rikacoat EN-20; Rikacoat SN-20 |
| DuPont | Kapton ® |
| AZ Electronic Materials | PBI MRS0810H |
| Ube Industries. Ltd. | U-Varnish S; U-Varnish A |
| Maruzen petrochemical Co., Ltd. | Bani-X (Bis-allyl-nadi-imide) |
| Toyobo Co., Ltd. | Vyromax ® HR16NN |

The polyimide polymers can have a tensile strength of at least about 60 MPa, in further embodiments at least about 100 MPa and in other embodiments at least about 125 MPa. Some commercial polyimides with high tensile strength can also have relatively high elongation values, which is the amount of elongation tolerated before the polymer tears. In some embodiments, the polyimides can have an elongation of at least about 40%, in further embodiments at least about 50% and in other embodiments at least about 55%. Tensile strengths and elongation values can be measured according to procedures in ASTM D638-10 Standard Test Method for Tensile Properties of Plastics or ASTM D882-91 Standard Test Method for Tensile Properties of Thin Plastic Sheeting, both of which are incorporated herein by reference. Based on values reported by commercial suppliers, the results from these alternative ASTM protocols seem similar to each other for polyimides. A person of ordinary skill in the art will recognize that additional ranges of polymer properties within the explicit ranges above are contemplated and are within the present disclosure.

Suitable more flexible polymer components can be selected to be inert with respect to the electrochemistry of the cell and to be compatible with processing with the polyimide. In particular, suitable more flexible polymer components include, for example, polyvinylidene fluoride (PVdF), carboxy methyl cellulose (CMC), styrene-butadiene rubber (SBR), lithiated polyacrylic acid (LiPAA), or mixtures thereof. With respect to polymer properties, some significant properties for high capacity negative electrode application are summarized in the following table.

| Binder | Elongation | Tensile Strength (MPa) | Elastic Modulus (GPa) |
|---|---|---|---|
| PVDF | 5-50% | 30-45 | 1.0-2.5 |
| Polyimide | 30-100% | 60-300 | 2.5-7 |

-continued

| Binder | Elongation | Tensile Strength (MPa) | Elastic Modulus (GPa) |
|---|---|---|---|
| CMC | 30-40% | 10-15 | 1-5 |
| SBR | 400-600% | 1-25 | 0.01-0.1 |
| LiPAA | 1-6% | 90 | 1-4 |

PVDF refers to polyvinylidene fluoride, CMC refers to sodium carboxy methyl cellulose, SBR refers to styrene-butadiene rubber, and LiPAA refers to lithiated polyacrylic acid. PVDF, CMC, and SBR are available commercially from many sources. LiPAA can be made from LiOH and commercial polyacrylic acid (PAA). For example, a stoichiometric amount of LiOH can be added to a solution of PAA with one mole of LiOH per monomer unit of PAA. The formation and use of LiPAA is described further in Li et al., "Lithium polyacrylate as a binder for tin-cobalt-carbon negative electrodes in lithium-ion batteries," Electrochemica Acta 55 (2010)2991-2995, incorporated herein by reference.

The elongation refers to the percent elongation prior to tearing of the polymer. In general, to accommodate the silicon based materials, it is desirable to have an elongation of at least about 30%, in some embodiments at least about 50%, and in further embodiments at least about 70%. For the polymer binder blend, it can be desirable for the more elastic polymer binder component to have an elastic modulus (alternatively referred to as Young's modulus or tensile modulus) of no more than about 2.4 GPa, in further embodiments no more than about 2.25 GPa, in other embodiments no more than about 2 GPa, and in additional embodiments no more than about 1.8 GPa. A person of ordinary skill in the art will recognize that additional ranges of more elastic polymer component properties within the explicit ranges above are contemplated and are within the present disclosure.

To form the electrode, the powders can be blended with the polymer in a suitable liquid, such as a solvent for dissolving the polymer. Polyimides and PVdF can generally be processed in N-methyl pyrrolidone (NMP), although other suitable organic solvents may be used. Water processable polyimides are commercially available, and these water processable are suitable for blending with a wider range of other polymers. The particulate components of the electrode, i.e., the active material and nanoscale conductive carbon, can be blended with the polymer binder blend in the solvent to form a paste. The resulting paste can be pressed into the electrode structure.

The active material loading in the binder can be large. In some embodiments, the negative electrode has from about 75 to about 92 wt % of negative electrode active material, in other embodiments from about 77 to about 90 wt % of the negative electrode active material, and in further embodiments from about 78 to about 88 wt % of the negative electrode active material. In some embodiments, the negative electrode has from about 6 to about 20 wt % polymeric binder, in other embodiments about 7 to 19 wt % polymeric binder, and in further embodiments from about 8 to 18 wt % polymeric binder. Also, in some embodiments, the negative electrode comprises from about 1 to about 7 wt % nanoscale conductive carbon, in further embodiments from about 1.5 to about 6.5 wt %, and in additional embodiments from about 2 to about 6 wt % nanoscale conductive carbon. A person of ordinary skill in the art will recognize that additional ranges of polymer loadings within the explicit ranges above are contemplated and are within the present disclosure.

For improved cycling negative electrodes, nanoscale carbon additives or combinations thereof have been found to be particularly desirable. Nanoscale conductive carbon refers generally to particles of high surface area elemental carbon having at least two dimensions of the primary particles being submicron. Suitable nanoscale conductive carbon includes, for example, carbon black, carbon nanotubes and carbon nanofibers. In some embodiments, the nanoscale conductive carbon additive used in the negative electrode can comprise carbon nanotubes, carbon nanofibers, carbon nanoparticles (e.g., carbon black), or combinations thereof. In some embodiments, to achieve improved performance a conductive additive can have a conductivity of at least about 40 S/cm, in some embodiments at least about 50 S/cm, and in further embodiments at least about 60 S/cm. A person of ordinary skill in the art will recognize that additional ranges of particles loadings and conductivities within the explicit ranges about are contemplated and are within the present disclosure.

Electrical conductivity, which is the inverse of resistivity, can be reported by distributors, and the conductivity is generally measured using specific techniques developed by the distributors. For example, measurements of carbon black electrical resistance is performed between two copper electrodes with Super P™ carbon blacks, see Timcal Graphite & Carbon, A Synopsis of Analytical Procedures, 2008, www.timcal.com. Suitable supplemental electrically conductive additives can also be added to contribute to longer term cycling stability. Alternatively, some suppliers describe the conductive carbon concentrations to achieve the conductive percolation threshold.

Carbon black refers to synthetic carbon materials and can alternative be referred to as acetylene black, furnace black, thermal black or other names suggesting the synthesis approach. Carbon black generally is referred to as amorphous carbon, but there are suggestions of small domains with short or medium range order corresponding to graphite or diamond crystal structure in at least some forms of carbon black, but for practical purposes the material can be considered amorphous. Under ISO Technical Specification 80004-1 (2010) carbon black is a nanostructured material. The primary particles of carbon black can be on the order of tens of nanometers or less, but the primary particles are generally hard fused into chains or other aggregates, and the smallest dispersible units can be considered between about 80 nm and 800 nm, which is still submicron. Carbon blacks are available commercially that have been synthesized to provide a desirable level of electrical conductivity, such as Super-P® (Timcal), Ketjenblack® (Akzo Nobel), Shawinigan Black® (Chevron-Phillips), and Black Pearls 2000® (Cabot).

Carbon nanofibers are high aspect ratio fibers that generally comprise graphene layers in plates, cones or other forms, which carbon nanotubes comprise graphene sheets folded into tubes. Carbon nanofibers can have diameters of 250 nm or less and are commercially available, for example, Pyrograf® carbon nanofibers (Pyrograf Products, Inc.) or from American Elements, Inc. Carbon nanotubes have been found to be a desirable conductive additive that can improve cycling performance for either a positive electrode or a negative electrode. Single wall or multiwall carbon nanotubes are also available from American Elements, Inc. (CA, USA), Cnano Technologies (China), Fuji, Inc. (Japan), Alfa Aesar (MA, USA) or NanoLabs (MA, USA).

The positive electrode and negative electrode used in the batteries described herein can have high active material loading levels along with reasonably high electrode density. For a particular active material loading level, the density is inversely correlated with thickness so that an electrode with a greater density is thinner than an electrode with a lower density. Loading is equal to the density times the thickness. In some embodiments, the negative electrode of the battery has a loading level of negative electrode active material that is at least about 1.5 mg/cm$^2$, in other embodiments from about 2 mg/cm$^2$ to about 8 mg/cm$^2$, in additional embodiments from about 2.5 mg/cm$^2$ to about 6 mg/cm$^2$, and in other embodiments from about 3 mg/cm$^2$ to about 4.5 mg/cm$^2$. In some embodiments, the negative electrode of the battery has an active material density in some embodiment from about 0.5 g/cc (cc=cubic centimeters (cm$^3$)) to about 2 g/cc, in other embodiment from about 0.6 g/cc to about 1.5 g/cc, and in additional embodiments from about 0.7 g/cc to about 1.3 g/cc. Similarly, the silicon oxide based electrodes can have an average dried thickness of at least about 15 microns, in further embodiments at least about 20 microns and in additional embodiments from about 25 microns to about 75 microns. The resulting silicon oxide based electrodes can exhibit capacities per unit area of at least about 3.5 mAh/cm$^2$, in further embodiments at least about 4.5 mAh/cm$^2$ and in additional embodiments at least about 6 mAh/cm$^2$. A person of ordinary skill in the art will recognize that additional ranges of active material loading level and electrode densities within the explicit ranges above are contemplated and are within the present disclosure.

High Capacity Silicon Based Anode Materials

In general, the battery designs herein are based on a high capacity anode active material. Specifically, the anode active materials generally have a specific capacity of at least about 800 mAh/g, in further embodiments at least about 900 mAh/g, in additional embodiments at least about 1000 mAh/g, in some embodiments at least about 1150 mAh/g and in other embodiments at least about 1400 mAh/g when cycled at a rate of C/10 against lithium metal from 0.005V to 1.5V. As this implies, the specific capacity of negative electrode active material can be evaluated in a cell with a lithium metal counter electrode. However, in the batteries described herein, the negative electrodes can exhibit reasonably comparable specific capacities when cycled against high capacity lithium metal oxide positive electrode active materials. In the battery with non-lithium metal electrodes, the specific capacity of the respective electrodes can be evaluated by dividing the battery capacity by the respective weights of the active materials. As described herein, desirable cycling results can be obtained with a combination of a silicon based active material and a graphitic carbon active material with good capacities observed.

Elemental silicon, silicon alloys, silicon composites and the like can have a low potential relative to lithium metal similar to graphite. However, elemental silicon generally undergoes a very large volume change upon alloying with lithium. A large volume expansion on the order of two to four times of the original volume or greater has been observed, and the large volume changes have been correlated with a significant decrease in the cycling stability of batteries having silicon-based negative electrodes.

Commercially available composites of silicon suboxide, elemental silicon and carbon can be used in the cells described herein. Also, other formulations of silicon based negative electrode active materials have been developed with high capacity and reasonable cycling properties. Some silicon based compositions are described below that provide potential and promising alternatives to commercially available SiO based compositions.

Also, silicon based high capacity materials in a negative electrode of a lithium-based battery can exhibit in some formulations a large irreversible capacity loss (IRCL) in the first charge/discharge cycle of the battery. The high IRCL of a silicon-based anode can consume a significant portion of the capacity available for the battery's energy output. Since the cathode, i.e., positive electrode, supplies all of the lithium in a traditional lithium ion battery, a high IRCL in the anode, i.e., negative electrode, can result in a low energy battery. In order to compensate for the large anode IRCL, supplemental lithium can be added directly or indirectly to the negative electrode material to offset the IRCL. The use of supplemental lithium to improve the performance of silicon based electrodes is described also in the '294 application and '228 patent, both cited above and incorporated herein by reference. The use of supplemental lithium in the improved battery designs is described further below.

The anode of the batteries described herein can use nanostructured active silicon based materials to accommodate better for volume expansion and thus maintain the mechanical electrode stability and cycle life of the battery. Nanostructured silicon based negative electrode compositions are disclosed in the '294 application, the '228 patent, as well as U.S. Pat. No. 9,139,441 to Anguchamy et al. (the '441 patent), entitled: "Porous Silicon Based Anode Material Formed Using Metal Reduction," incorporated herein by reference. Suitable nanostructured silicon can include, for example, nanoporous silicon and nanoparticulate silicon. Also, nanostructured silicon can be formed into composites with carbon and/or alloys with other metal elements. The objective for the design of improved silicon-based materials is to further stabilize the negative electrode materials over cycling while maintaining a high specific capacity and in some embodiments reducing the irreversible capacity loss in the first charge and discharge cycle. Furthermore, pyrolytic carbon coatings are also observed to stabilize silicon-based materials with respect to battery performance.

Desirable high capacity negative electrode active materials can comprise porous silicon (pSi) based materials and/or composites of the porous silicon based materials. In general, the pSi based material comprises highly porous crystalline silicon that can provide high surface areas and/or high void volume relative to bulk silicon. While nanostructured porous silicon can be formed through a variety of approaches such as electrochemical etching of a silicon wafer, particularly good battery performance has been obtained from nanostructured porous silicon obtained by metal reduction of silicon oxide powders. In particular, the material has particularly good cycling properties while maintaining a high specific capacity. The formation of composites of pSi based material with carbon based material or metal can additionally mechanically stabilize the negative electrode for improved cycling. Additional description of the pSi based material from the reduction of silicon oxide can be found in the '441 patent referenced above.

With respect to the composite materials, nanostructured silicon components can be combined with, for example, carbon nanoparticles and/or carbon nanofibers within an intimate composite material. The components can be, for example, milled to form the composite, in which the materials are intimately associated. Generally, it is believed that the association has a mechanical characteristic, such as the softer silicon coated over or mechanically affixed with the harder carbon materials. In additional or alternative embodiments, the silicon can be milled with metal powders to form alloys, which may have a corresponding nanostructure. The carbon components can be combined with the silicon-metal alloys to form multi-component composites.

Also, carbon coatings can be applied over the silicon-based materials to improve electrical conductivity, and the carbon coatings seem to also stabilize the silicon based material with respect to improving cycling and decreasing irreversible capacity loss. Desirable carbon coatings can be formed by pyrolyzing organic compositions. The organic compositions can be pyrolyzed at relatively high temperatures, e.g., about 800° C. to about 900° C., to form a hard amorphous coating. In some embodiments, the desired organic compositions can be dissolved in a suitable solvent, such as water and/or volatile organic solvents for combining with the silicon based component. The dispersion can be well mixed with silicon-based composition. After drying the mixture to remove the solvent, the dried mixture with the silicon based material coated with the carbon precursor can be heated in an oxygen free atmosphere to pyrolyze the organic composition, such as organic polymers, some lower molecular solid organic compositions and the like, and to form a carbon coating.

As with silicon, oxygen deficient silicon oxide, e.g., silicon oxide, $SiO_x$, $0.1 \leq x \leq 1.9$, can intercalate/alloy with lithium such that the oxygen deficient silicon oxide can perform as an active material in a lithium ion battery. These oxygen deficient silicon oxide materials are generally referred to as silicon oxide based materials and in some embodiments can contain various amounts of silicon, silicon oxide, and silicon dioxide. The oxygen deficient silicon oxide can incorporate a relatively large amount of lithium such that the material can exhibit a large specific capacity. However, silicon oxide is observed generally to have a capacity that fades quickly with battery cycling, as is observed with elemental silicon.

Silicon oxide based compositions have been formed into composite materials with high capacities and very good cycling properties as described in the '228 patent referenced above. In particular, oxygen deficient silicon oxides can be formed into composites with electrically conductive materials, such as conductive carbons or metal powders, which surprisingly significantly improve cycling while providing for high values of specific capacity. Furthermore, the milling of the silicon oxides into smaller particles, such as submicron structured materials, can further improve the performance of the materials.

In general, a range of composites can be used and can comprise silicon oxide, carbon components, such as graphitic particles (Gr), inert metal powders (M), elemental silicon (Si), especially nanoparticles, pyrolytic carbon coatings (HC), carbon nano fibers (CNF), or combinations thereof. The component structure may or may not correspond with the structure of the components within the composite material. Thus, the general compositions of the composites can be represented as $\alpha SiO-\beta Gr-\chi HC-\delta M-\varepsilon CNF-\phi Si$, where $\alpha$, $\beta$, $\chi$, $\delta$, $\varepsilon$, and $\phi$ are relative weights that can be selected such that $\alpha+\beta+\chi+\delta+\varepsilon+\phi=1$. Generally $0.35<\alpha<1$, $0\leq\beta<0.6$, $0\leq\chi<0.65$, $0\leq\delta<0.65$, $0\leq\varepsilon<0.65$, and $0\leq\phi<0.65$. Certain subsets of these composite ranges are of particular interest. In some embodiments, composites with SiO and one or more carbon based components are desirable, which can be represented by a formula $\alpha SiO-\beta Gr-\chi HC-\varepsilon CNF$, where $0.35<\alpha<0.9$, $0\leq\beta<0.6$, $0\leq\chi<0.65$ and $0\leq\varepsilon<0.65$ ($\delta=0$ and $\phi=0$), in further embodiments $0.35<\alpha<0.8$, $0.1\beta<0.6$, $0.0\leq\chi<0.55$ and $0\leq\varepsilon<0.55$, in some embodiments $0.35<\alpha<0.8$, $0\leq\beta<0.45$, $0.0\leq\chi<0.55$ and $0.1\leq\varepsilon<0.65$, and in additional embodiments $0.35<\alpha<0.8$, $0\leq\beta<0.55$, $0.1\leq\chi<0.65$ and $0\leq\varepsilon<0.55$. In additional or alternative embodiments, composites with SiO, inert metal powders and optionally one or more conductive carbon components can be formed that can be represented by the formula $\alpha SiO-\beta Gr-\chi HC-\delta M-\varepsilon CNF$, where $0.35<\alpha<1$, $0\leq\beta<0.55$, $0\leq\chi<0.55$, $0.1\leq\delta<0.65$, and $0\leq\varepsilon<0.55$. In further additional or alternative embodiments, composites of SiO with elemental silicon and optionally one or more conductive carbon components can be formed that can be represented by the formula $\alpha SiO-\beta Gr-\chi HC-\varepsilon CNF-\phi Si$, where $0.35<\alpha<1$, $0\leq\beta<0.55$, $0\leq\chi<0.55$, $0\leq\varepsilon<0.55$, and $0.1\leq\phi<0.65$ and in further embodiments $0.35<\alpha<1$, $0\leq\beta<0.45$, $0.1\leq\chi<0.55$, $0\leq\varepsilon<0.45$, and $0.1\leq\phi<0.55$. A person or ordinary skill in the art will recognize that additional ranges within the explicit ranges above are contemplated and are within the present disclosure. As used herein, the reference to composites implies application of significant combining forces, such as from HEMM milling, to intimately associate the materials, in contrast with simple blending, which is not considered to form composites.

Solution based approaches for the synthesis of various Si—$SiO_x$—C-M (M=metal) composites are described in published U.S. patent application 2014/0308585 to Han et al., entitled "Silicon-Based Active Materials for Lithium Ion Batteries and Synthesis With Solution Processing," incorporated herein by reference. Silicon-based carbon composites with graphene sheets are described in published U.S. patent application 2014/0370387 to Anguchamy et al., entitled "Silicon-Silicon Oxide-Carbon Composites For Lithium Battery Electrodes and Methods for Forming the Composites," incorporated herein by reference. Commercial materials that are believed to comprise a $SiO_x$—Si—C or $SiO_x$—Si composite are used in the batteries in the Examples.

The capacity of the anode significantly influences the energy density of the battery. A higher specific capacity of the anode material results in a lower weight of the anode in the cell for the same output. When the negative electrode is made from a silicon based material, the electrode can have a discharge specific capacity at a rate of C/3 from about 800 mAh/g to 2500 mAh/g, in further embodiments from about 900 mAh/g to about 2300 mAh/g and in other embodiments from about 950 mAh/g to about 2200 mAh/g at C/3 discharge from 1.5V to 5 mV against lithium metal. A person of ordinary skill in the art will recognize that additional ranges of discharge specific capacity within the explicit ranges above are contemplated and are within the present disclosure.

Positive Electrodes

Various positive electrode chemistries can be introduced effectively with the improved negative electrodes described above. The selected compositions can be blended into positive electrode along with a suitable binder and electrically conductive materials. This section focuses on particularly desirable positive electrode active materials for high voltage cycling and moderately high capacity. Also, this section describes the overall electrode composition and properties.

To some degree, the desired application of the final cells can influence the selection of the positive electrode composition. From this perspective, a broad range of compositions are described in the following. For automotive use and for similar applications, a particular positive electrode chemistry has found to be desirable with respect to achieving high energy density along with cycling to over 600 cycles while maintaining at least 80% capacity, although some materials provide promising results with somewhat lesser cycling stability. Specifically, a blend of nickel-rich lithium nickel cobalt manganese oxide and (lithium+manganese) rich-lithium nickel cobalt manganese oxide are blended to provide desirable positive electrode performance over a voltage range useful to provide a high energy density and long cycling stability. Furthermore, the nickel rich lithium nickel cobalt manganese oxides alone as the active material can provide desirably high energy densities due to the average discharge voltage with good cycling when paired with the silicon based negative electrodes described herein. Blending with some (lithium+manganese) rich-lithium nickel cobalt manganese oxide can improve the cycling stability with some loss of energy density due to some reduction of average voltage. Examples are presented below for the active material blends as well as two nickel rich lithium nickel cobalt manganese oxides alone.

Nickel-rich lithium nickel manganese cobalt oxides (N-NMC) can provide desirable cycling and capacity properties for the lithium ion batteries described herein. In particular, the nickel-rich lithium can be approximately represented by the formula $LiNi_xMn_yCo_zO_2$, $x+y+z\approx 1$, $0.45 \leq x$, $0.025 \leq y$, $z \leq 0.35$, in further embodiments, $0.50 \leq x$, $0.03 \leq y$, $z \leq 0.325$, and in $0.55 \leq x$, $0.04 \leq y$, $z \leq 0.3$. The amount of nickel can influence the selected charge voltage to balance cycling stability and discharge energy density. For values of x in the range of $0.525 \leq x \leq 0.7$ a selected charge voltage can be from 4.25V to 4.375V. For values of x in the range of $0.7 \leq x \leq 0.9$, the selected charge voltage can be from 4.05V to 4.325V. A person of ordinary skill in the art will recognize that additional ranges of composition and selected charge voltages within the explicit ranges above are contemplated and are within the present disclosure. These composition have been found to provide relatively stable higher voltage cycling, good capacities and desirable impedance. N-NMC powders can be synthesized using techniques, such as coprecipitation described further below, and these are available commercially, such as from BASF (Germany), TODA (Japan), L&F Materials Corp. (Korea), Unicore (Belgium), and Jinhe Materials Corp. (China).

For the N-NMC compositions, the average voltage trends slightly larger with increasing amounts of nickel, but the charge voltage for stable cycling trends slightly lower with increasing nickel. Thus, there can be tradeoffs with active material selection, although the N-NMC active materials can provide good cycling and reasonably high capacity and energy density. It has been found for some embodiments that the cycling stability of active materials comprising the N-NMC compositions can be improved through the formation of physical blends with lithium rich and manganese rich-NMC compositions (LM-NMC), the compositions of these materials is described in more detail below. The blends can introduce desirable cell properties when combined with the silicon based negative electrodes described herein.

As noted above, desirable blends can comprise N-NMC with (lithium rich+manganese rich) lithium nickel manganese cobalt oxides (LM-NMC or HCMR®). These compositions can be approximately represented by the formula $Li_{1+b}Ni_\alpha Mn_\beta Co_\gamma A_\delta O_{2-z}F_z$, where $b+\alpha+\beta+\gamma+\delta \approx 1$, b ranges from about 0.04 to about 0.3, α ranges from 0 to about 0.4, β range from about 0.2 to about 0.65, γ ranges from 0 to about 0.46, δ ranges from about 0 to about 0.15 and z ranges from 0 to 0.2, with the proviso that both α and γ are not 0, and where A is a metal different from lithium, manganese, nickel and cobalt. In some embodiments, A can be Mg, Sr, Ba, Cd, Zn, Al, Ga, B, Zr, Ti, Ca, Ce, Y, Nb, Cr, Fe, V, or combinations thereof. Also, in additional or alternative embodiments, $Li_{1+b}Ni_\alpha Mn_\beta Co_\gamma A_\delta O_2$ with $0.05 \leq b \leq 0.125$, $0.225 \leq \alpha \leq 0.35$, $0.35 \leq \beta \leq 0.45$, $0.15 \leq \gamma \leq 0.3$, $0 \leq \delta \leq 0.05$ and up to five mole percent of the oxygen can be replaced with a fluorine dopant. A person of ordinary skill in the art will recognize that additional ranges of composition within the explicit ranges above are contemplated and are within the present disclosure.

The LM-NMC positive electrode material can be advantageously synthesized by co-precipitation and sol-gel processes detailed in the '160 patent and the '873 patent. In some embodiments, the positive electrode material is synthesized by precipitating a mixed metal hydroxide or carbonate composition from a solution comprising +2 cations wherein the hydroxide or carbonate composition has a selected composition. The metal hydroxide or carbonate precipitates are then subjected to one or more heat treatments to form a crystalline layered lithium metal oxide composition. A carbonate co-precipitation process described in the '873 patent gave desired lithium rich metal oxide materials having cobalt in the composition and exhibiting the high specific capacity performance with superior tap density. These patents also describe the effective use of metal fluoride coatings to improve performance and cycling.

The synthesis approaches for the high capacity positive electrode active materials summarized above have been shown to be suitable to form materials with a high tap density. This is described further in the '873 patent cited above. As a result of a relatively high tap density and excellent cycling performance, a battery can exhibit a high total capacity when the active material is incorporated into the cathode. Generally, a higher tap density can be advantageously used to obtain a high electrode density without sacrificing the performance of the material if the high tap density material has desirable performance.

It is found that for LM-NMC positive electrode active materials a coating on the material can improve the performance of corresponding cells. Suitable coating materials, which are generally believed to be electrochemically inert during battery cycling, can comprise metal fluorides, metal oxides, or metal non-fluoride halides. The results in the Examples below relating to LM-NMC are obtained with LM-NMC materials coated with metal fluorides.

For example, the general use of metal fluoride compositions as coatings for cathode active materials, specifically $LiCoO_2$ and $LiMn_2O_4$, is described in published PCT application WO 2006/109930A to Sun et al., entitled "Cathode Active Material Coated with Fluorine Compound for Lithium Secondary Batteries and Method for Preparing the Same," incorporated herein by reference. Improved metal fluoride coatings with appropriately engineered thicknesses are described in published U.S. patent application 2011/0111298 to Lopez et al, (the '298 application) entitled "Coated Positive Electrode Materials for Lithium Ion Batteries," incorporated herein by reference. Suitable metal oxide coatings are described further, for example, in U.S. Pat. No. 8,535,832B2 to Karthikeyan et al. entitled "Metal Oxide Coated Positive Electrode Materials for Lithium-Based Batteries", incorporated herein by reference. The discovery of non-fluoride metal halides as desirable coatings for cathode active materials is described in U.S. Pat. No. 8,663,849B2 to Venkatachalam et al., entitled "Metal Halide Coatings on Lithium Ion Battery Positive Electrode Materials and Corresponding Batteries," incorporated herein by reference. The synthesis approaches along with the coating provide for superior performance of the materials with respect to capacity as well as cycling properties. The desirable properties of the active material along with the use of desirable anode material described herein provide for improved battery performance.

Long cycle stability has been achieved for these active materials at relatively high cycling voltages, as described in U.S. Pat. No. 8,928,286 to Amiruddin et al., entitled "Very Long Cycling of Lithium Batteries With Lithium Rich Cathode Materials," incorporated herein by reference. Within this range of LM-NMC compositions, some particular compositions have been found to yield particularly desirable properties. See, for example, U.S. Pat. No. 8,394,534B2 to Lopez et al., entitled "Layer-Layer Lithium Rich Complex Metal Oxides With High Specific Capacity and Excellent Cycling," incorporated herein by reference. It has been found that some LM-NMC compositions can exhibit relatively low DC resistance while maintaining a relatively high capacity and excellent cycling as described in U.S. Pat. No. 9,552,901B2 to Amiruddin et al. (hereinafter the '901 patent), entitled "Lithium Ion Batteries With High Energy Density, Excellent Cycling Capability and Low Internal Impedance," incorporated herein by reference.

With respect to the active material blends for a positive electrode, the active materials can comprise from about 3 weight percent to about 85 weight percent LM-NMC, in further embodiments from about 5 weight percent to about 75 weight percent LM-NMC, in additional embodiments from about 6 weight percent to about 70 weight percent LM-NMC, and in other embodiments from about 7 weight percent to about 65 weight percent LM-NMC. Similarly, in the positive electrode active material blends, the active materials can comprise from about 15 weight percent to about 97 weight percent N-NMC, in further embodiments, from about 25 weight percent to about 95 weight percent, in additional embodiments from about 30 weight percent to about 94 weight percent, and in other embodiments from about 35 weight percent to about 93 weight percent N-NMC. The positive electrode active materials can optionally comprise from 0 to 25 weight percent additional active materials, such as lithium cobalt oxide, $LiNi_{0.33}Mn_{0.33}Co_{0.33}O_2$ (NMC111), $LiNi_{0.8}Co_{0.15}Al_{0.05}O_2$ (NCA), mixtures thereof, or the like. A person of ordinary skill in the art will recognize that additional ranges of composition blends within the explicit ranges above are contemplated and are within the present disclosure.

With respect to performance, the positive electrode active material blends can provide improved cycling performance with high specific capacity and relatively high energy density, such that cycling to greater than 600 cycles can be achieved and in combination with the high capacity silicon based active materials. The performance of these blends is further elaborated on below and described in the examples with respect to specific embodiments. Desirable cycling performance is demonstrated for both N-NMC alone and blends of N-NMC and LM-NMC.

As noted above, the positive electrode generally comprises active material, with an electrically conductive material within a binder. The active material loading in the electrode can be large. In some embodiments, the positive electrode comprises from about 85 to about 99% of positive electrode active material, in other embodiments from about 90 to about 98% of the positive electrode active material, and in further embodiments from about 95 to about 97.5% of the positive electrode active material. In some embodiments, the positive electrode has from about 0.75 to about 10% polymeric binder, in other embodiments from about 0.8 to about 7.5% polymeric binder, and in further embodiments from about 0.9 to about 5% polymeric binder. The positive electrode composition generally can also comprise an electrically conductive additive distinct from the electroactive composition. In some embodiments, the positive electrode can have 0.4 weight percent to about 12 weight percent conductive additive, in further embodiments from about 0.45 weight percent to about 7 weight percent, and in other embodiments from about 0.5 weight percent to about 5 weight percent conductive additive. A person of ordinary skill in the art will recognize that additional ranges of particles loadings within the explicit ranges about are contemplated and are within the present disclosure. The positive electrode active materials are described above. Suitable polymer binders for the positive electrode include, for example, polyvinylidine fluoride, polyethylene oxide, polyimide, polyethylene, polypropylene, polytetrafluoroethylene, polyacrylates, rubbers, e.g. ethylene-propylene-diene monomer (EPDM) rubber or styrene butadiene rubber (SBR), copolymers thereof, or mixtures thereof. For the positive electrode, polyvinylidene fluoride (pvdf) can be used with good results, and the positive electrodes in the examples use a pvdf binder. Electrically conductive additives are described in detail for the negative electrode, and nanoscale conductive carbon can be used effectively for the positive electrode.

For a particular loading level, the electrode density (of active material) is inversely correlated with thickness so that an electrode with a greater density is thinner than an electrode with a lower density. Loading is equal to the density times the thickness. In some embodiments, the positive electrode of the battery has a loading level of positive electrode active material that is from about 10 to about 40 $mg/cm^2$, in other embodiments from about 12 to about 37.5 $mg/cm^2$, in additional embodiments from about 13 to about 35 $mg/cm^2$, and in other embodiments from 20 to about 32.5 $mg/cm^2$ In some embodiments, the positive electrode of the battery has an active material density in some embodiment from about 2.5 g/cc to about 4.6 g/cc, in other embodiment from about 3.0 g/cc to 4.4 g/cc, and in additional embodiment from about 3.25 g/cc to about 4.3 g/cc. In further embodiments, the positive electrodes can have a thickness on each side of the current collector following compression and drying of the positive electrode material from about 45 microns to about 300 microns, in some embodiments from about 80 microns to about 275 microns and in additional embodiments from about 90 microns to about 250 microns. A person of ordinary skill in the art will recognize that additional ranges of active material loading level, electrode thickness and electrode densities within the explicit ranges above are contemplated and are within the present disclosure.

Supplemental Lithium

The improved high energy battery designs described herein generally comprise supplemental lithium, and this section is directed to approaches for the incorporation of supplemental lithium for appropriate embodiments. In general, the inclusion of supplemental lithium is desirable for cells with silicon-based negative electrode active materials since the material exhibit relatively high irreversible capacity loss during the initial charge of the battery. Also, supplemental lithium surprisingly also stabilizes cycling of LM-NMC. Various approaches can be used for the introduction of supplemental lithium into the battery, although following corresponding initial reactions and/or charging, the negative electrode becomes associated with excess lithium for cycling from the supplemental lithium. With respect to the negative electrode in batteries having supplemental lithium, the structure and/or composition of the negative electrode can change relative to its initial structure and composition following the first cycle as well as following additional cycling.

Depending on the approach for the introduction of the supplemental lithium, the positive electrode may initially comprise a source of supplemental lithium and/or a sacrificial electrode can be introduced comprising supplemental lithium. Additionally or alternatively, supplemental lithium can be associated with the negative electrode. In some embodiments, the supplemental lithium can be introduced into the negative electrode using electrochemical methods in contrast with purely chemical or mechanical methods. If the supplemental lithium is initially located in the positive electrode or a separate electrode, the negative electrode can be an unaltered form with no lithium present until the battery is charged or at least until the circuit is closed between the negative electrode and the electrode with the supplemental lithium in the presence of electrolyte and a separator. For example, the positive electrode or supplemental electrode can comprise elemental lithium, lithium alloy and/or other sacrificial lithium source in addition to other electrode components.

If sacrificial lithium is included in the positive electrode, the lithium from the sacrificial lithium source is loaded into the negative electrode during the charge reaction. The voltage during the charging based on the sacrificial lithium source may be significantly different than the voltage when the charging is performed based on the positive electrode active material. For example, elemental lithium in the positive electrode can charge the negative electrode active material without application of an external voltage since oxidation of the elemental lithium can drive the reaction as long as the circuit is closed. For some sacrificial lithium source materials, an external voltage is applied to oxidize the sacrificial lithium source in the positive electrode and drive lithium into the negative electrode active material. The charging generally can be performed using a constant current, a stepwise constant voltage charge or other convenient charging scheme. However, at the end of the charging process, the battery should be charged to a desired voltage, which then also involves extraction of lithium (e.g., de-intercalation or de-alloying) from the positive electrode active material.

In further embodiments, at least a portion of the supplemental lithium is initially associated with the negative electrode. For example, the supplemental lithium can be in the form of elemental lithium, a lithium alloy or other lithium source that is more electronegative than the negative electrode active material. Elemental lithium can be in the form of a thin film, such as formed by evaporation, sputtering or ablation, a lithium or lithium alloy foil and/or a powder. Elemental lithium, especially in powder form, can be coated to stabilize the lithium for handling purposes, and commercial lithium powders, such as powders from FMC Corporation, are sold with proprietary coatings for stability. The coatings generally do not alter the performance of the lithium powders for electrochemical applications. After the negative electrode is in contact with electrolyte, a reaction can take place, and the supplemental lithium is transferred to the negative electrode active material. Since the electrode is electrically conductive internally, the circuit does not need to be closed to provide for electron flow resulting from the reactions. During this process, the solid electrolyte interface (SEI) layer may also be formed. Thus, the supplemental lithium is loaded into the negative electrode active material with at least a portion generally consumed in formation of the SEI layer. Excess lithium released from a lithium rich positive electrode active material can also be deposited into the negative electrode active material during eventual charging of the battery. Supplemental lithium placed into the negative electrode should be more electronegative than the active material in the negative electrode since there is no way of reacting the supplemental lithium source with the active material in the same electrode through the application of a voltage.

In some embodiments, supplemental lithium associated with the negative electrode can be incorporated as a powder within the negative electrode. Specifically, the negative electrode can comprise an active negative electrode composition and a supplemental lithium source within a polymer binder matrix, and any electrically conductive powder if present. In additional or alternative embodiments, the supplemental lithium is placed along the surface of the electrode. For example, the negative electrode can comprise an active layer with an active negative electrode composition and a supplemental lithium source layer on the surface of active layer. The supplemental lithium source layer can comprise a foil sheet of lithium or lithium alloy, supplemental lithium powder within a polymer binder and/or particles of supplemental lithium source material placed on the surface of the active layer. In an alternative configuration, a supplemental lithium source layer is between the active layer and current collector. Also, in some embodiments, the negative electrode can comprise supplemental lithium source layers on both surfaces of the active layer.

An arrangement to perform electrochemical preloading of lithium can comprise an electrode with silicon-based active material formed on a current collector, which are placed in vessel containing electrolyte and a sheet of lithium source material contacting the electrode. The sheet of lithium source material can comprise lithium foil, lithium alloy foil or a lithium source material in a polymer binder optionally along with an electrically conductive powder, which is in direct contact with the negative electrode to be preloaded with lithium such that electrons can flow between the materials to maintain electrical neutrality while the respective reactions take place. In the ensuing reaction, lithium is loaded into the silicon based active material through intercalation, alloying or the like. In alternative or additional embodiments, the negative electrode active material can be mixed in the electrolyte and the lithium source material for incorporation of the supplemental lithium prior to formation into an electrode with a polymer binder so that the respective materials can react in the electrolyte spontaneously.

In some embodiments, a lithium source within an electrode can be assembled into a cell with the electrode to be preloaded with lithium. A separator can be placed between the respective electrodes. Current can be allowed to flow between the electrodes to provide for controlled electrochemical prelithiation. Depending on the composition of the lithium source it may or may not be necessary to apply a voltage to drive the lithium deposition within the silicon-based active material. An apparatus to perform this lithiation process can comprise a container holding electrolyte and a cell, which comprises an electrode, to be used as a negative electrode in an ultimate battery, a current collector, a separator and a sacrificial electrode that comprises the lithium source, such as lithium metal foil, where the separator is between the sacrificial electrode and the electrode with the silicon-based active material. A convenient sacrificial electrode can comprise lithium foil, lithium powder embedded in a polymer or lithium alloys, although any electrode with extractable lithium can be used. The container for the lithiation cell can comprise a conventional battery housing, a beaker, or any other convenient structure. This configuration provides the advantage of being able to measure the current flow to meter the degree of lithiation of the negative electrode. Furthermore, the negative electrode can be cycled once or more than once in which the negative electrode active material is loaded close to full loading with lithium. In this way, an SEI layer can be formed with a desired degree of control during the preloading with lithium of the negative electrode active material. Then, the negative electrode is fully formed during the preparation of the negative electrode with a selected preloading with lithium.

In general, for embodiments in which supplemental lithium is used, the amount of supplemental lithium preloaded or available to load into the active composition can be in an amount of at least about 2.5% of capacity, in further embodiments from about 3 percent to about 55 percent of capacity, in additional embodiments from about 5 percent to about 52.5 percent of capacity, and in some embodiments from about 5 percent to about 50 percent of the negative electrode active material capacity. The supplemental lithium can be selected to approximately balance the IRCL of the negative electrode, although other amounts of supplemental lithium can be used as desired. In some embodiment, the supplemental lithium added is in an amount with an oxidation capacity corresponding to from 60% to 180% of the first cycle IRCL of the negative electrode, in further embodiments, it is from 80% to 165%, and in other embodiments from 90% to 155%. A person of ordinary skill in the art will recognize that additional ranges of percentage within the explicit ranges above are contemplated and are within the present disclosure. Thus, the contribution to the IRCL of the negative electrode can be effectively reduced or removed due to the addition of the supplemental lithium such that the measured IRCL of the battery represents partially or mostly contributions from the IRCL of the positive electrode, which is not diminished due to the presence of supplemental lithium. A person of ordinary skill in the art will recognize that additional ranges of IRCL within the explicit ranges above are contemplated and are within the present disclosure.

Balance of Cathode and Anode

The overall performance of the battery has been found to depend on the capacities of both the negative electrode and positive electrode and their relative balance. Balance of the electrodes has been found to be significant with respect to achieving a particularly high energy density for the battery as well as to achieve good cycling properties. In some embodiments, there may be a tradeoff with respect to achieving longer cycling stability and energy density. To achieve longer cycling stability, it can be desirable to balance the battery to achieve a relatively lower energy density, but with a battery suitable for stable long term use under a broader range of operating parameters. With the improved active materials and desirable electrode designs, high energy densities are still achievable while obtaining cycling to more than 600 cycles with no more than 80% capacity drop. The electrode balance can be evaluated in several alternative ways, which can work effectively when properly accounting for the particular evaluation approach.

The positive electrode active material capacity can be estimated from the capacity of the material which can be measured by cycling the material against lithium metal foil. For example, for a given positive electrode, the capacity can be evaluated by determining the insertion and extraction capacities during the first charge/discharge cycle, where the lithium is de-intercalated or extracted from the positive electrode to a voltage selected based on the material chemistry and the selected charge voltage of the cell design (generally from 4.2V to 4.5V) and intercalated or inserted back into the positive electrode to 2V at a rate of C/20, with a slight adjustment, e.g. generally 0.1V, to a higher charge voltage against the lithium metal based on the voltage of the ultimate anode relative to lithium metal. Similarly, for a given silicon based electrode, the insertion and extraction capacities can be evaluated with a battery having a positive electrode comprising the silicon based active material and a lithium foil negative electrode. The capacity is evaluated by determining the insertion and extraction capacities of the battery during the first charge/discharge cycle where lithium is intercalated/alloyed to the silicon based electrode to 5 mV and de-intercalated/de-alloyed to 1.5V at a rate of C/20. In actual use, the observed capacities can change from the tested capacities due to various factors, such as high rate operation and alteration of voltage range, which can be due to battery design as well as due to composition of the counter electrode not being lithium metal. For some evaluation approaches, a subsequent capacity after the first cycle can be used to evaluate electrode balance, and if desired a greater discharge rate can be used, such as C/3 or C/10. The use of the balance after a formation cycle or a few formation cycles can be desirable in that the balance is based more on conditions during use of the battery.

In most commercially available carbon based batteries, approximately 7-10% excess anode is taken over the cathode to prevent lithium plating. One important concern of too much excess anode is that the weight of the cell will increase reducing the energy density of the cell. Compared to graphite which has a first cycle IRCL of ~7%, high capacity silicon based anodes can have IRCL ranging from about 10% to about 40%. A significant portion of the capacity may become inactive in the cell after the first charge-discharge cycle and add to significant dead weight to the battery.

For high capacity anode materials, the negative electrode irreversible capacity loss generally is greater than the positive electrode irreversible capacity loss, which generates additional lithium availability for the cell. If the negative electrode has a significantly higher irreversible capacity loss than the positive electrode, the initial charge of the negative electrode irreversibly consumes lithium so that upon subsequent discharge, the negative electrode cannot supply enough lithium to provide the positive electrode with sufficient lithium to satisfy the full lithium accepting capacity of the positive electrode. This results in a waste of positive electrode capacity, which correspondingly adds weight that does not contribute to cycling. Most or all of the lithium loss from the net IRCL (negative electrode IRCL minus positive electrode IRCL) can be compensated by supplemental lithium as described above. Evaluation of electrode balance during the 1st formation cycle may or may not account for supplemental lithium. In subsequent cycles after the formation cycle or a few cycles, any excess supplemental lithium not consumed for the IRCL is generally alloyed into the anode material. The electrode balance can be evaluated at a cycling stage after formation, such as the 4th cycle at a selected rate, and these capacities can be estimated from the electrode performances.

From the perspective of providing stable longer term cycling performance, it can be desirable to balance the electrodes to provide for effective use of both electrode capacities as well as avoiding the plating of lithium metal during cycling. In general, the balance of the electrodes is considered at the time of assembly of the electrodes referencing the initial capacities of the electrodes relative to lithium metal.

In general, battery life can be selected to end when the energy output drops by roughly 20% from the initial capacity at a constant discharge rate, although other values can be selected as desired. For the materials described herein, the drop in capacity with cycling of the negative electrode is generally greater than for the positive electrode, so that the avoidance of lithium metal deposition with cycling suggests a greater excess capacity of the negative electrode to further stabilize cycling. Roughly, if the negative electrode capacity fades about twice as fast as the positive electrode capacity, it would be desirable to include at least 10% additional negative electrode capacity to account for cycling. In the robust battery design, at least about 10% additional negative electrode can be desired at various discharge conditions. In general, the balance can be selected such that the initial negative electrode charge capacity evaluated at a rate of C/20 from an open circuit voltage to 1.5V against lithium is about 110% to about 195%, in further embodiment from about 120% to about 185% and in additional embodiments from about 130% to about 190% relative to the sum of the initial positive electrode charge capacity at a rate of C/20 from an open circuit voltage to the charge voltage of the cell design (generally from 4.2V to 4.6V) plus the oxidation capacity of any supplemental lithium. Alternatively, the electrode balance can be evaluated at the fourth cycle at a discharge rate of C/10 or C/3 with the negative electrode capacity relative to positive electrode capacity from about 110% to about 195%, in further embodiment from about 120% to about 185% and in additional embodiments from about 130% to about 190%. A person of ordinary skill in the art will recognize that additional ranges of balance within the explicit ranges above are contemplated and are within the present disclosure. Such a balance is described in the battery designs described below.

General Battery Features

The negative electrode and positive electrode structures described above can be assembled into appropriate cells. As noted above, the electrodes are generally formed in association with current collectors to form electrode structures. A separator is located between a positive electrode and a negative electrode to form a cell. The separator is electrically insulating while providing for at least selected ion conduction between the two electrodes. A variety of materials can be used as separators. Some commercial separator materials can be formed from polymers, such as polyethylene and/or polypropylene that are porous sheets that provide for ionic conduction. Commercial polymer separators include, for example, the Celgard® line of separator material from Hoechst Celanese, Charlotte, N.C. Also, ceramic-polymer composite materials have been developed for separator applications. These ceramic composite separators can be stable at higher temperatures, and the composite materials can reduce the fire risk. Polymer-ceramic composites for lithium ion battery separators are sold under the trademark Separion® by Evonik Industries, Germany and Lielsort® by Tiejin Lielsort Korea Co., Ltd. Also, separators can be formed using porous polymer sheets coated with a gel-forming polymer. Such separator designs are described further in U.S. Pat. No. 7,794,511 B2 to Wensley et al., entitled "Battery Separator for Lithium Polymer Battery," incorporated herein by reference. Suitable gel-forming polymers include, for example, polyvinylidene fluoride (pvdf), polyurethane, polyethylene oxide (PEO), polypropylene oxide (PPO), polyacylonitrile, gelatin, polyacrylamide, polymethylacrylate, polymethylmethacrylate, polyvinylacetate, polyvinylpyrrolidone, polytetraethylene glycol diacrylate, copolymers thereof, and mixtures thereof.

Electrolyte provides for ion transport between the anode and cathode of the battery during the charge and discharge processes. We refer to solutions comprising solvated ions as electrolytes, and ionic compositions that dissolve to form solvated ions in appropriate liquids are referred to as electrolyte salts. Electrolytes for lithium ion batteries can comprise one or more selected lithium salts. Appropriate lithium salts generally have inert anions. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl) methide, lithium tetrafluoroborate, lithium perchlorate, lithium tetrachloroaluminate, lithium chloride, lithium difluoro oxalato borate, and combinations thereof. In some embodiments, the electrolyte comprises a 1 M to 2M concentration of the lithium salts, although greater or lesser concentrations can be used.

For lithium ion batteries of interest, a non-aqueous liquid is generally used to dissolve the lithium salt(s). The solvent generally does not dissolve the electroactive materials. In some embodiments, appropriate solvents can include, for example, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme (tri(ethylene glycol) dimethyl ether), diglyme (diethylene glycol dimethyl ether), DME (glyme or 1,2-dimethyloxyethane or ethylene glycol dimethyl ether), nitromethane and mixtures thereof. Particularly useful solvents for high voltage lithium-ion batteries are described further in U.S. Pat. No. 8,993,177 to Amiruddin et al., entitled "Lithium ion battery with high voltage electrolytes and additives", incorporated herein by reference.

Electrolyte with fluorinated additives has shown to further improve the battery performance for some embodiments of cells with silicon based negative electrode active material. The fluorinated additives can include, for example, fluoroethylene carbonate, fluorinated vinyl carbonate, monochloro ethylene carbonate, monobromo ethylene carbonate, 4-(2,2,3,3-tetrafluoropropoxymethyl)-[1,3]dioxolan-2-one, 4-(2,3,3,3-tetrafluoro-2-trifluoro methyl-propyl)-[1,3]dioxolan-2-one, 4-trifluoromethyl-1,3-dioxolan-2-one, bis(2,2,3,3-tetrafluoro-propyl) carbonate, bis(2,2,3,3,3-pentafluoro-propyl) carbonate, or mixtures thereof. In some embodiments, the electrolyte can comprise from about 1 weight percent to about 55 weight percent halogenated carbonate, in further embodiments from about 3 weight percent to about 50 weight percent and in other embodiments from about 5 weight percent to about 45 weight percent halogenated carbonate in the electrolyte as a fraction of the total electrolyte weight. A person of ordinary skill in the art will recognize that additional ranges of halogenated carbonate concentrations within the explicit ranges above are contemplated and are within the present disclosure. Also, electrolytes with fluoroethylene carbonate have been found to have excellent low temperature performance as described in published U.S. patent application 2013/0157147 to Li et al. (the '147 application), entitled "Low Temperature Electrolyte for High Capacity Lithium Based Batteries," incorporated herein by reference. Additional fluorinated additives include, for example, fluorinated ethers, as described in published U.S. patent application 2018/0062206 to Li et al., entitled "Fluorinated Ether as Electrolyte Co-Solvent for Lithium Metal Based Anode," and WO 2018/051675 to Takuya et al. entitled "Lithium Secondary Battery," both of which are incorporated herein by reference. Fluorinated electrolytes are available from Daikin America, Inc.

In some Examples, the electrolyte is formulated using a commercial consumer electronic electrolyte comprising ethylene carbonate, diethylcarbonate, and a fluorinated component, and as demonstrated below excellent cycling results are obtained. Suitable fluorinated electrolyte components, such as fluoroethylene carbonate, fluorinated ethers and/or fluorinated amines, have been found to provide desirable stabilization for silicon based electrodes relative to electrolytes that provide suitable commercial performance for consumer electronics batteries with graphitic anodes.

The electrodes described herein can be assembled into various commercial cell/battery designs such as prismatic shaped batteries, wound cylindrical cells, coin cells, or other reasonable cell/battery designs. The cells can comprise a single pair of electrodes or a plurality of pairs of electrodes assembled in parallel and/or series electrical connection(s). Electrode stacks can have an extra electrode to end the stack with the same polarity as the other end of the stack for convenience in placement in a container. While the electrode structures described herein can be used in batteries for primary, or single charge use, the resulting batteries generally have desirable cycling properties for secondary battery use over multiple cycling of the batteries.

In some embodiments, the positive electrode and negative electrode can be stacked with the separator between them, and the resulting stacked structure can be rolled into a cylindrical or prismatic configuration to form the cell structure. Appropriate electrically conductive tabs can be welded or the like to the current collectors, and the resulting jellyroll structure can be placed into a metal canister or polymer package, with the negative tab and positive tab welded to appropriate external contacts. Electrolyte is added to the canister, and the canister is sealed to complete the cell. Some presently used rechargeable commercial cells include, for example, the cylindrical 18650 cells (18 mm in diameter and 65 mm long) and 26700 cells (26 mm in diameter and 70 mm long), although other cell/battery sizes can be used, as well as prismatic cells and foil pouch cells/batteries of selected sizes.

Pouch batteries can be particularly desirable for various applications, including certain vehicle applications, due to stacking convenience and relatively low container weight. A pouch battery design for vehicle batteries incorporating a high capacity cathode active material is described further in U.S. Pat. No. 8,187,752 to Buckley et al, entitled "High Energy Lithium Ion Secondary Batteries" and U.S. Pat. No. 9,083,062B2 to Kumar et al., entitled "Battery Packs for Vehicles and High Capacity Pouch Secondary Batteries for Incorporation into Compact Battery Packs," both incorporated herein by reference. While the pouch battery designs are particularly convenient for use in specific battery pack designs, the pouch batteries can be used effectively in other contexts as well with high capacity in a convenient format. Desirable results are presented in the examples with a prismatic shaped pouch battery with electrode stacks.

Figure 2:
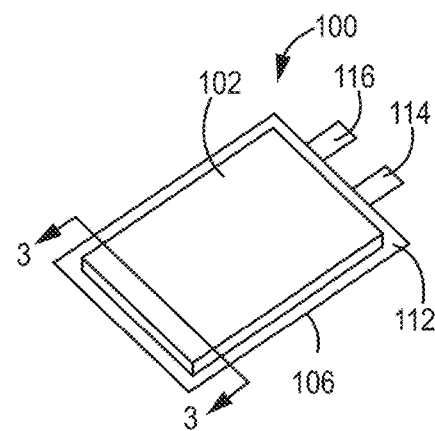
FIG. 2 is a perspective lower face view of the assembled pouch battery of FIG. 1.
Figure 3:
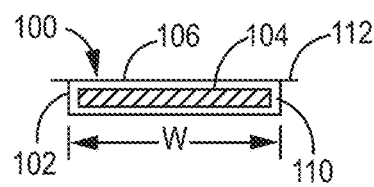
FIG. 3 is a bottom plan view of the pouch battery of FIG. 2.

A representative embodiment of a pouch battery is shown in FIGS. 1 to 4. In this embodiment, pouch battery 100 comprises pouch enclosure 102, electrode core 104 and pouch cover 106. An electrode core is discussed further below. Pouch enclosure 102 comprises a cavity 110 and edge 112 surrounding the cavity. Cavity 110 has dimensions such that electrode core 104 can fit within cavity 110. Pouch cover 106 can be sealed around edge 112 to seal electrode core 104 within the sealed battery, as shown in FIGS. 2 and 3. Terminal tabs 114, 116 extend outward from the sealed pouch for electrical contact with electrode core 104. FIG. 3 is a schematic diagram of a cross section of the battery of FIG. 2 viewed along the 3-3 line. Many additional embodiments of pouch batteries are possible with different configurations of the edges and seals.

Figure 4:
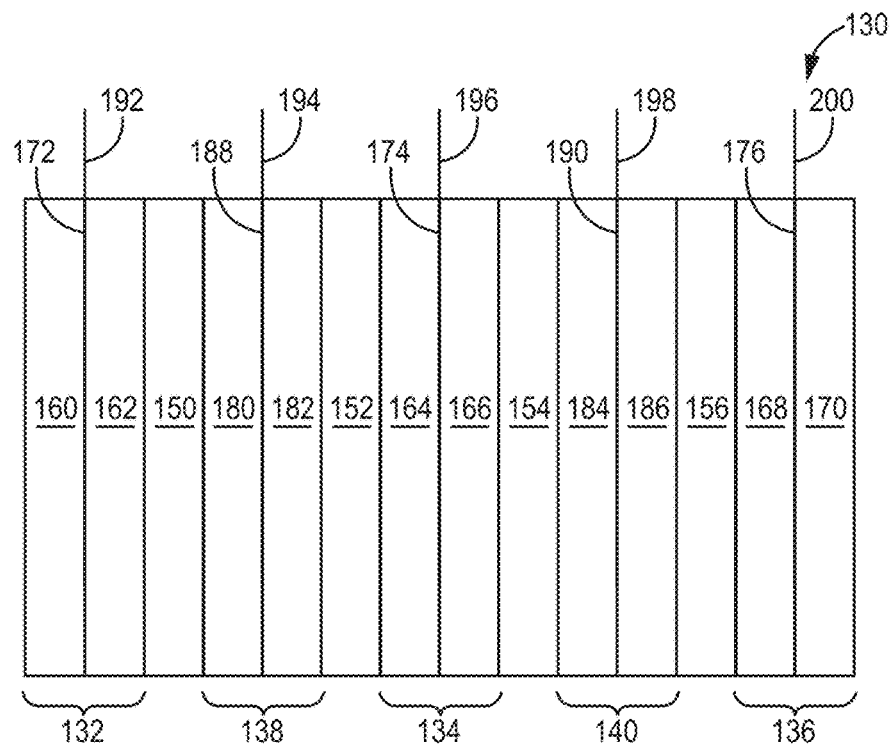
FIG. 4 is depiction of an embodiment of a battery core comprising an electrode stack.

FIG. 4 shows an embodiment of an electrode core 104 that generally comprise an electrode stack. In this embodiment, electrode stack 130 comprises negative electrode structures 132, 134, 136, positive electrode structures 138, 140, and separators 150, 152, 154, 156 disposed between the adjacent positive and negative electrodes. The separator can be provided as a single folded sheet with the electrode structures placed in the separator folds. Negative electrode structures 132, 134, 136 comprise negative electrodes 160, 162, negative electrodes 164, 166 and negative electrodes 168, 170, respectively, disposed on either side of current collectors 172, 174, 176. Positive electrode structures 138, 140 comprise positive electrodes 180, 182 and positive electrodes 184, 186, respectively, disposed on opposite sides of current collectors 188, 190, respectively. Tabs 192, 194, 196, 198, 200 are connected to current collectors 172, 188, 174, 190, 176, respectively, to facilitate the connection of the individual electrodes in series or in parallel. For vehicle applications, tabs are generally connected in parallel, so that tabs 192, 196, 200 would be electrically connected to an electrical contact accessible outside the container, and tabs 194, 198 would be electrically connected to an electrical contact as an opposite pole accessible outside the container.

Electrode stacks can have an extra negative electrode such that both outer electrodes adjacent the container are negative electrodes. Generally, a battery with stacked electrodes of the dimensions described herein have from 5 to 40 negative electrode elements (current collector coated on both sides with active material) and in further embodiments from 7 to 35 negative electrode elements with corresponding numbers of positive electrode elements being generally one less than the negative electrode elements. A person of ordinary skill in the art will recognize that additional ranges of electrode numbers within the explicit ranges above are contemplated and are within the present disclosure.

As noted above, wound electrodes can be correspondingly used for either a cylindrical battery or a roughly prismatic shaped battery. Wound cells for cylindrical lithium ion batteries are described further in U.S. Pat. No. 8,277,969 to Kobayashi et al., entitled "Lithium Ion Secondary Battery," incorporated herein by reference. Prismatic shaped batteries with wound electrodes are described in U.S. Pat. No. 7,700,221 to Yeo (the '221 patent), entitled "Electrode Assembly and Lithium Ion Secondary Battery Using the Same," incorporated herein by reference. The Kobayashi '969 patent and the Yeo '221 patent do not describe how to achieve reasonable cycling or a high energy density with silicon based active materials. Designs for prismatic shaped batteries with wound electrodes are described further, for example, in the '221 patent cited above. A particular design of either a stacked set of electrodes or a wound cell can be influenced by the target dimensions and the target capacity of the battery.

The improved negative electrodes can be used for a range of applications and cell/battery designs. For electrode stacks, the areas of the electrodes can be selected reasonably based on the volume and design constraints for the particular application. The following discussion focuses on larger cells generally designed for vehicle applications, such as drones, automobiles, trucks, or other vehicles. However, the improved negative electrodes described herein can be effectively used for consumer electronics applications, which can be based on smaller cell formats. Also, it should be noted that vehicles can use smaller consumer electronics cells, and Tesla cars presently are famous for using thousands of small consumer electronics cells in their battery packs. Generally, larger format cells/batteries can achieve larger energy densities within certain ranges. It may be desirable to select positive electrode active materials based on the particular application to balance various considerations, such as energy densities.

With the selection of electrode parameters, the design of high gravimetric energy density batteries can incorporate a balance of factors including electrode area, the number of electrode structures, and battery capacity. The electrode area refers to the spatial extent of one of the electrodes along one side of a current collector. FIG. 1 depicts the length "L", and FIG. 3 depicts the width "W" of an electrode. As shown in the figures, the area of an electrode can be defined as L×W. In some embodiments, the area of each electrode can be similar such that the dimensions of a battery comprising an electrode stack can have a length and width that are similar to the length and width of each electrode in the stack. In some embodiments, the separator can be in sheets with an area slightly larger than the area of the electrode, and in some embodiments, the separator can be folded, pleated or formed with pockets in which the electrodes are placed in folds or the pocket of the separator.

For some consumer electronics devices, the lengths and widths of a generally prismatic shaped battery can be independently from about 15 mm to 500 mm, in further embodiments from about 17.5 mm to about 400 mm and in additional embodiments from about 20 to about 350 mm. Thicknesses of the batteries can be from about 1 mm to about 15 mm, in further embodiments from 1.5 mm to about 13.5 mm and in additional embodiments from about 2 mm to about 12 mm. The volumes of the battery can range from 500 $mm^3$ to about 100,000 $mm^3$, in further embodiments from about 750 $mm^3$ to about 75,000 $mm^3$ and in other embodiments from about 1000 $mm^3$ to about 50,000 $mm^3$. For a wound cell, the two electrodes and separator are placed together and then wound, generally along a mandrel or the like using an appropriate apparatus. To obtain the corresponding volume, the length is generally substantially greater than the width. The widths can generally be from about 15 mm to about 150 mm and in further embodiments from about 20 mm to about 120 mm. The ratio of the length, corresponding to the wound dimension, to the width can be from about 3 to about 25 and in further embodiments from about 4 to about 20. Following winding, a spirally wound electrode can be prismatic, cylindrical or other convenient shape. Cylindrical batteries can have diameters from about 5 mm to about 50 mm, in further embodiments from about 7 mm to about 40 mm and in additional embodiments from about 8 mm to about 30 mm. A prismatic wound electrode can have overall dimensions as an electrode stack described above. A person of ordinary skill in the art would recognize that additional ranges of dimensional parameters within the explicit ranges above are contemplated and are within the present disclosure.

Generally, larger format cell/batteries provide for higher gravimetric and volumetric energy densities. For larger format cells generally desirable for vehicle applications, the desired facial area of the pouch battery can range from about 10,000 $mm^2$ to about 50,000 $mm^2$ and in further embodiments from about 15,000 $mm^2$ to about 40,000 $mm^2$. Furthermore, the pouch battery can have a volume from about 30,000 $mm^3$ to about 800,000 $mm^3$, in further embodiments from about 50,000 to about 750,000 $mm^3$, and in additional embodiments from about 100,000 $mm^3$ to about 600,000 $mm^3$. The width of the pouch battery can range from about 50 mm to about 500 mm, in further embodiments from about 65 mm to about 450 mm, and in other embodiments from about 75 mm to about 400 mm. Similarly, the height of a pouch battery can range from about 75 mm to about 750 mm, in further embodiments from about 85 mm to about 700 mm and in other embodiments from about 100 mm to about 650 mm. The thickness of the pouch battery can range from about 3 mm to about 18 mm, in further embodiments from about 3.25 mm to about 16 mm, and in other embodiments from about 3.5 mm to about 15 mm. In some embodiments, a larger format battery can have a total capacity of about 0.5 Ah to about 105 Ah, in other embodiments from about 2 Ah to about 80 Ah and in other embodiments from about 5 Ah to about 65 Ah. A person of ordinary skill in the art will recognize that additional ranges of battery dimensions and battery capacities within the explicit ranges above are contemplated and are within the present disclosure.

Performance Properties

The combination of design features described herein can provide longer cycling stability while maintaining desirable battery performance. The achievement of the long term cycling involves use of the improved electrode designs described above along with the balance of cell design parameters. The present cell designs significantly improve the cycling with some tradeoff in energy density. Comparable gravimetric energy densities as exemplified herein were achieved in smaller format cells as described in the '535 application with moderate cycling efficiency at a C/10 rate and voltage window 4.35V to 3V. In embodiments of particular interest, the positive electrodes herein generally comprise a nickel rich-lithium nickel manganese cobalt oxide, which may be blended with a lithium rich+manganese rich lithium nickel manganese cobalt oxide. The use of the N-NMC active materials is consistent with the good cycling and high energy densities at the voltage windows used.

The negative electrodes can be tested with a lithium foil electrode in a half cell configuration to evaluate its performance independent of the positive electrode features. Specifically, the negative electrode can be cycled against lithium metal over a voltage range of 0.005V to 1.5V at a selected rate. The negative electrode specific capacities are described above. The improved negative electrodes herein cycle better in the half cell configurations relative to reference electrodes, but improved cycling stability if quantified more explicitly in the full cell configurations below. The positive electrode performance also influences the battery performance, but the positive electrode performance is evaluated in the context of full cells with silicon based electrodes.

Cells and batteries have been formed with high energy formats suitable for commercial applications, such as electric vehicle applications based on high capacity positive electrodes and high capacity negative electrodes. Electrode designs have been developed to take advantage of the high capacity materials, as described above. The lithium ion secondary battery disclosed herein can have a discharge energy density of at least about 235 Wh/kg at C/3 when discharged from a selected charge voltage to 2.5V at 30° C. in further embodiments at least about 240 Wh/kg, in additional embodiments at least about 245 Wh/kg, and in other embodiments at least about 250 Wh/kg at C/3 when discharged from the selected charge voltage to 2.5V at 30° C. Some cells can be discharged to a somewhat different discharged voltage, such as 2.4V or 2.3V with little difference in the resulting performance since there is little residual capacity at these voltages, and the actual discharge voltage may be selected for a particular application. The selected charge voltage can be influenced by the positive electrode active material. Generally, the selected charge voltage for these cells is from about 4.05V to 4.4V, and exemplified values include 4.15V (NMC811), 4.2V, 4.3V and 4.35V. The batteries can exhibit very good cycling performance. In some embodiments, the batteries can exhibit a discharge capacity at cycle 500 of at least about 75% of the 6th cycle capacity discharged at C/3 from the selected charge voltage to 2.5V at 30° C., in other embodiments at least about 80% and in additional embodiments at least about 82% at the 500th cycle relative to the 6th cycle discharge capacity when cycled from the selected charge voltage to 2.5V at C/3 at 30° C. Similarly, the batteries can exhibit a discharge capacity at cycle 600 of at least about 70% of the 6th cycle capacity discharged at C/3 from the selected charge voltage to 2.5V at 30° C., in other embodiments at least about 73% and in additional embodiments at least about 75% at the 600th cycle relative to the 6th cycle discharge capacity when cycled from the selected charge voltage to 2.5V at C/3 at 30° C. A person of ordinary skill in the art will recognize that additional ranges within the explicit ranges above are contemplated and are within the present disclosure.

EXAMPLES

Example 1—Active Material Composition

This example demonstrates the cycling stabilization of silicon oxide composite active materials through the incorporation of significant amounts of electrochemically active graphite along with conductive nanoscale carbon and an appropriate polymer binder.

To evaluate the negative electrode formulations, coin cells were formed using either a lithium foil counter electrode or a positive electrode comprising a lithium metal oxide blend as the active composition. To form the negative electrode with the silicon based active material, a powder of commercial silicon oxide/silicon/carbon composite material (referred to below as $SiO_x/Si/C$) and a selected amount of graphite were mixed thoroughly with from 1 wt % to 7 wt % of a nanoscale carbon electrically conductive additive to form a homogeneous powder mixture. Four sample silicon based electrodes were formed with varying amounts of graphite (KS 6 synthetic graphite, Timcal): sample 1-70 wt % $SiO_x/Si/C$+30 wt % graphite, sample 2-78 wt % $SiO_x/Si/C$+22 wt % graphite, sample 3-85 wt % graphite+15 wt % graphite, sample 4-100 wt % $SiO_x/Si/C$. Separately, a blend of polymer binders, polyimide binder and lower elastic modulus binder, was mixed with N-methyl-pyrrolidone ("NMP") (Sigma-Aldrich) and stirred overnight to form a polymer binder-NMP solution. The homogenous powder mixture was then added to the polymer binder-NMP solution and mixed for about 2 hours to form a homogeneous slurry. The slurry was applied onto a copper foil current collector to form a thin, wet film and the laminated current collector was dried in a vacuum oven to remove NMP and to cure the polymer. The laminated current collector was then pressed between rollers of a sheet mill to obtain a desired lamination thickness. The dried laminate contained from 2 to 20 wt % binder with the remainder of the electrode contributed by the powders. The negative electrodes were electrochemically pre-lithiated with sufficient lithium to compensate for 100% to 160% of the loss of lithium due to the anode irreversible capacity loss.

An initial set of coin cells were formed using a lithium foil counter electrode, referred to as a half cell. A section of negative electrode was cut to size along with separator, a section of lithium foil and corresponding current collector for the lithium foil. The separator for the coin cells described herein comprises a commercial tri-layer polyolefin separator. An electrolyte comprising dimethyl carbonate and fluoroethylenecarbonate was placed in the cell and the cell was sealed. The coin cells were then cycled from 0.005V to 1.5V in a battery for a first cycle charge and discharge of C/10 rate, a second cycle charge and discharge rate of C/5 rate, and the remaining cycles at a charge and discharge rate of C/3. The initial specific capacities are presented in Table 1. In the half cell format, the lithium foil discharges initially to load (intercalate or alloy) lithium into the silicon oxide based electrode, and then a charging step reverses this reaction to remove (de-intercalate or de-alloy) lithium from the silicon oxide based electrode.

TABLE 1

| Sample | $1^{st}$ Insertion (mAh/g) | $1^{st}$ deinsertion (mAh/g) | IRCL (%) | C/3 Capacity (mAh/g) |
|---|---|---|---|---|
| 1 | 1611 | 1163 | 28 | 1215 |
| 2 | 1703 | 1244 | 27 | 1310 |
| 3 | 1831 | 1345 | 27 | 1405 |
| 4 | 2150 | 1550 | 28 | 1550 |

Figure 5:
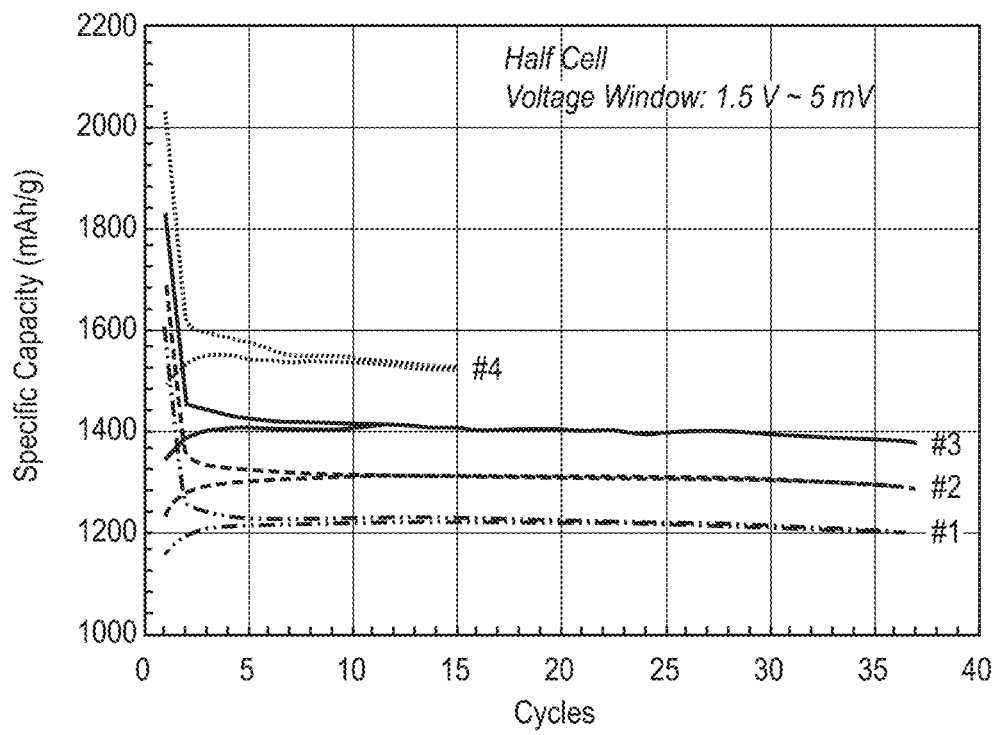
FIG. 5 plot of specific capacity as a function of cycle number for a set of half cells (lithium foil electrode) for a set of electrodes with active material materials with either $SiO_x$/Si/C composite optionally with selected amounts of blended graphite.

The specific capacity as a function of cycle number are plotted in FIG. 5 for both charge and discharge. The charge and discharge capacities essentially merge after about 10 cycles. The specific capacity decreases with increasing amounts of graphite, which is expected. The cells with graphite exhibited notable improvement in cycling stability relative to the battery with only the silicon suboxide based active material. In the half cell format, the cells with different amount of graphite exhibited similar cycling stability.

Figure 6:
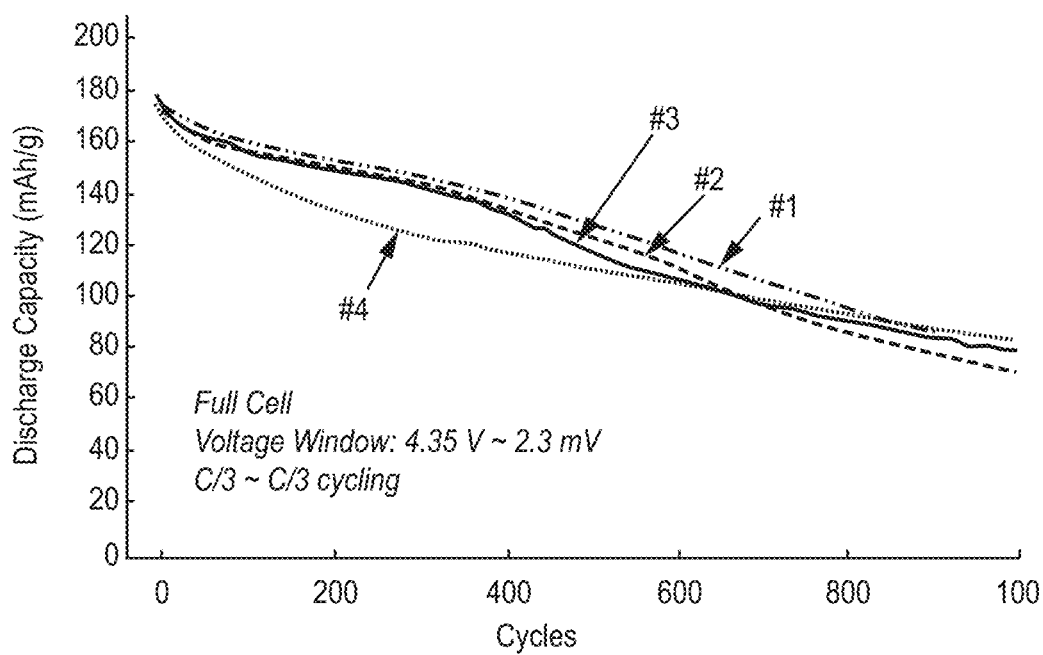
FIG. 6 is a plot of specific capacity as a function of cycle number for a set of full coin cells with a blend of lithium metal oxides for the positive electrode active material and a set of negative electrodes with either $SiO_x$/Si/C composite optionally with selected amounts of blended graphite.
Figure 7:
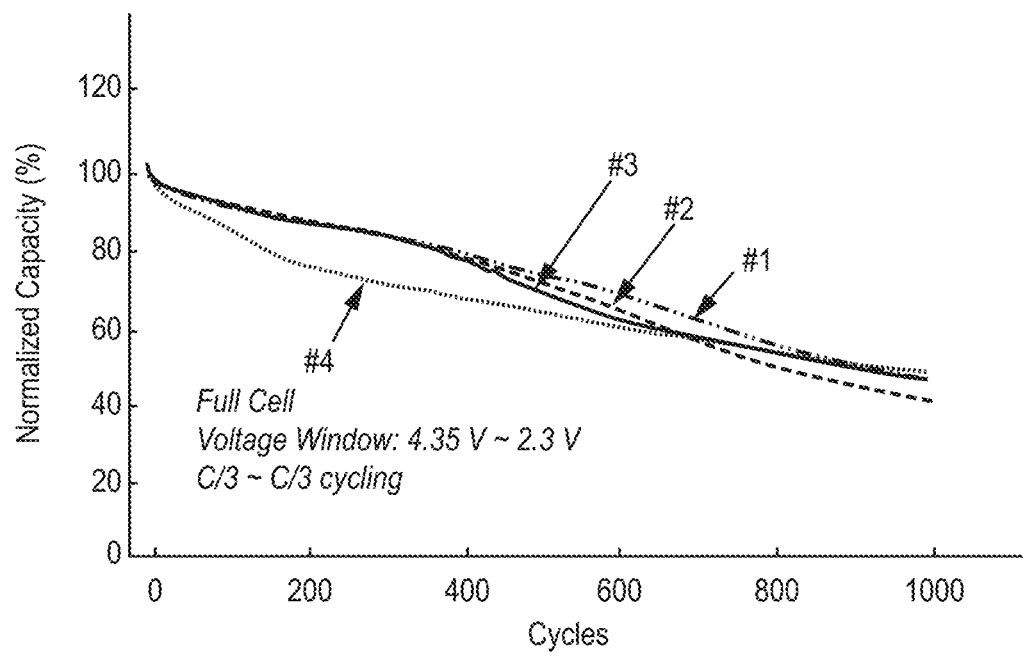
FIG. 7 is a plot of normalized specific capacity as a function of cycle based on the specific capacity plot of FIG. 6.

Another series of cells were formed with the four silicon oxide composite based electrode samples and with a positive electrode formed with a blend of nickel rich-lithium nickel manganese cobalt oxide (N-NMC) combined with lithium+manganese rich NMC (see the '901 patent above). These full cells are referenced according to their negative electrode samples. The assembled cells were cycled between 4.35V and 2.3V. The cell was in the first cycle charged and discharged at a rate of C/10, in the second cycle at a C/5 rate, followed by cycling at a C/3 rate. The cycling results for specific capacity are plotted in FIG. 6, and the normalized capacity results are presented in FIG. 7. The cells with graphite in the negative electrode exhibited improved cycling through more than 600 cycles and about 60% or more capacity retention. Table 2 summarizes the cycling performance. For this cell format, the cell performance became similar with and without graphite active material for longer cycling over 600 cycles.

TABLE 2

| Sample | C/3 Discharge capacity (mAh/g) | Cycle life to 80% capacity retention | Cycle life to 60% capacity retention |
|---|---|---|---|
| 1 | 175 | 363 | 690 |
| 2 | 173 | 336 | 630 |
| 3 | 172 | 343 | 598 |
| 4 | 175 | 142 | 552 |

Another series of coin cells were formed using three different nanoscale carbon conductive additives: carbon black, carbon nanofibers or carbon nanotubes. The silicon based electrodes were otherwise the same as described above. A first set of coin cells were formed with a lithium metal foil counter electrode. The coin cells were formed as described above. The half-cell performance is summarized in Table 3 for the noted rate capability, first discharge/charge at C/10, second discharge/charge at C/5 and subsequent discharge/charge at C/3.

Figure 8:
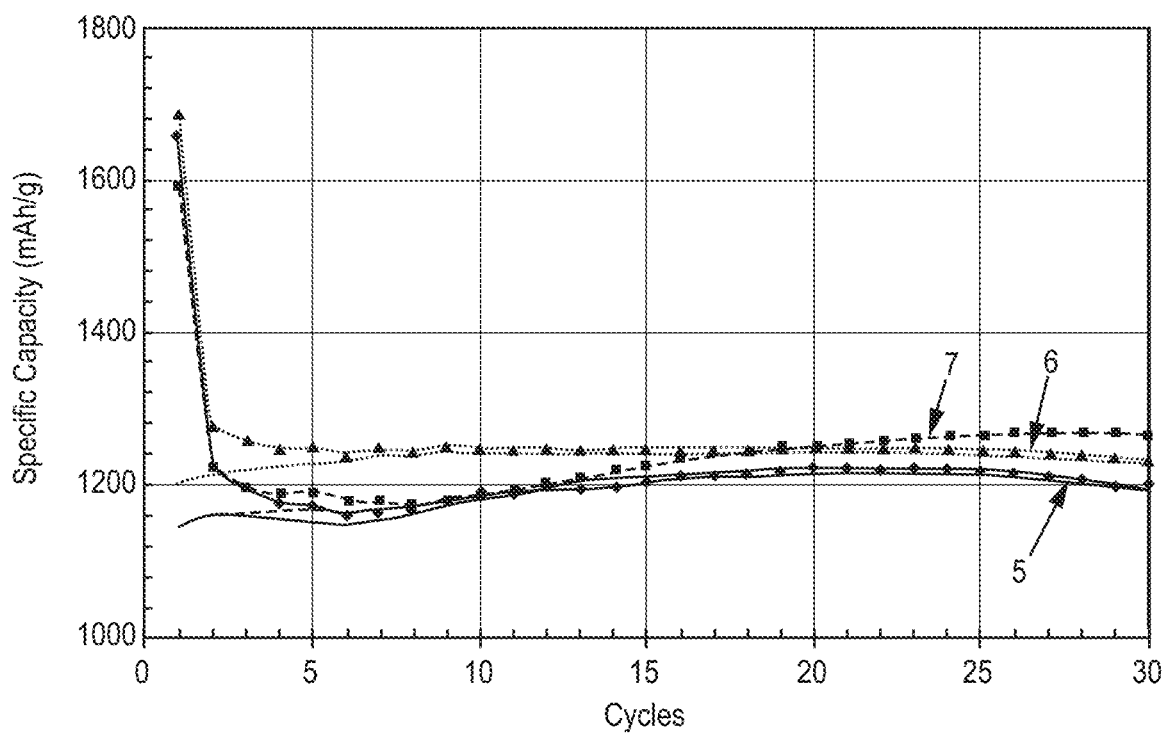
FIG. 8 is a plot of specific capacity as a function of cycle for a set of half cells with an active material blend and different nanoscale carbon conductive additives.

The charge and discharge specific capacities are plotted in FIG. 8. For low cycle numbers the carbon black specific capacities were higher, but cells with carbon nanofibers exhibited higher discharge specific capacities at larger numbers of cycles. The specific capacities exploring the rate capability of these cells is shown in Table 3.

TABLE 3

| Sample | Conduction Additive Type | $1^{st}$ Insert | $1^{st}$ De-Insert | IRCL % | C/10 | C/5 | C/3 |
|---|---|---|---|---|---|---|---|
| 5 | Carbon nanotubes | 1639 | 1159 | 29 | 1182 | 1185 | 1184 |
| 6 | Carbon Black | 1682 | 1198 | 29 | 1213 | 1222 | 1225 |
| 7 | Carbon fibers | 161 | 1162 | 28 | 1181 | 1190 | 1194 |

Figure 9:
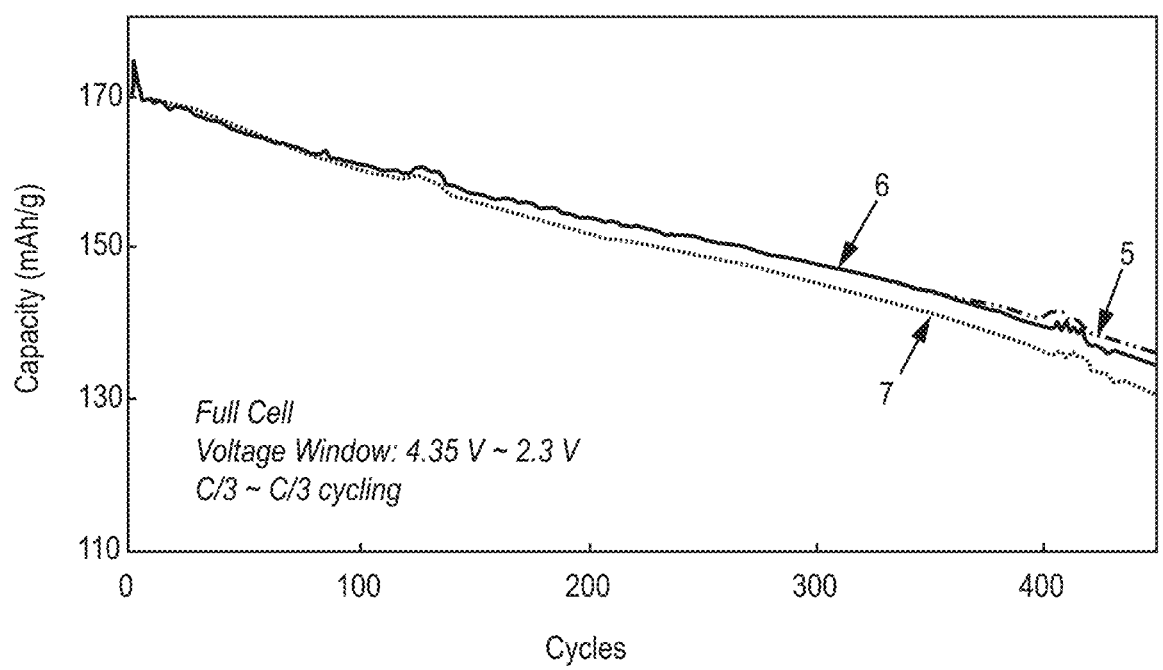
FIG. 9 is a plot of specific capacities as function of cycle for full coin cells for the silicon based electrodes of FIG. 8 with a blend of lithium metal oxides for the positive electrode active material.
Figure 10:
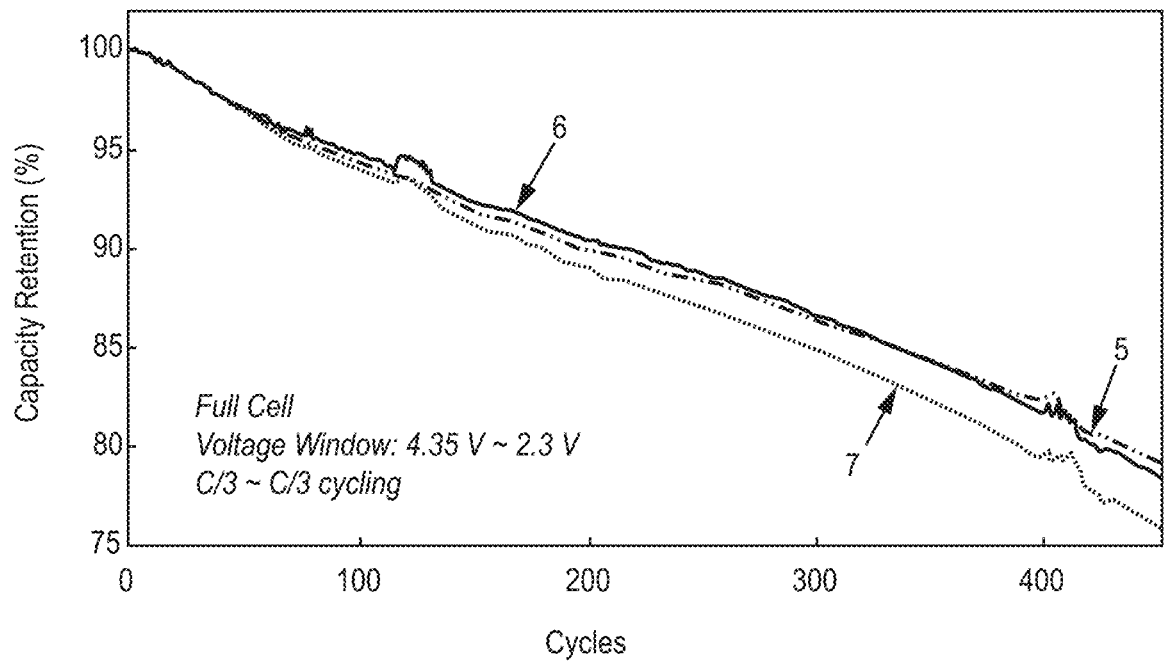
FIG. 10 is a plot of normalized specific capacities as a function of cycle for the specific capacities in FIG. 9.

A set of full cells were also formed using the negative electrodes with differing conductive additives and the same positive electrodes used to form Sample full cells 1-4. Again, the full cells are referenced according to the negative electrode samples (5=carbon nanotubes, 6=carbon black, 7=carbon nanofibers). The initial performance of these cells is summarized in Table 4. The specific capacity results are plotted as a function of cycle in FIGS. 9 (specific capacities) and 10 (normalized capacities). For these cells, the cells with carbon black and carbon nanotubes performed similarly while the cells with carbon nanofibers had worse performance at larger numbers of cycles.

TABLE 4

| Sample | Conduction Additive Type | C/3 capacity (mAh/g) | Cycle for 80% Retention (C/3 Capacity) |
|---|---|---|---|
| 5 | Carbon Nanotubes | 169 | 429 |
| 6 | Carbon Black | 169 | 417 |
| 7 | Carbon fiber | 168 | 384 |

Example 2—Binder Composition for Negative Electrode

This Example demonstrates improved cycling performance for silicon based electrodes using a mixed binder formulation.

Four sets of cells were formed to test the binder composition. Two sets of cells, one set of half cells and one set of full cells, were formed with a first active composition ratio, and two sets of cells, one set of half cells and one set of full cells, were formed with a second active composition ratio. The first active composition ratio was 70 wt % SiO composite and 30 wt % graphite, and from 2-6 wt % carbon nanotubes were included as a conductive additive. Five half cells were assembled as described above in Example 1 with a lithium foil electrode within a coin cell. Samples 8, 9 and 12 had from 1-7 wt % lower elastic modulus binder and 7-15% polyimide with samples 9 and 12 having the same amount of lower elastic modulus binder and sample 8 had a greater amount of lower elastic modulus binder (binder 2) relative to samples 9 and 12. Sample 12 had a greater amount of polyimide relative to sample 9 and a corresponding lower amount of active material. The binder 2 to polyimide weight ratios in samples 8, 9, and 12 were 0.714, 0.333, and 0.250, respectively. Samples 10 and 11 did not include any binder 2, and sample 10 had a lower amount of polyimide and a corresponding greater amount of conductive carbon nanotubes.

Figure 11:
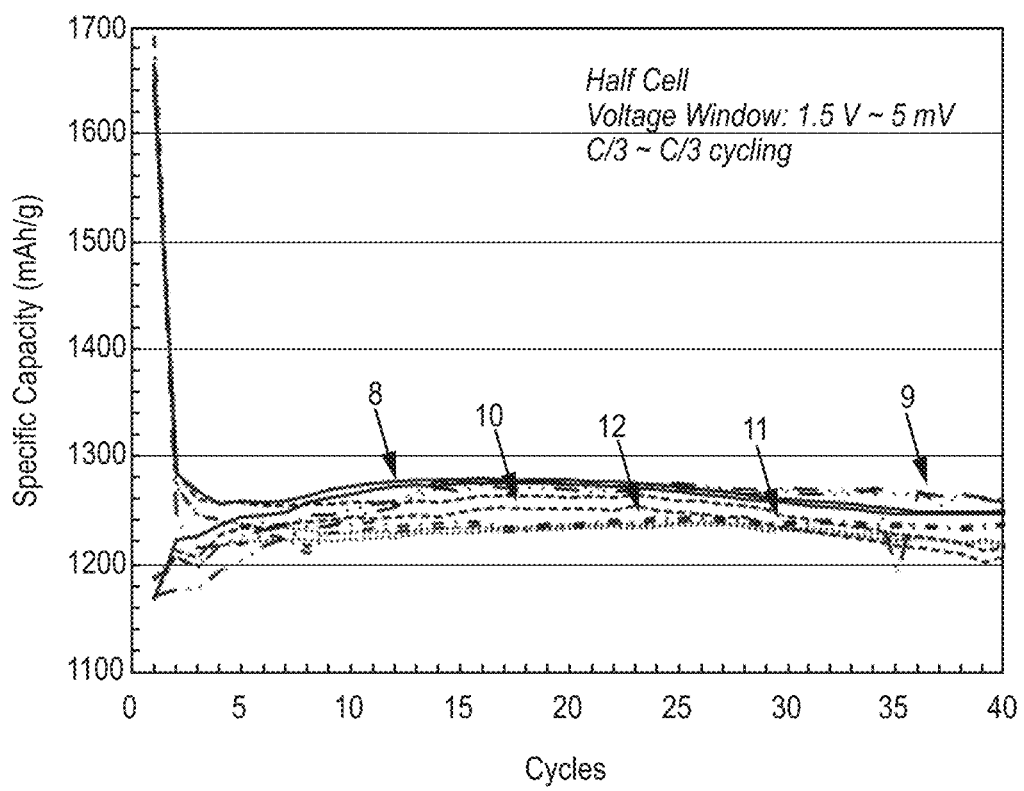
FIG. 11 is a plot of specific capacity as a function of cycle for half cells with electrodes comprising different polymer binder formulations.

The assembled half cells were cycled between 0.005V and 1.5V at C/10 for the first cycle, C/5 for the second cycle and subsequently at C/3 rate. The initial cycle performance is shown in Table 5. The specific charge and discharge capacities as a function of cycle number are plotted in FIG. 11. For longer cycling the samples with the polymer blends exhibited improved capacities.

TABLE 5

| Sample | $1^{st}$ Insertion (mAh/g) | $1^{st}$ deinsertion (mAh/g) | IRCL % | C/3 Capacity (mAh/g) |
|---|---|---|---|---|
| 8 | 1646 | 1168 | 29 | 1267 |
| 9 | 1663 | 1173 | 29 | 1217 |
| 10 | 1646 | 1169 | 29 | 1285 |
| 11 | 1669 | 1188 | 29 | 1272 |
| 12 | 1678 | 1186 | 29 | 1243 |

Figure 12:
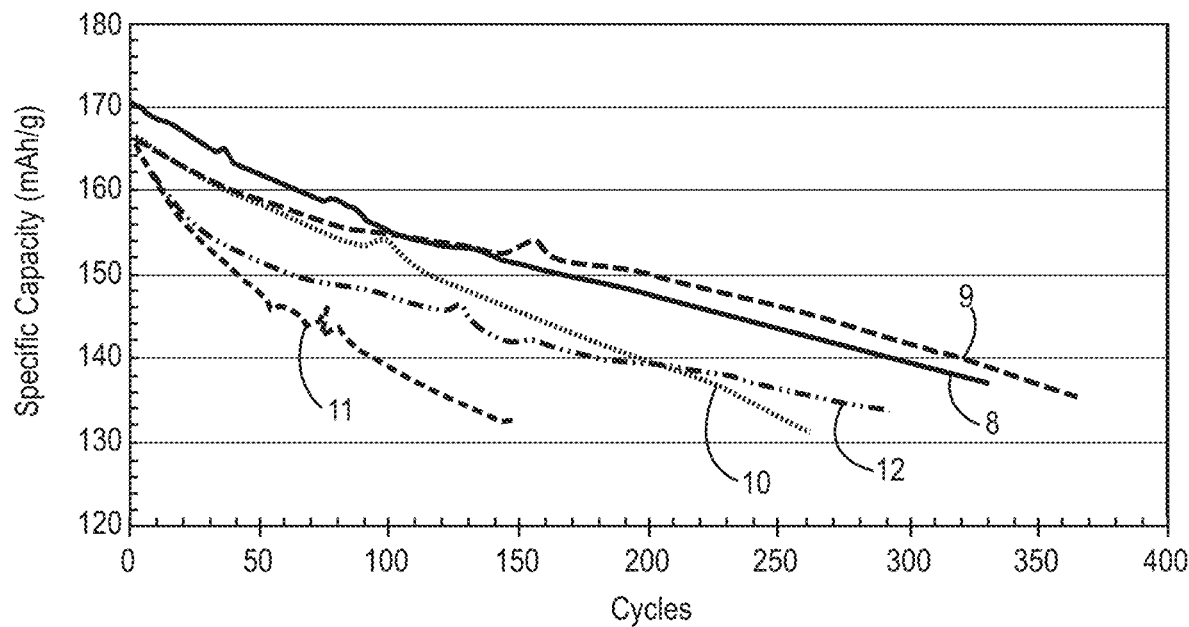
FIG. 12 is a plot of specific capacity as a function of cycle for full cells with negative electrodes corresponding to those used in the half cells of FIG. 11 with positive electrodes comprising a lithium metal oxide blend.
Figure 13:
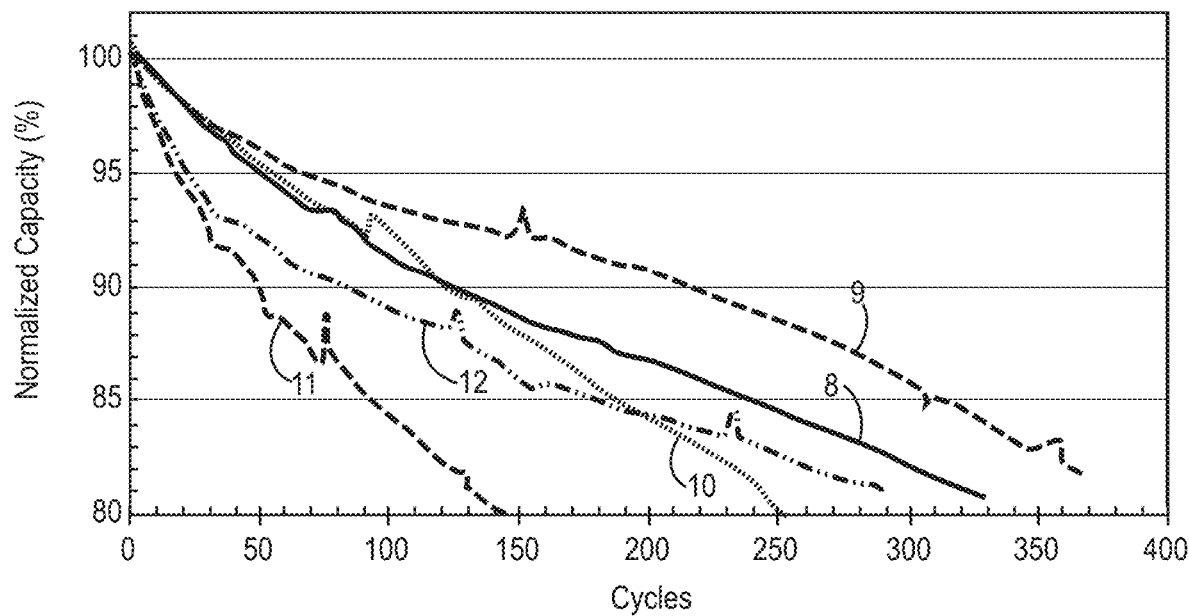
FIG. 13 is a plot of normalized capacities as a function of cycle for the full cells of FIG. 12.

A set of full cells were also formed with positive electrodes with a blend of lithium metal oxides and coin cell structures as described in Example 1. These cells are referenced according to their negative electrode samples. The cells were cycled at C/10 first cycle, C/5 second cycle, and C/3 third cycle on. The charge and discharge capacities are plotted in FIGS. 12 (specific capacities) and 13 (normalized capacity). The performance is also summarized in Table 6. Again, the cells with the polymer binder blends exhibited improved cycling performance.

TABLE 6

| Sample | C/3 Discharge capacity (mAh/g) | Cycle life to 90% capacity retention | Cycle life to 80% capacity retention |
|---|---|---|---|
| 8 | 170 | 130 | ~340 |
| 9 | 165 | 210 | ~390 |
| 10 | 164 | 125 | 250 |
| 11 | 164 | 50 | 145 |
| 12 | 164 | 85 | ~310 |

The second two sets of cells, one set of half cells and one set of full cells, were formed with the second active composition ratio. The second active composition ratio was 85 wt % $SiO_x$/Si/C composite and 15 wt % graphite, and the cells further comprised from 2-6 wt % carbon nanotubes as a conductive additive. Five half cells were assembled as described above with a lithium foil electrode within a coin cell. Samples 13, 14 and 17 had from 1-7 wt % lower elastic modulus binder (binder 2) and 7-15% polyimide with samples 14 and 17 having the same amount of binder 2 and sample 13 had a greater amount of binder 2 relative to samples 14 and 17. Sample 17 had a greater amount of polyimide relative to sample 14 and a corresponding lower amount of active material. The binder 2 to polyimide weight ratios in samples 13, 14, and 17 were 0.714, 0.333, and 0.250, respectively. Samples 15 and 16 did not include any binder 2, and sample 15 had a lower amount of polyimide and a corresponding greater amount of conductive carbon nanotubes.

Figure 14:
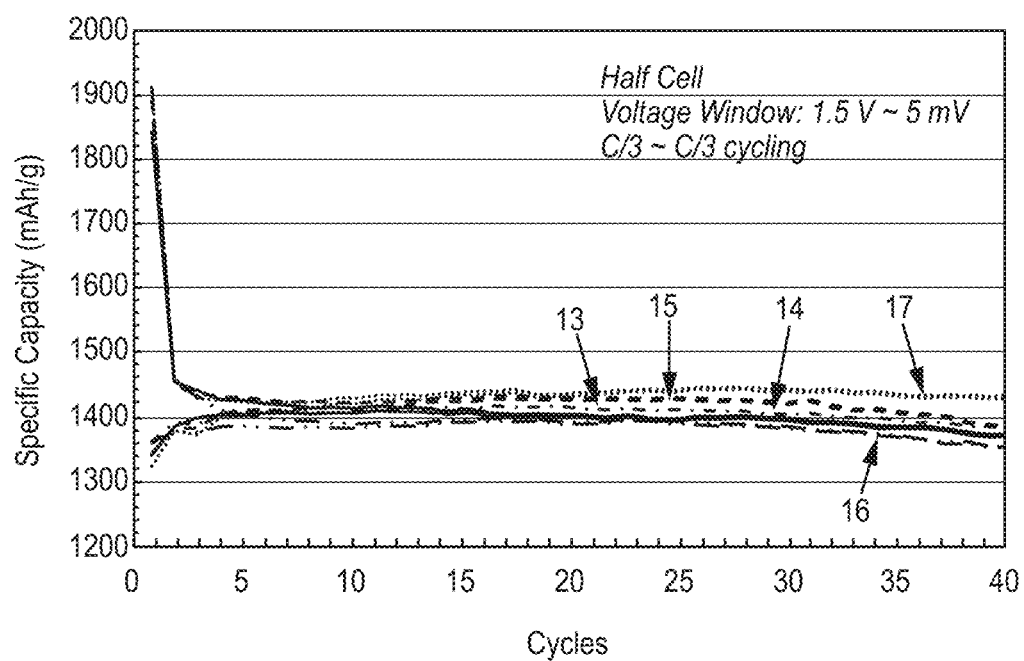
FIG. 14 is a plot of specific capacity versus cycle for half cells with an alternative active material formulation relative to the cells of FIGS. 11-13 in which the electrodes comprise 5 different formulations with four distinct binder compositions.
Figure 17:
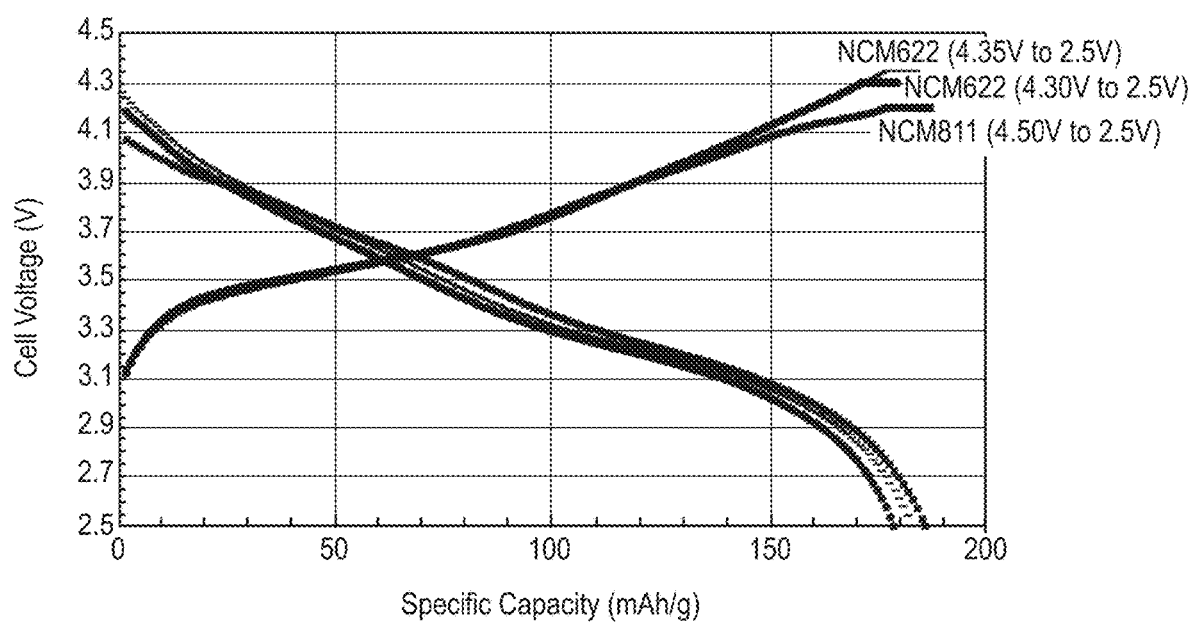
FIG. 17 is a set of plots of cell voltage as a function of specific capacity for coin cells with negative electrodes with a blend of silicon oxide/carbon composite particles and graphite, and with positive electrodes with $LiNi_{0.6}Mn_{0.2}Co_{0.2}O_2$ (NMC622) or $LiNi_{0.8}Mn_{0.1}Co_{0.1}O_2$ (NMC811), which are cycled over a voltage window noted in the figure.

The assembled half cells were cycled between 0.005V and 1.5V at C/20 for the first cycle, C/5 for the second cycle and subsequently at C/3 rate. The initial cycle performance is presented in Table 7. The specific charge and discharge capacities as a function of cycle number are plotted in FIG. 14. For longer cycling the samples with the polymer blend with the decreased active material loading exhibited the best cycling, and the cell with only polyimide and no increased conductive additive exhibited the worst cycling capacities.

charge/discharge cycle is plotted in FIG. 17 for one representative cell with each cathode material. The results for all of the samples are also summarized in Table 9.

TABLE 9

| Samples | Cathode Blend Material | Cathode Loading (mg/cm$^2$) | Activation Voltage | C/10 Charge | C/10 Discharge | IRCL | C/10 Avg. V |
|---|---|---|---|---|---|---|---|
| 18 | NMC | 21.7 | 2.5~4.30 V | 204 | 185 | 19 | 3.473 |
| 19 | 622 | 21.9 | | 203 | 184 | 19 | 3.474 |
| 20 | | 22.0 | | 204 | 184 | 20 | 3.474 |
| 21 | | 22.2 | 2.5~4.35 V | 209 | 190 | 19 | 3.483 |
| 22 | | 22.3 | | 209 | 188 | 21 | 3.489 |
| 23 | NMC | 21.7 | 2.5~4.20 V | 216 | 187 | 29 | 3.463 |
| 24 | 811 | 21.7 | | 216 | 186 | 30 | 3.466 |
| 25 | | 21.8 | | 217 | 186 | 31 | 3.465 |

TABLE 7

| Sample | 1$^{st}$ Insertion (mAh/g) | 1$^{st}$ deinsertion (mAh/g) | IRCL % | C/3 Capacity (mAh/g) |
|---|---|---|---|---|
| 13 | 1832 | 1345 | 27 | 1429 |
| 14 | 1902 | 1365 | 28 | 1465 |
| 15 | 1879 | 1347 | 28 | 1458 |
| 16 | 1899 | 1363 | 28 | 1453 |
| 17 | 1898 | 1328 | 30 | 1460 |

Figure 15:
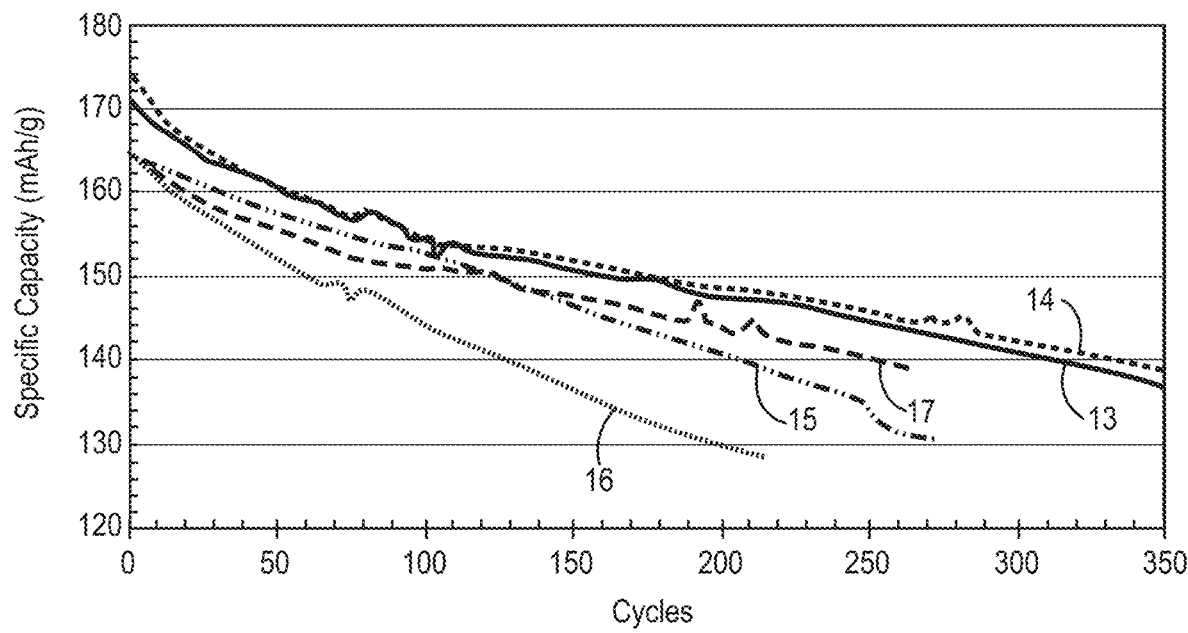
FIG. 15 is a plot of specific capacity as a function of cycle for full cells with negative electrodes corresponding to those used in the half cells of FIG. 14 with positive electrodes comprising a lithium metal oxide blend.
Figure 16:
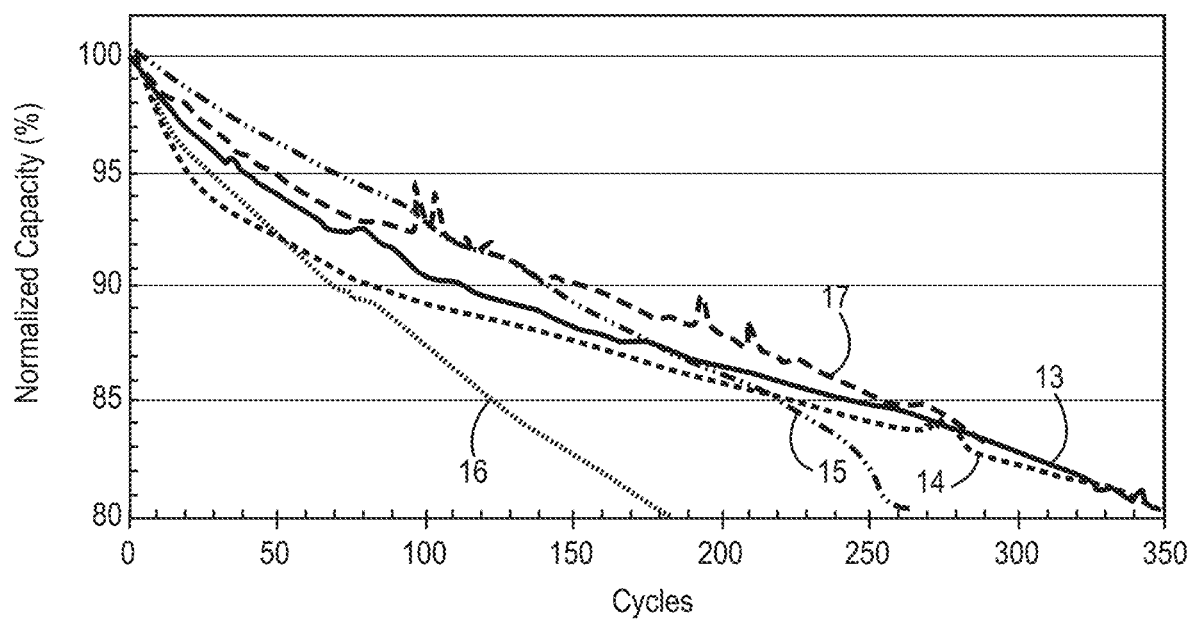
FIG. 16 is a plot of normalized capacities as a function of cycle for the full cells of FIG. 15.

A set of full cells were also formed for the second set of negative electrodes with positive electrodes and coin cell structures as described in Example 1. The cells are referenced according to the negative electrode sample numbers. The cells were cycled at C/10 first cycle, C/5 second cycle, and C/3 third cycle on. The charge and discharge capacities are plotted in FIG. 15 (specific capacities) and 16 (normalized capacity). The performance is also summarized in Table 8. Again, the cells with the polymer blends exhibited improved cycling performance.

TABLE 8

| Sample | C/3 Discharge capacity (mAh/g) | Cycle life to 90% capacity retention | Cycle life to 80% capacity retention |
|---|---|---|---|
| 13 | 171 | 114 | 350 |
| 14 | 167 | 85 | 350 |
| 15 | 164 | 140 | 270 |
| 16 | 165 | 70 | 180 |
| 17 | 164 | 150 | ~350 |

Example 3—Cells with NMC Positive Electrodes

This example demonstrates good cycling performance with non-blended positive electrode active materials.

In a first set of cells, the negative electrode for these cells was approximately the same as for sample 8 above. The positive electrodes was basically equivalent to the electrodes of Examples 1 and 2 except for the use of either LiNi$_{0.8}$Mn$_{0.1}$Co$_{0.1}$O$_2$ (NMC811) or LiNi$_{0.6}$Mn$_{0.2}$Co$_{0.2}$O$_2$ (NMC622) as the only active material for the cells. Cells were formed though with different loadings of positive electrode active material. The NMC 622 cells were cycled over either 4.30V to 2.5V or 4.35V to 2.5V, and the NMC 811 cells were cycled over the voltage range of 4.20V to 2.5V.

The initial charge discharge cycle was performed at a rate of C/10. The voltage versus specific capacity for the first Also, the cells corresponding to Samples 18-25 were cycled. Specifically, the cells were in the first cycle charged and discharged at a rate of C/10, in the second cycle at a C/5 rate, followed by cycling at a C/3 rate. The rate capability of the cell samples based on discharge capacities at specified discharge rates are summarized in Table 10.

TABLE 10

| Samples | Cycling Voltage | C/10 | C/5 | C/3 | C/3 Avg. V |
|---|---|---|---|---|---|
| 18 | 2.5-4.30 V | 186 | 183 | 180 | 3.409 |
| 19 | | 186 | 183 | 180 | 3.412 |
| 20 | | 186 | 183 | 180 | 3.412 |
| 21 | 2.5-4.35 V | 191 | 188 | 186 | 3.430 |
| 22 | | 189 | 185 | 183 | 3.434 |
| 23 | 2.5-4.20 V | 193 | 189 | 186 | 3.416 |
| 24 | | 191 | 188 | 185 | 3.424 |
| 25 | | 192 | 189 | 186 | 3.422 |

Figure 18:
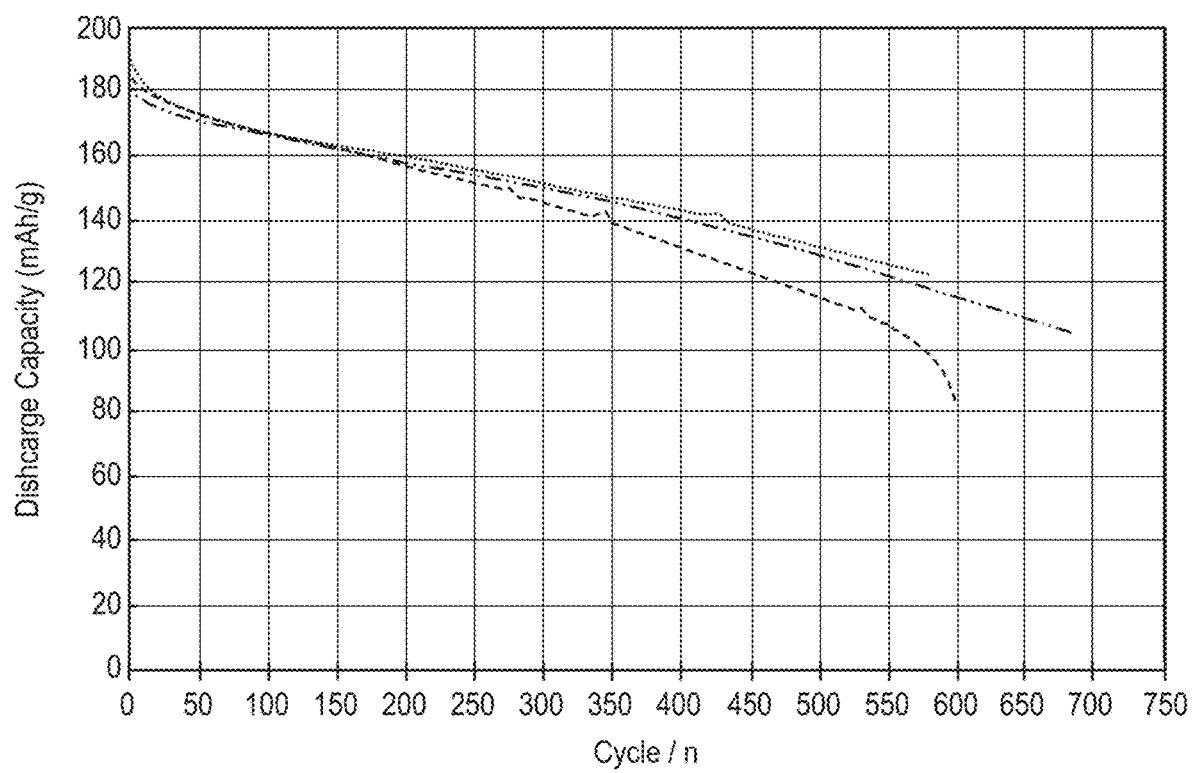
FIG. 18 is a set of plots of specific discharge capacity as a function of cycle number for the three coin cell formats noted for FIG. 17.
Figure 19:
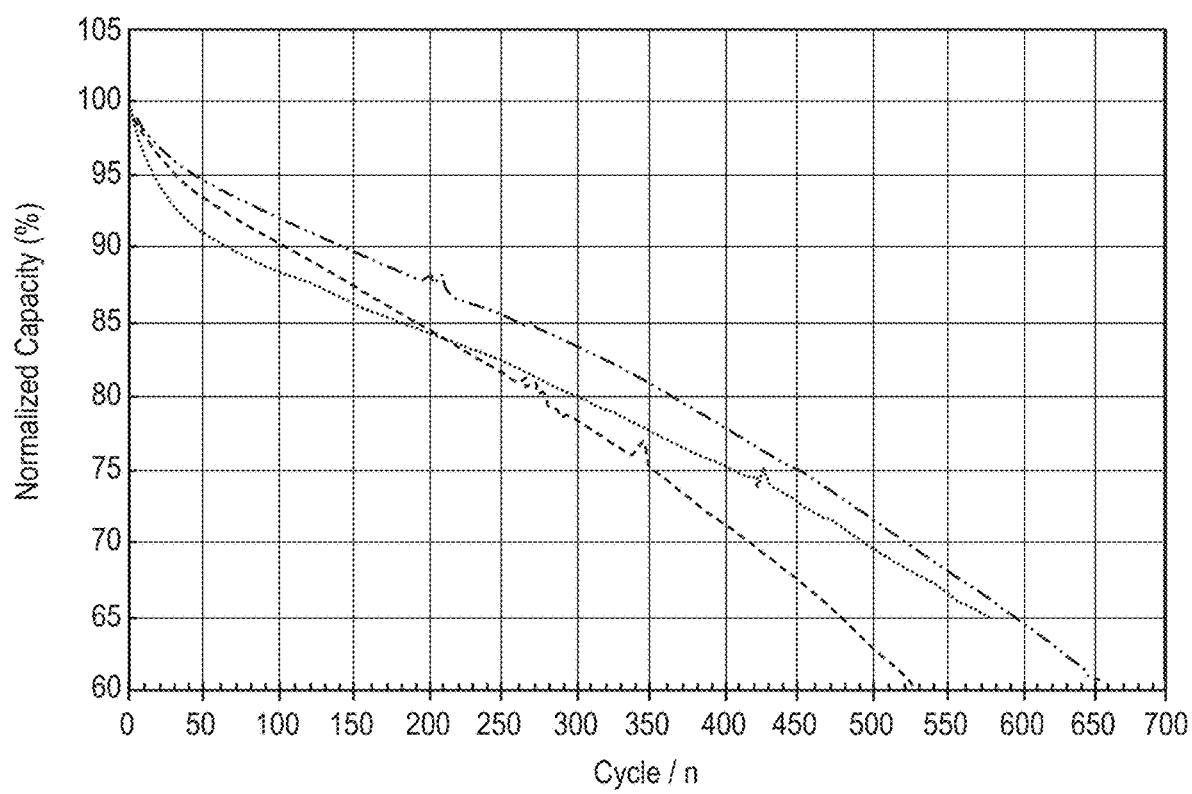
FIG. 19 is a set of plots of normalized specific discharge capacity as a function of cycle number for the three coin cells used to generate the results plotted in FIG. 18.

The discharge capacity as a function of cycle is plotted in FIG. 18 for samples 19, 21 and 24, and the normalized capacities as a function of cycle are plotted in FIG. 19. The best cycling performance for these coin cells was the sample based on NMC622 cycled from 4.30V to 2.5V while the worst cycling performance over the full cycling range was based on NMC622 cycled from 4.35V to 2.5V.

Another set of cells were formed with NMC811 as the positive electrode active material. For this set of cells, the negative electrode comprised the SiO$_x$/Si/C composite material without any graphite, and the negative electrode comprised polyimide binder and included a mixture of carbon nanotubes and acetylene black as a conductive additives. The electrodes were designed to achieve a high energy density.

Figure 20:
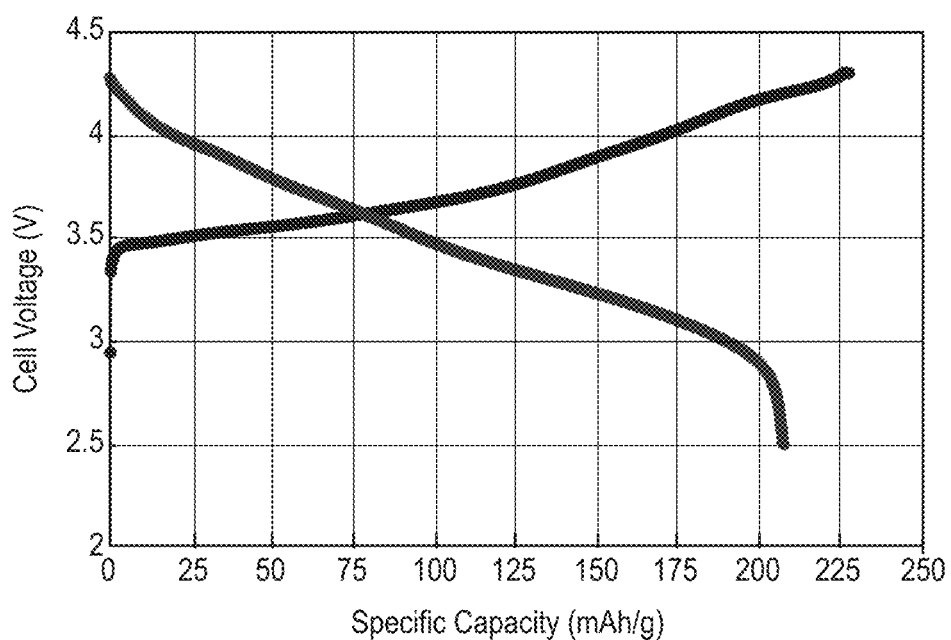
FIG. 20 is a plot of cell voltage as a function of specific capacity for a coin cell with a NMC811 based positive electrode and a silicon oxide-graphite blend negative electrode over the first cycle with a charge and discharge rate of C/20.
Figure 21:
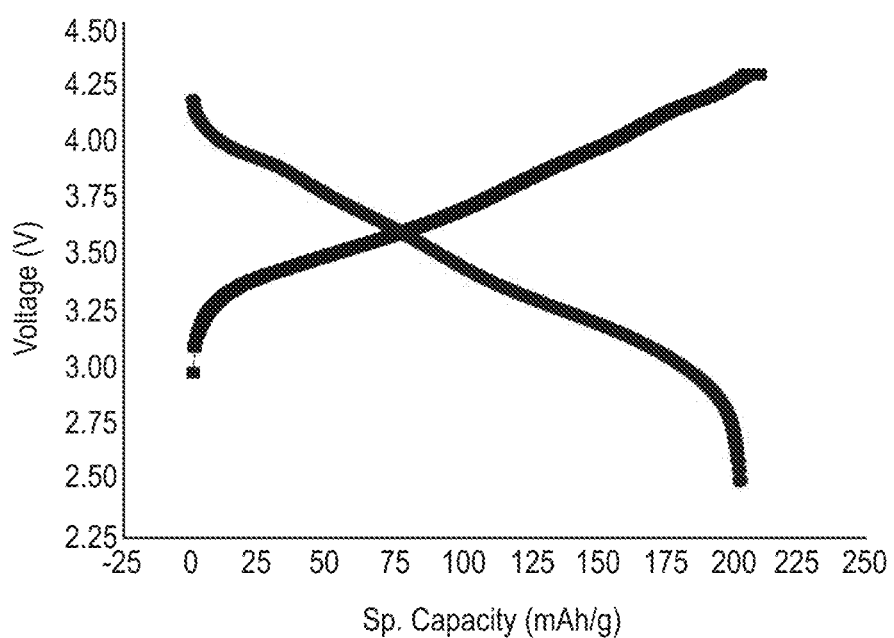
FIG. 21 is a plot of voltage as a function of specific capacity over the second charge/discharge cycle for the coin cell used to generate FIG. 20 with a charge rate of C/6 and a discharge rate of C/10.

The cell voltage as a function of specific capacity is plotted in FIG. 20 from 4.3V to 2.5V at a charge and discharge rate of C/20. The cell exhibited a discharge capacity at C/20 of 207.6 mAh/g. Referring to FIG. 21, a plot is shown of cell voltage as a function of specific capacity for the second charge/discharge cycle charged at a rate of C/6 to 4.3V and discharged at a rate of C/10, which resulted in a slightly lower specific capacity. For the initial charges, the cells were charged at a constant current until the charge voltage was reached and then at a constant voltage until the current falls to a low value.

Figure 22:
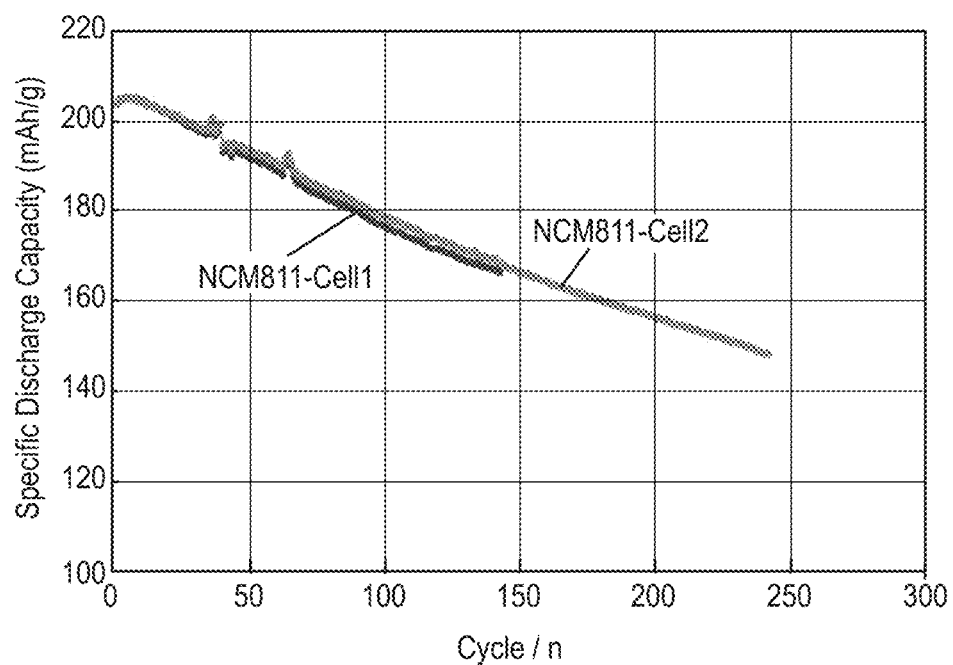
FIG. 22 is a plot of specific discharge capacity as a function of cycle for two equivalent coin cells similar to those used for generating the plot in FIG. 20.
Figure 23:
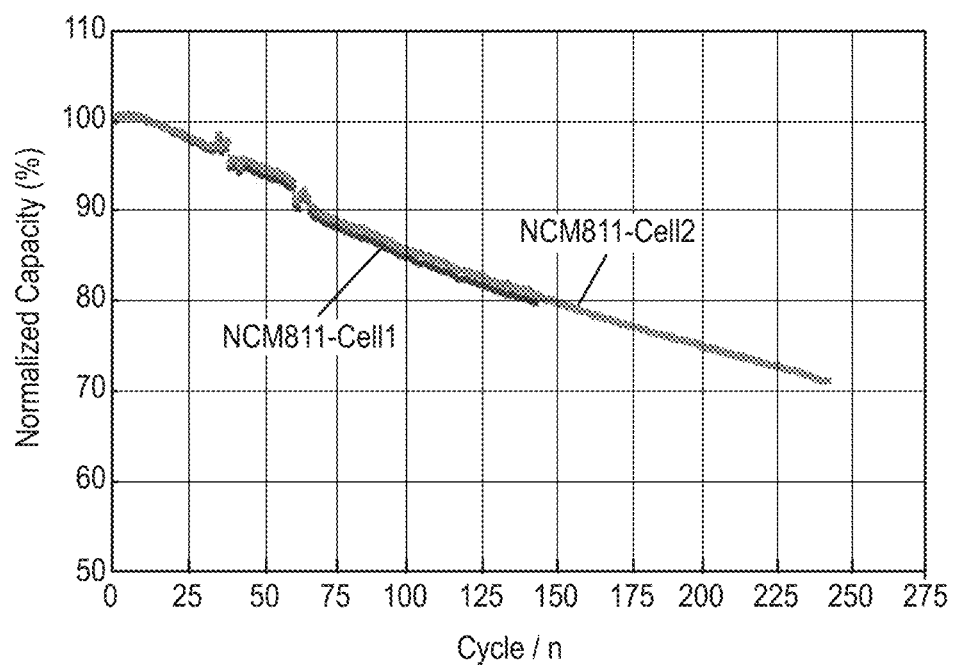
FIG. 23 is a plot of normalized capacity as a function of cycle for the coin cells used to generate FIG. 22

The cells, two equivalent cells in duplicate, initially charged/discharged at a rate of C/20 were then cycled at a charge rate of C/6 and a discharge rate of C/10. The specific capacity as a function of cycle is plotted in FIG. 22, and the normalized specific capacity is plotted in FIG. 23. The cells maintained at least 80% of their capacity for 130-140 cycles.

Example 4—Large Capacity Long Cycling Batteries

This Example demonstrates long cycling stability based on improved negative electrodes loaded into large format batteries.

Two pairs of pouch batteries were formed with the same electrodes in two different battery sizes. The negative electrode comprised $SiO_x/Si/C$ composite material with 30 wt % graphite active material. The negative electrode had a blend of polyimide and lower elastic modulus binders and carbon nanotubes conductive material. The positive electrode was a blend of nickel-rich NMC and HCMR. Based on low rate (C/20) capacities, the negative electrode capacity initially was about 150% of the positive electrode capacity. The fluorinated electrolyte described above was also used.

Figure 24:
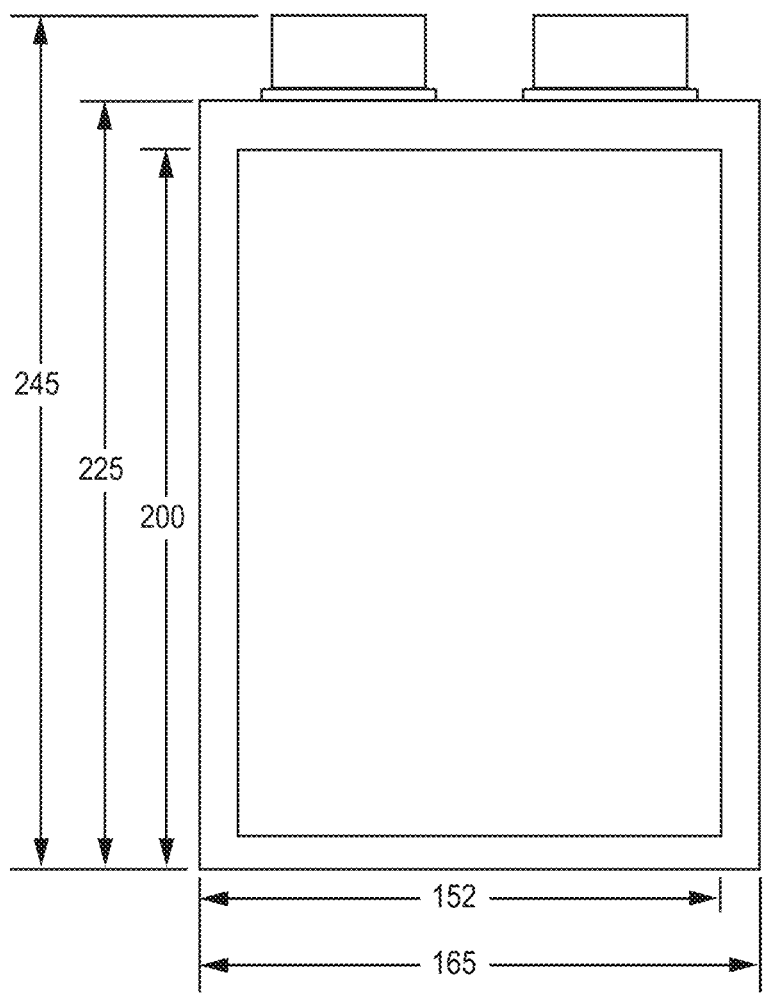
FIG. 24 is a front view diagram of a pouch cell designed for operation at roughly 21 Ah.
Figure 25:
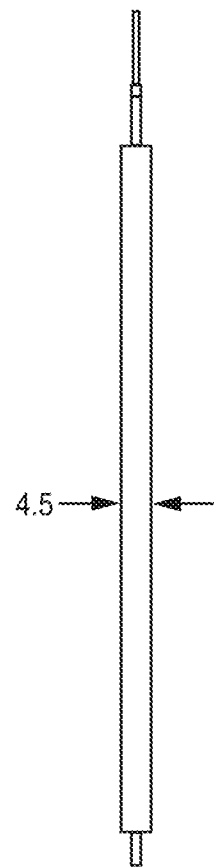
FIG. 25 is a side view diagram of the pouch cell of FIG. 24.

With respect to the two battery formats, a first format is shown in FIGS. 24 and 25 in which the prismatic shaped pouch cells have approximate dimensions, neglecting tabs, of 225 mm×165 mm×4.5 mm (thick) as noted in the figures (noted numbers are approximate dimensions in mm). A second format is shown in FIGS. 26 and 27 in which the prismatic shaped pouch cells have approximate dimensions, neglecting tabs, of 145 mm×64 mm×7.7 mm (thick) as noted in the figures (noted numbers are approximate dimensions in mm). The electrodes (10-25 cathode layers and 11-26 anode layers) were formed as described in Example 1, and a separator sheet was pleated with electrode plated placed within the separator folds. The separator for the pouch cells was a porous polymer sheet with a gel-forming polymer coating. Supplemental lithium was provided by applying lithium powder (SLMP®, FMC Corp.) to the negative electrode surface prior to assembly to roughly compensate for 100% to 160% of the IRCL of the silicon based negative electrode active material. The batteries was designed to have a total capacity of roughly 21 Ah (first format) or 11 Ah (second format) at a discharge rate of C/3 at 30 degrees C. The batteries were cycled with one formation cycle at a charge and discharge rate of C/20. The cells were then cycled at 30 degrees C. with a charge rate and a discharge rate of C/3.

Figure 28:
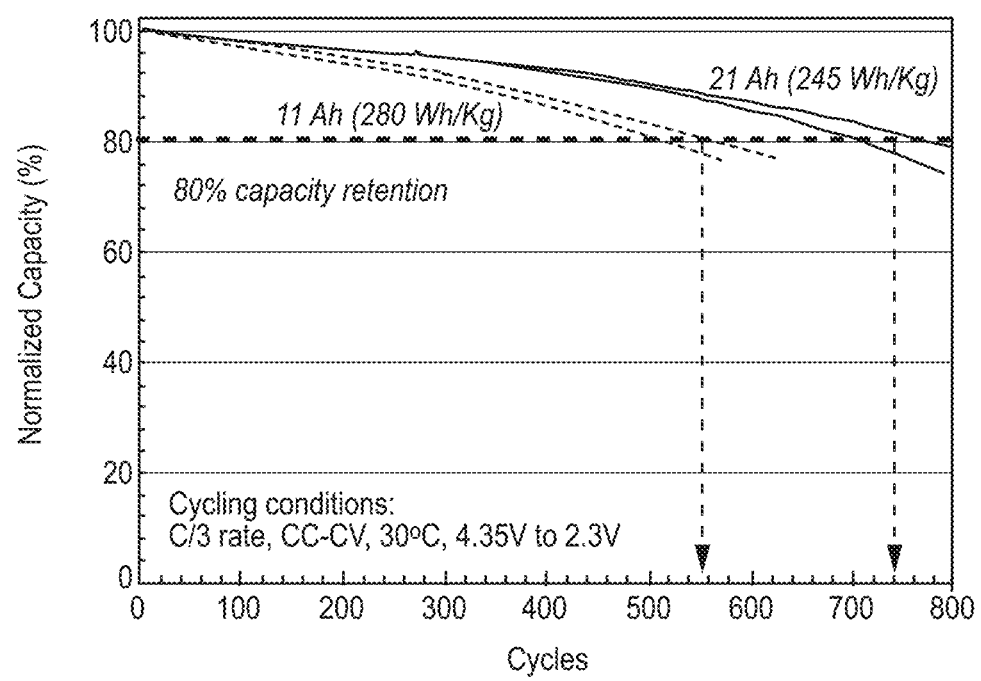
FIG. 28 is a plot of normalized capacity as a function of cycles for the pouch cells of FIGS. 24-27.

The 11 Ah battery design achieved a higher energy density of 280 Wh/kg, while the 21 Ah battery achieved a 245 Wh/kg energy density. The cycling of these two batteries is plotted in FIG. 28 for the pairs of batteries at the two sizes. The higher energy density battery (11 Ah design) exhibited roughly 550 cycles before reaching 80% capacity, while the 21 Ah battery design exhibited roughly 750 cycles with 80% capacity retention. Nevertheless, both of these batteries exceeded known performance for any batteries in this energy density range with the observed cycling performance.

Figure 29:
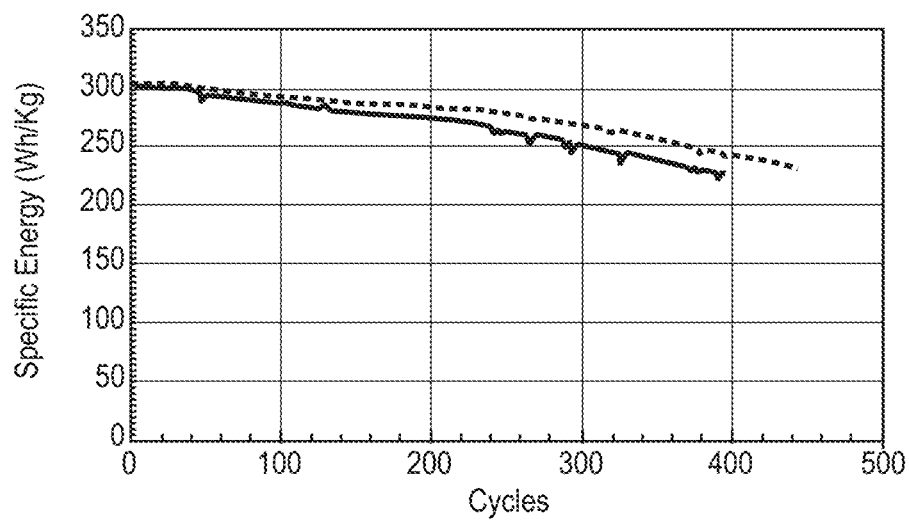
FIG. 29 is a plot of specific energy as a function of cycle number for pouch cells using silicon oxide/carbon blended with graphite and NMC622 based positive electrode cycled over voltage windows of 4.3V to 2.3V.
Figure 30:
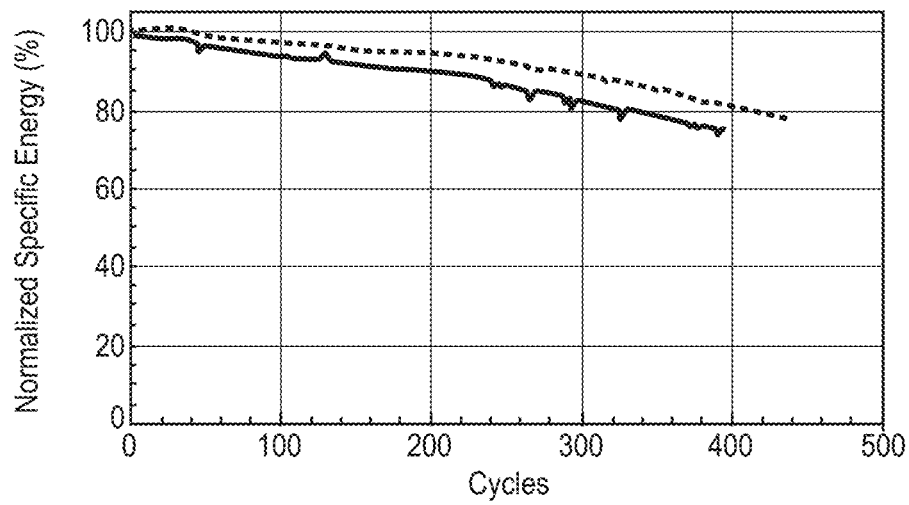
FIG. 30 is a plot of normalized specific energy as a function of cycle number for the two pouch cells used to generate the results in FIG. 29.
Figure 31:
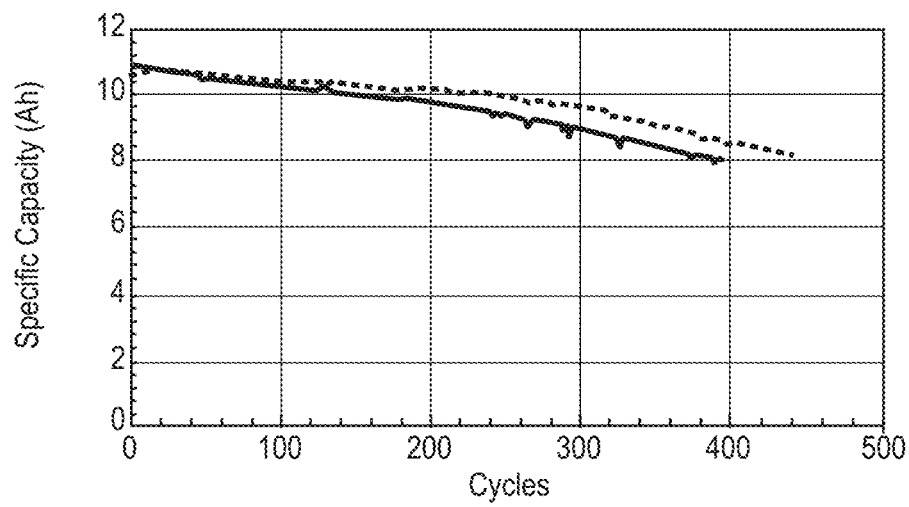
FIG. 31 is a plot of discharge capacity as a function of cycle number for the two pouch cells used to generate the results in FIG. 29.
Figure 32:
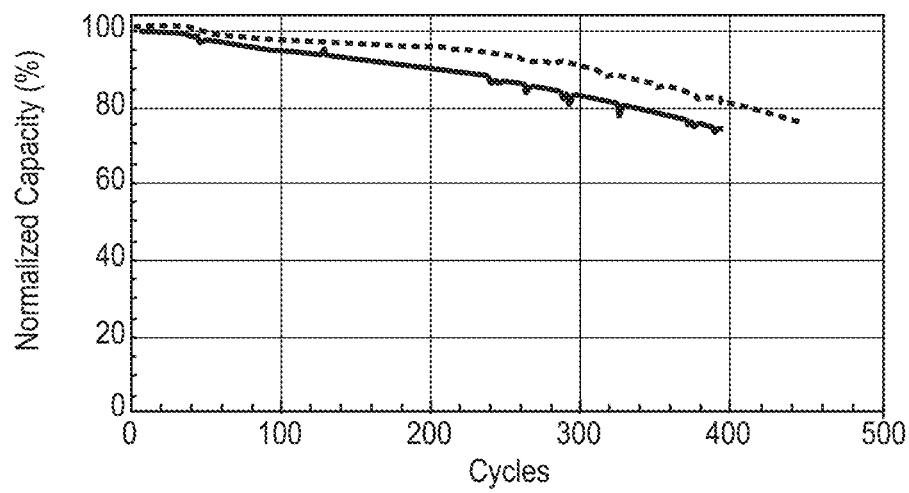
FIG. 32 is a plot of normalized discharge capacity as a function of cycle number for the two pouch cells used to generate the results in FIG. 29.

Also, target 11 Ah cells were formed from the same anode as the 11 Ah cell above with a NMC811 based positive electrode and from a NMC 622 based positive electrode with an anode having an active material with 85 wt % $SiO_x/Si/C$ composite and 15 wt % graphite. Except for the noted substitution of the active materials, the cell was comparable to the cell above with the cathode blend active materials. For the cells with the NMC622 positive electrodes, two comparable representative cells were cycled from 4.3V to 2.5V. The cycling results are plotted in FIGS. 29-32. In FIGS. 29 and 30, the specific energy and normalized specific energy are plotted as a function of cycle. The specific energy remained over 250 Wh/kg for over 300 cycles. FIGS. 31 and 32 are plots of corresponding specific capacity and normalized specific capacity over the same cycle range.

Figure 33:
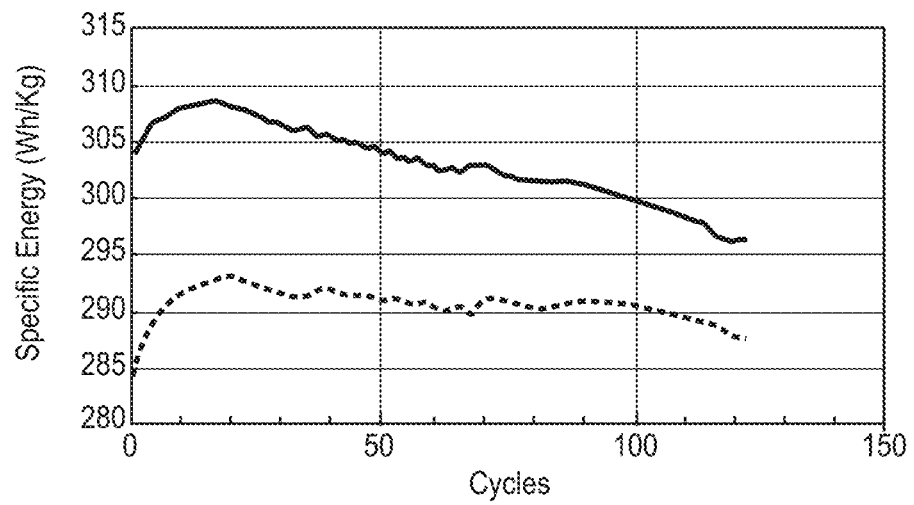
FIG. 33 is a plot of specific energy as a function of cycle for two pouch cells with an "11 Ah design" using a positive electrode with NMC811 active material and an improved silicon oxide based anode as described herein.
Figure 34:
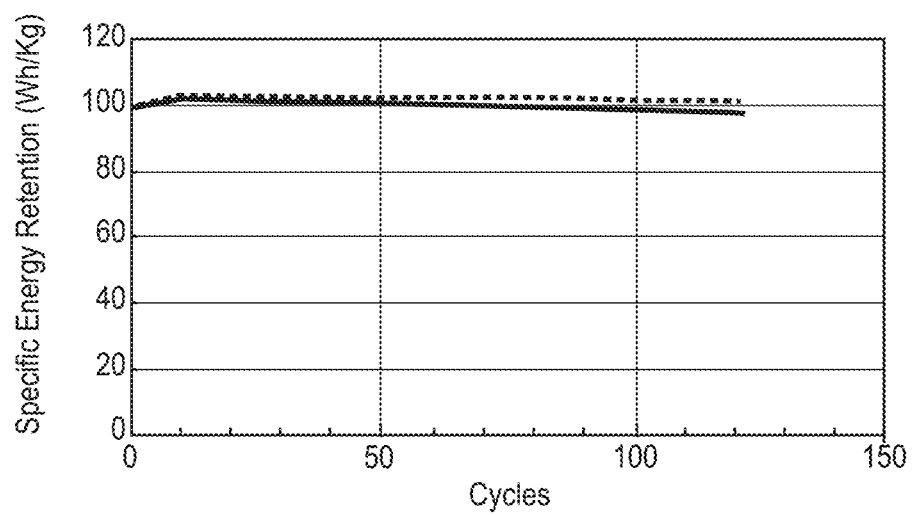
FIG. 34 is a plot of normalized specific energy as a function of cycle for the cells used to generate the plot for FIG. 33.
Figure 35:
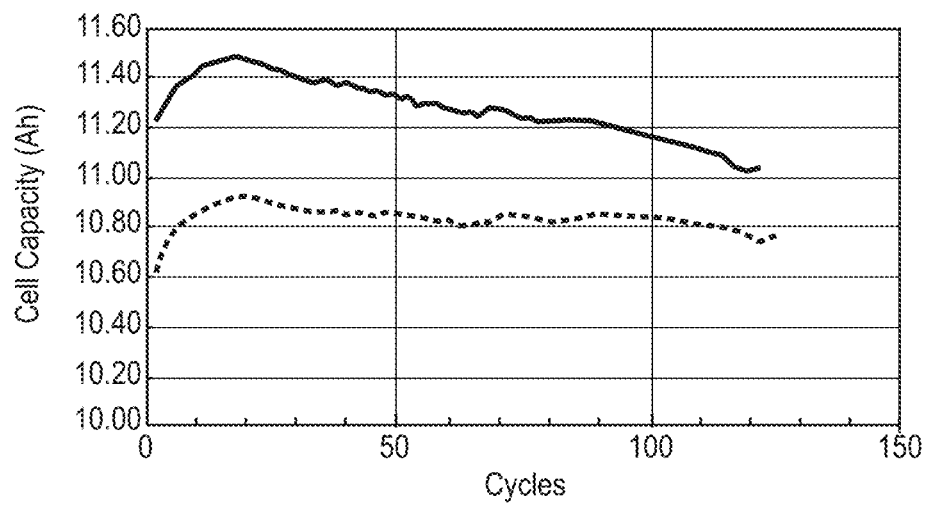
FIG. 35 is a plot of capacity as a function of cycle for the cells used to generate the plot for FIG. 33.
Figure 36:
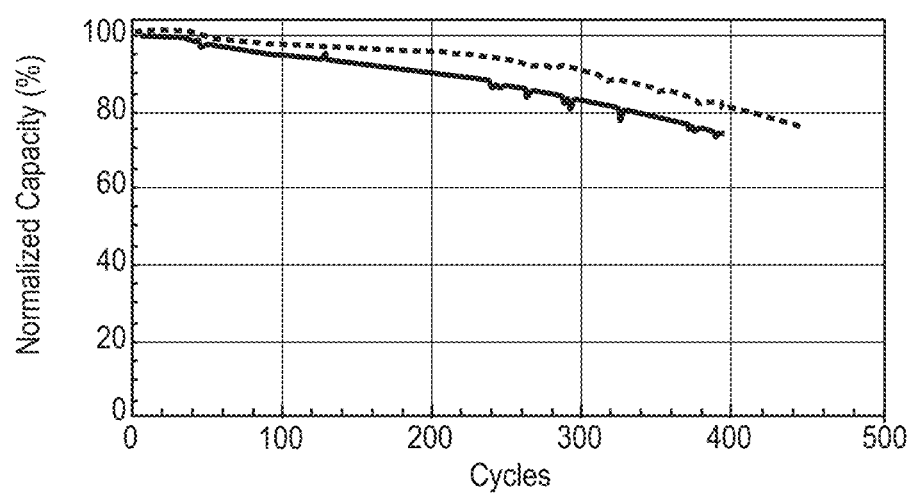
FIG. 36 a plot of normalized capacity as a function of cycle for the cells used to generate the plot for FIG. 33.

With respect to the cells with the NMC811 positive electrodes, comparable cells were cycled from 4.15V to 2.5V and from 4.20V to 2.5V. The cycling results are plotted in FIGS. 33-36. In FIGS. 33 and 34, the specific energy and normalized specific energy are plotted as a function of cycle. For the batteries cycled from 4.20V to 2.5V, the specific energy over almost the first 100 cycles are over 300 Wh/kg at C/3 discharge rate. Even though the charge voltage is set relatively low for these materials to cycle for a larger number of cycles, the average voltage and capacity are relatively high to produce the relatively high specific energy values. FIGS. 35 and 36 are plots of corresponding specific capacity and normalized specific capacity over the same cycle range.

In summary, the large format cells were able to achieve initial energy densities up to and above 300 Wh/kg. The cells with the N-NMC active materials without being blended achieved greater values of initial energy density. The cells with the positive electrode active material blends achieved desirable cycling stability, but the NMC811 cell cycled with a charge voltage of 4.15V achieved the very promising results when extrapolated to a greater number of cycles.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein. To the extent that specific structures, compositions and/or processes are described herein with components, elements, ingredients or other partitions, it is to be understand that the disclosure herein covers the specific embodiments, embodiments comprising the specific components, elements, ingredients, other partitions or combinations thereof as well as embodiments consisting essentially of such specific components, ingredients or other partitions or combinations thereof that can include additional features that do not change the fundamental nature of the subject matter, as suggested in the discussion, unless otherwise specifically indicated.

What is claimed is:

1. A lithium ion cell comprising:
    a negative electrode comprising from about 75 wt % to about 92 wt % an active material, from about 1 wt % to about 7 wt % nanoscale conductive carbon and from about 6 wt % to about 20 wt % polymer binder, wherein the active material comprises from about 40 wt % to about 95 wt % silicon oxide-based material and from about 5 wt % to about 60 wt % graphite, wherein the polymer binder of the negative electrode comprises a blend of at least about 50 wt % polyimide and at least about 5 wt % of a second binder polymer with an elastic modulus no more than about 2.4 GPa;
    a positive electrode comprising a nickel-rich lithium nickel cobalt manganese oxide approximately represented by the formula $LiNi_xMn_yCo_zO_2$, where $x+y+z\approx1$, $0.45\leq x$, $0.025\leq y\leq0.35$, $0.025\leq z\leq0.35$, conductive carbon, and a polymer binder;
    a separator between the negative electrode and the positive electrode;
    electrolyte comprising a lithium salt and non-aqueous solvent; and a container enclosing the negative electrode, the positive electrode, separator and electrolyte.

2. The lithium ion cell of claim 1 wherein the silicon oxide based material comprises a silicon oxide-silicon-carbon composite.

3. The lithium ion cell of claim 1 wherein the negative electrode active material comprises from about 50 wt % to about 90 wt % silicon-oxide based material and from about 10 wt % to about 50 wt % graphite, wherein the graphite has a BET surface area from about 2 $m^2/g$ to about 100 $m^2/g$.

4. The lithium ion cell of claim 1 wherein the second binder polymer is selected from the group consisting of poly vinylidene fluoride, carboxymethyl cellulose, styrene-butadiene rubber, lithiated polyacrylic acid, copolymers thereof and mixtures thereof.

5. The lithium ion cell of claim 1 wherein the nickel-rich lithium nickel manganese cobalt oxide is approximately represented by the formula $LiNi_xMn_yCo_zO_2$, where $x+y+z\approx1$, $0.50\leq x$, $0.03\leq y\leq0.325$, $0.03\leq z\leq0.325$.

6. The lithium ion cell of claim 1 wherein the positive electrode active material further comprises from about 20 wt % to about 80 wt % of (lithium+manganese) rich lithium metal oxide represented by the formula $Li_{1+b}Ni_\alpha Mn_\beta Co_\gamma A_\delta O_{2-z}F_z$, where $b+\alpha+\beta+\gamma+\delta\approx1$, b ranges from about 0.04 to about 0.3, α ranges from 0 to about 0.4, β range from about 0.2 to about 0.65, γ ranges from 0 to about 0.46, δ ranges from about 0 to about 0.15 and z ranges from 0 to 0.2, with the proviso that both α and γ are not 0, and where A is a metal different from lithium, manganese, nickel and cobalt.

7. The lithium ion cell of claim 1 further comprising supplemental lithium in an amount from about 80% to about 180% of the negative electrode first cycle irreversible capacity loss, the lithium ion cell having a ratio at the fourth cycle at a discharge rate of C/3 of negative electrode capacity divided by the positive electrode capacity from about 1.10 to about 1.95 and the lithium ion cell having an energy density of at least about 235 Wh/kg discharged from a selected charge voltage to 2.5V at a rate of C/3 ad 30° C., wherein the selected charge voltage is from 4.15V to 4.35V.

8. The lithium ion cell of claim 1 further comprising:
a plurality of negative electrodes;
a plurality of positive electrodes,
wherein the container has a prismatic shape and the assembled cell has a capacity of at least about 2 Ah, cycled from 4.35V to 2V at a rate of C/3.

9. The lithium ion cell of claim 1 having a capacity at the 450th cycle of at least about 80% of the capacity at the 5th cycle when cycled from the 10th cycle to the 450th cycle between 2.5V and a selected charge voltage at a rate of C/3, wherein the selected charge voltage is from 4.15V to 4.35V.

10. A lithium ion cell comprising:
a negative electrode comprising silicon oxide, graphite, nanoscale conductive carbon, and a polymer binder wherein the negative electrode comprises from about 75 wt % to about 92 wt % an active material, from about 1 wt % to about 7 wt % nanoscale conductive carbon and from about 7 wt % to about 20 wt % polymer binder, wherein the active material comprises from about 40 wt % to about 95 wt % silicon oxide-based material and from about 5 wt % to about 60 wt % graphite wherein the polymer binder of the negative electrode comprises a blend of at least about 50 wt % polyimide and at least about 5 wt % of a second binder polymer with an elastic modulus no more than about 2.4 GPa;

a positive electrode comprising a lithium nickel cobalt manganese oxide, conductive carbon, and a polymer binder wherein the positive electrode comprises a nickel-rich lithium nickel cobalt manganese oxide approximately represented by the formula $LiNi_xMn_yCo_zO_2$, where $x+y+z\approx1$, $0.45\leq x$, $0.025\leq y\leq0.35$, $0.025\leq z\leq0.35$;
a separator between the negative electrode and the positive electrode;
electrolyte comprising a lithium salt and non-aqueous solvent; and
a container enclosing the negative electrode, the positive electrode, separator and electrolyte;
wherein the lithium ion cell has an energy density of at least 235 Wh/kg discharged from a selected charge voltage to 2.5V at a rate of C/3 at 30° C. and has a capacity at 450 cycles at least about 80% of the capacity at the 5th cycle when cycled from the 5th cycle to the 450th cycle between 2.3V and the selected charge voltage at a rate of C/3, wherein the selected charge voltage is from 4.05V to 4.375V.

11. The lithium ion cell of claim 10 wherein the negative electrode comprises from about 80 wt % to about 92 wt % an active material, from about 1 wt % to about 6 wt % nanoscale conductive carbon and from about 8 wt % to about 18 wt % polymer binder, wherein the active material comprises from about 55 wt % to about 95 wt % silicon oxide-based material and from about 5 wt % to about 45 wt % graphite.

12. The lithium ion cell of claim 10 wherein the negative electrode active material comprises from about 50 wt % to about 90 wt % silicon-oxide based material and from about 10 wt % to about 50 wt % graphite and wherein the polymer binder of the negative electrode comprises polyimide and a second binder polymer selected from the group consisting of poly vinylidene fluoride, carboxymethyl cellulose, styrene-butadiene rubber, lithiated polyacrylic acid, copolymers thereof and mixtures thereof.

13. The lithium ion cell of claim 10 wherein the positive electrode comprises a nickel-rich lithium nickel cobalt manganese oxide approximately represented by the formula $LiNi_xMn_yCo_zO_2$, where $x+y+z\approx1$, $0.55\leq x$, $0.025\leq y\leq0.3$, $0.025\leq z\leq0.3$.

14. The lithium ion cell of claim 13 wherein $0.525\leq x\leq0.7$, and wherein the selected charge voltage is from 4.25V to 4.375V.

15. The lithium ion cell of claim 13 wherein $0.7\leq x\leq0.9$, and wherein the selected charge voltage is from 4.05V to 4.285V.

16. The lithium ion cell of claim 10 having a total capacity of at least about 2 Ah and wherein the container has a prismatic shape with an area from about 10,000 $mm^2$ to about 50,000 $mm^2$ and a volume from about 30,000 $mm^3$ to about 800,000 $mm^3$.

17. The lithium ion cell of claim 10 further comprising plurality of negative electrodes and a plurality of positive electrodes, and having an energy density of at least about 245 Wh/kg discharged from the selected voltage to 2.5V at a rate of C/3 at 30° C.

18. The lithium ion cell of claim 10 further comprising supplemental lithium in an amount from about 80% to about 180% of the negative electrode first cycle irreversible capacity loss and the lithium ion cell and the lithium ion cell having a ratio at the fourth cycle at a discharge rate of C/3 of negative electrode capacity divided by the positive electrode capacity from about 1.10 to about 1.95 and the lithium ion cell and the lithium ion cell having a capacity at the 450th cycle of at least about 80% of the capacity at the 5th cycle when cycled from the 10th cycle to the 450th cycle between 2.5V and the selected voltage at a rate of C/3.

19. The lithium ion cell of claim 1 wherein the polymer binder of the negative electrode comprises from about 12 wt % to about 40 wt % of the second binder polymer, which has an elastic modulus of no more than about 2 GPa.

20. The lithium ion cell of claim 1 further comprising supplemental lithium in an amount from about 80% to about 180% of the negative electrode first cycle irreversible capacity loss and the lithium ion cell, wherein the nickel-rich lithium nickel manganese cobalt oxide is approximately represented by the formula $LiNi_xMn_yCo_zO_2$, where $x+y+z\approx1$, $0.55\leq x$, $0.03\leq y\leq0.3$, $0.03\leq z\leq0.3$, wherein the negative electrode active material comprises from about 55 wt % to about 90 wt % silicon-oxide based material and from about 10 wt % to about 45 wt % graphite, wherein the graphite has a BET surface area from about 5 m$^2$/g to about 60 m$^2$/g, and wherein the lithium ion cell has a capacity at the 500th cycle of at least about 80% of the capacity at the 6th cycle when cycled to the 500th cycle between 2.5V and the selected voltage at a rate of C/3.

21. The lithium ion cell of claim 10 wherein the polymer binder of the negative electrode comprises from about 12 wt % to about 40 wt % of the second binder polymer, which has an elastic modulus of no more than about 2 GPa.

22. The lithium ion cell of claim 10 further comprising supplemental lithium in an amount from about 80% to about 180% of the negative electrode first cycle irreversible capacity loss and the lithium ion cell, wherein the nickel-rich lithium nickel manganese cobalt oxide is approximately represented by the formula $LiNi_xMn_yCo_zO_2$, where $x+y+z\approx1$, $0.55\leq x$, $0.03\leq y\leq0.3$, $0.03\leq z\leq0.3$, wherein the negative electrode active material comprises from about 55 wt % to about 90 wt % silicon-oxide based material and from about 10 wt % to about 45 wt % graphite, wherein the graphite has a BET surface area from about 5 m$^2$/g to about 60 m$^2$/g, and wherein the lithium ion cell has a capacity at the 500th cycle of at least about 80% of the capacity at the 6th cycle when cycled to the 500th cycle between 2.5V and the selected voltage at a rate of C/3.

23. A lithium ion cell comprising:

a negative electrode comprising silicon oxide, graphite, nanoscale conductive carbon, and a polymer binder wherein the negative electrode comprises from about 75 wt % to about 92 wt % an active material, from about 1 wt % to about 7 wt % nanoscale conductive carbon and from about 7 wt % to about 20 wt % polymer binder, wherein the active material comprises from about 50 wt % to about 90 wt % silicon oxide-based material and from about 10 wt % to about 50 wt % graphite, wherein the polymer binder of the negative electrode comprises polyimide and a second binder polymer selected from the group consisting of poly vinylidene fluoride, carboxymethyl cellulose, styrene-butadiene rubber, lithiated polyacrylic acid, copolymers thereof and mixtures thereof;

a positive electrode comprising a lithium nickel cobalt manganese oxide, conductive carbon, and a polymer binder wherein the positive electrode comprises a nickel-rich lithium nickel cobalt manganese oxide approximately represented by the formula $LiNi_xMn_yCo_zO_2$, where $x+y+z\approx1$, $0.45\leq x$, $0.025\leq y\leq0.35$, $0.025\leq z\leq0.35$;

a separator between the negative electrode and the positive electrode;

electrolyte comprising a lithium salt and non-aqueous solvent; and a container enclosing the negative electrode, the positive electrode, separator and electrolyte;

wherein the lithium ion cell has an energy density of at least 235 Wh/kg discharged from a selected charge voltage to 2.5V at a rate of C/3 at 30° C. and has a capacity at 450 cycles at least about 80% of the capacity at the 5th cycle when cycled from the 5th cycle to the 450th cycle between 2.3V and the selected charge voltage at a rate of C/3, wherein the selected charge voltage is from 4.05V to 4.375V.

* * * * *